(12) United States Patent
Banerjee et al.

(10) Patent No.: US 11,799,950 B1
(45) Date of Patent: Oct. 24, 2023

(54) SEAMLESS MIGRATION OF PACKET PROCESSING WORKLOADS BETWEEN EXCEPTION PATH NODE GROUPS

(71) Applicant: Amazon Technologies, Inc., Seattle, WA (US)

(72) Inventors: Sujogya Banerjee, Kenmore, WA (US); Mahesh Elireddy, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/706,511

(22) Filed: Mar. 28, 2022

(51) Int. Cl.
*H04L 67/1012* (2022.01)
*H04L 67/1008* (2022.01)
*G06F 9/455* (2018.01)
*H04L 67/00* (2022.01)

(52) U.S. Cl.
CPC ...... *H04L 67/1012* (2013.01); *G06F 9/45558* (2013.01); *H04L 67/1008* (2013.01); *H04L 67/34* (2013.01); *G06F 2009/45595* (2013.01)

(58) Field of Classification Search
CPC . H04L 67/1012; H04L 67/1008; H04L 67/34; G06F 9/45558; G06F 2009/45595
See application file for complete search history.

(56) References Cited

U.S. PATENT DOCUMENTS

| | | | |
|---|---|---|---|
| 6,993,021 B1 | 1/2006 | Chuah et al. | |
| 7,782,782 B1 | 8/2010 | Ferguson et al. | |
| 7,865,586 B2 * | 1/2011 | Cohn | H04L 41/0803 709/224 |
| 8,244,909 B1 | 8/2012 | Hanson et al. | |
| 8,331,371 B2 | 12/2012 | Judge et al. | |
| 8,358,658 B2 | 1/2013 | Flynn et al. | |
| 8,478,896 B2 | 7/2013 | Ehlers | |
| 8,693,470 B1 | 4/2014 | Maxwell et al. | |
| 10,742,446 B2 | 8/2020 | Tillotson et al. | |
| 10,742,554 B2 | 8/2020 | Deb et al. | |

(Continued)

OTHER PUBLICATIONS

Albert Greenberg, et al "VL2 A Scalable and Flexible Data Center Network" Communications of the ACM, vol. 54, No. 3, Mar. 2011, pp. 1-10.
Chuanxiong Guo, et al "BCube: A High Performance, Server-centric Network Architecture for Modular Data Centers" SIGCOMM'09 Aug. 17-21, pp. 1-12.
"On the Impact of Packet Spraying in Data Center Networks", Advait Dixit, et al., 2013, pp. 1-9.

(Continued)

*Primary Examiner* — Chris Parry
*Assistant Examiner* — Steven C Nguyen
(74) *Attorney, Agent, or Firm* — Robert C. Kowert; Kowert, Hood, Munyon, Rankin & Goetzel, P.C.

(57) ABSTRACT

A control plane server of a packet processing service assigns a first node group comprising exception-path nodes of the service to a network interface of a first application. Nodes of the assigned node group provide packet rewriting rules used by fast-path nodes of the service to direct requests of the application. In response to detecting that a workload migration criterion has been met, the control plane server initiates a migration workflow of the interface, during which flow state information of a packet flow is replicated at respective subsets of nodes of the first node group and a second node group, and connections used for the application requests remain operational. After the migration workflow completes, nodes of the second node group provide packet rewriting rules for directing requests of the application.

20 Claims, 23 Drawing Sheets

(56) References Cited

U.S. PATENT DOCUMENTS

| | | | |
|---|---|---|---|
| 10,757,009 B2 | 8/2020 | Deb et al. | |
| 10,785,146 B2 | 9/2020 | Tillotson et al. | |
| 10,797,989 B2 | 10/2020 | Tillotson et al. | |
| 10,834,044 B2 | 11/2020 | Tillotson et al. | |
| 10,893,004 B2 | 1/2021 | Tillotson et al. | |
| 10,897,417 B2* | 1/2021 | Tillotson | H04L 45/7453 |
| 11,310,155 B1* | 4/2022 | Qian | H04L 45/123 |
| 11,469,998 B2* | 10/2022 | Sanghvi | H04L 45/42 |
| 11,665,090 B1 | 5/2023 | Banerjee et al. | |
| 2008/0225875 A1* | 9/2008 | Wray | H04L 12/4633 370/419 |
| 2021/0044512 A1* | 2/2021 | Deb | H04L 45/124 |

OTHER PUBLICATIONS

U.S. Appl. No. 17/218,036, filed Mar. 30, 2021, Baihu Qian, et al.
U.S. Appl. No. 17/218,039, filed Mar. 30, 2021, Baihu Qian, et al.
U.S. Appl. No. 17/385,778, filed Jul. 26, 2021, Meher Aditya Kumar Addepali.
U.S. Appl. No. 16/714,392, filed Dec. 13, 2019, Pascal Hahn, et al.
U.S. Appl. No. 16/711,225, filed Dec. 11, 2019, Ahmed Reaz, et al.
U.S. Appl. No. 16/711,255, filed Dec. 11, 2019, Daniel Voinea, et al.
U.S. Appl. No. 16/843,807, filed Apr. 8, 2020, Oron Anschel, et al.
U.S. Appl. No. 17/706,495, filed Mar. 28, 2022, Sujogya Banerjee, et al.
U.S. Appl. No. 18/323,369, filed May 24, 2023, Abhishek Chhajer, et al.

* cited by examiner

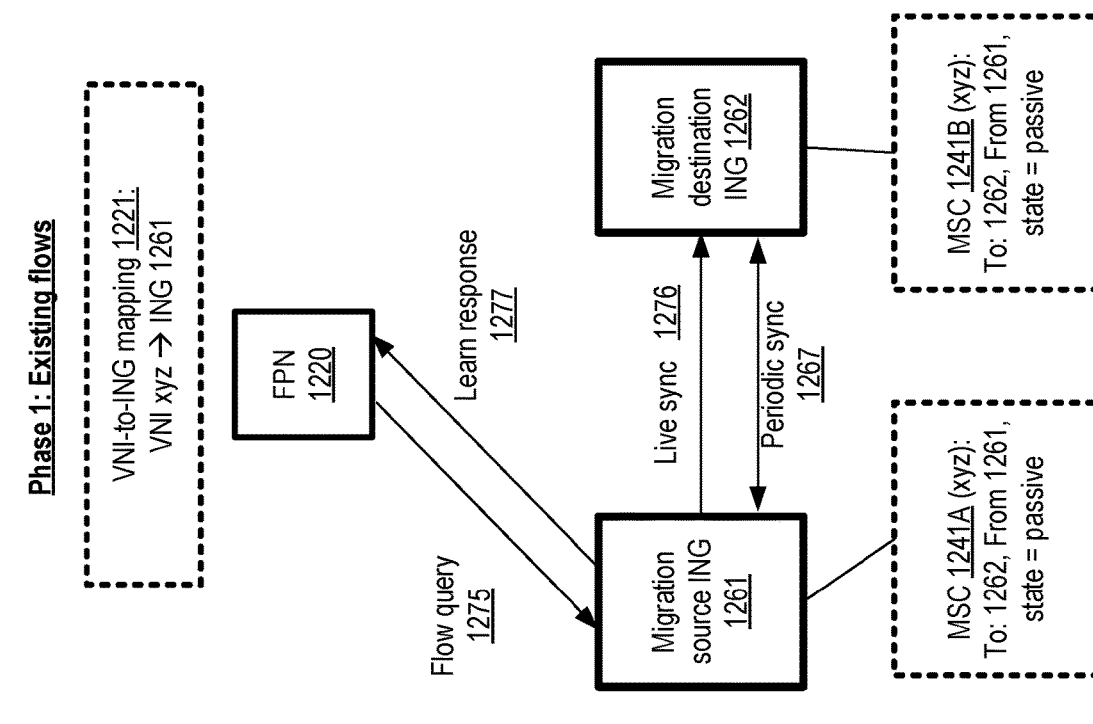
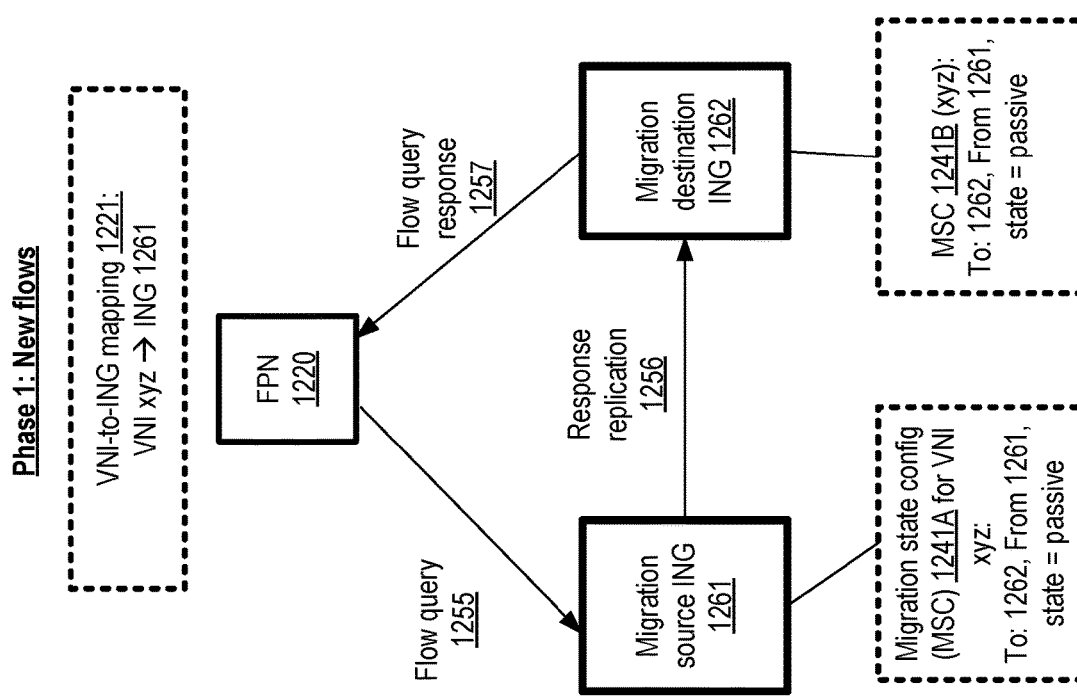
FIG. 12

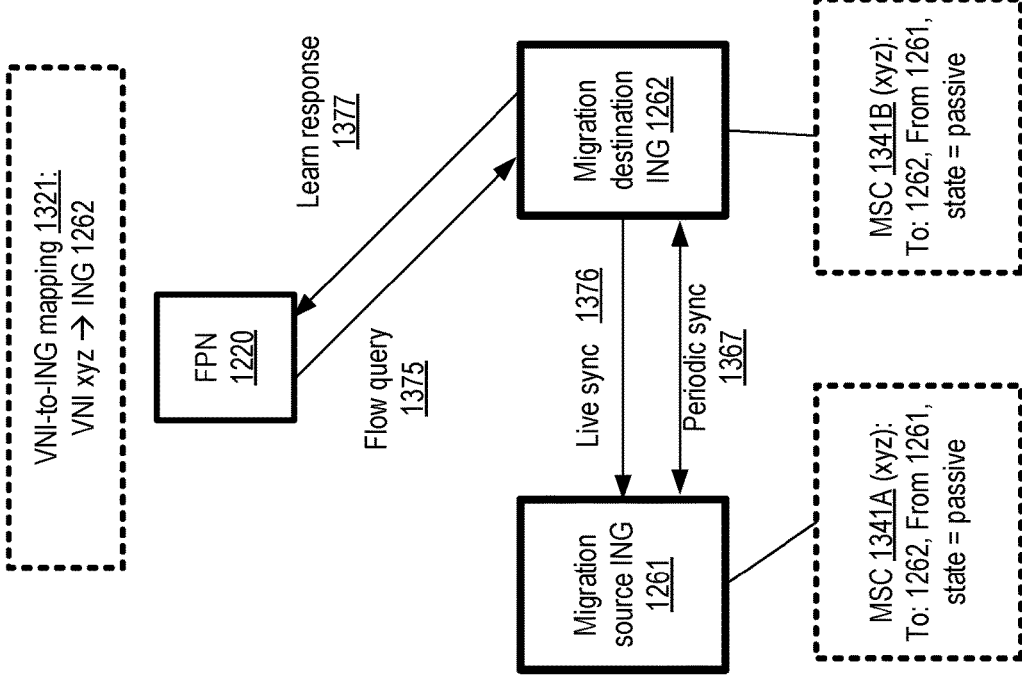
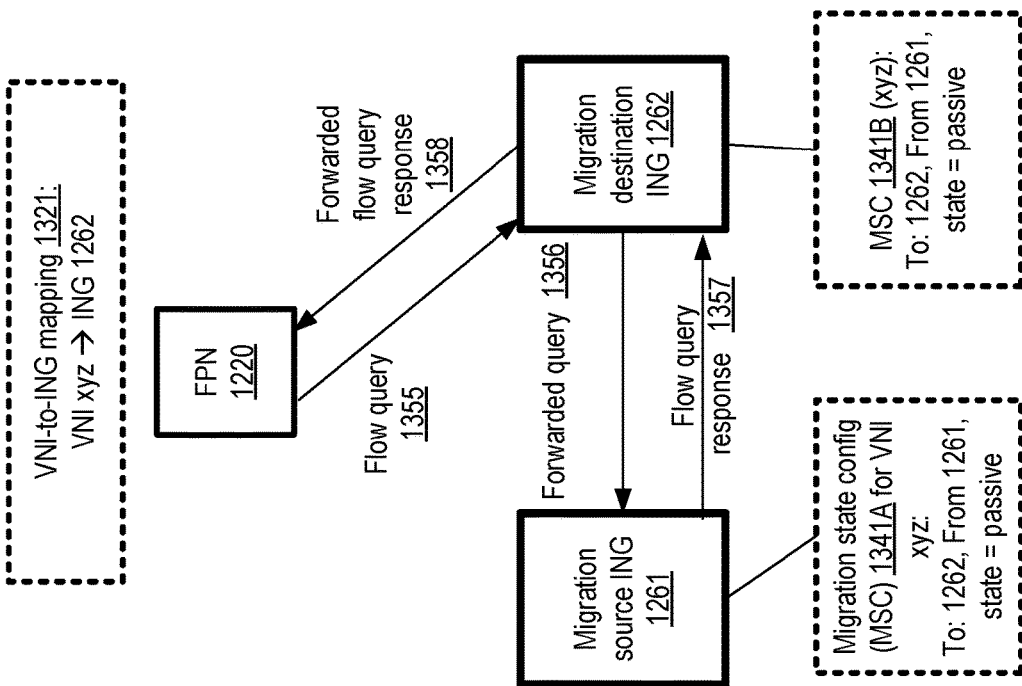
FIG. 13

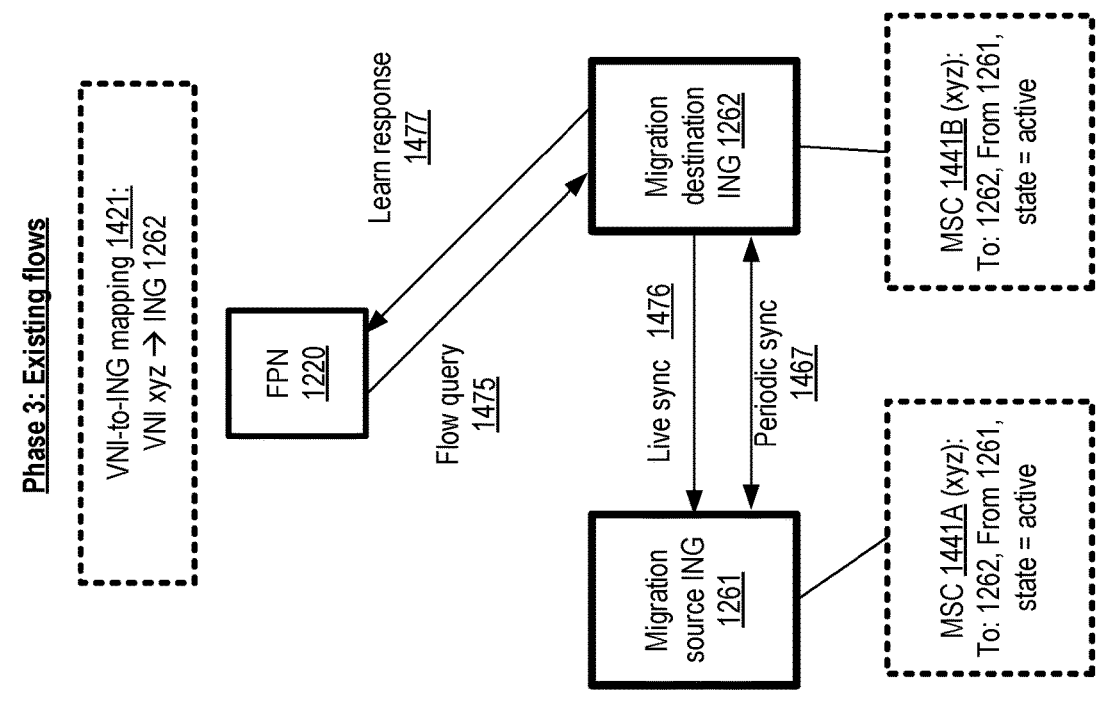
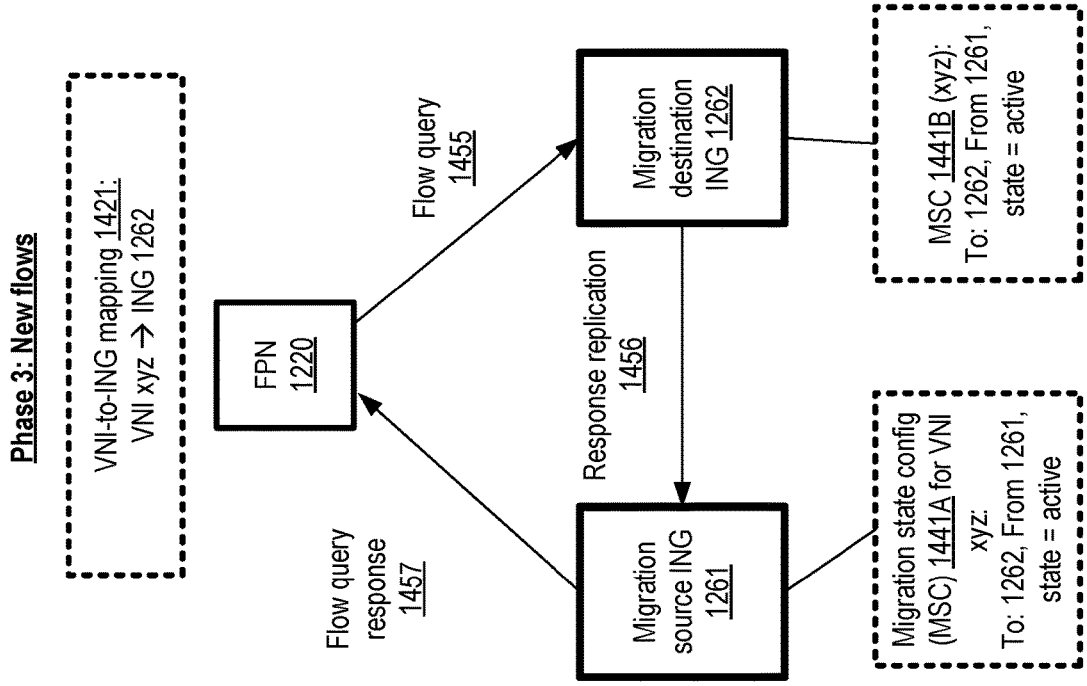
FIG. 14

Establish (e.g., by control plane servers (CPSs) of a packet processing service (PPS) of a cloud provider network), a pool of fast-path nodes (FPNs) and a pool of exception path nodes (EPNs) of the PPS; the EPNs include flow state tracking nodes (FSTNs) and rewriting decisions nodes (RDNs); the FPNs cache packet rewriting rules generated at the RDNs, apply them to received packets, and deliver re-written versions of the packets to destinations selected according to the rules; the FSTNs maintain state information of the flows and act as intermediaries between the RDNs and the FPNs 1501

↓

Subdivide the EPNs into isolated node groups (INGs), with each ING comprising some number of FSTNs and RDNs; the INGs are isolated from one another in the sense that during default or normal operating modes, messages pertaining to processing of packets associated with a given application with an associated client-accessible virtual network interface (CVNI) are processed at a single ING using VNI-to-ING mappings provided to FPNs, with no cross-ING messages being transmitted, so a failure/outage at a given ING cannot impact applications whose CVNI is mapped to another ING 1504

↓

Assign, e.g., in response to a programmatic request, a particular CVNI to an application implemented at least in part using cloud resources, and a selected ING to the CVNI; a group of FPNs is also assigned to the application, a given FPN may be assigned as a member of several different FPN groups (as opposed to EPNs, which are each members of a single ING) ; respective VNIs may also be assigned for the resources at which the application is implemented, and/or for individual FPNs and ENs 1507

↓

During a default or normal mode of operation, replicate/synchronize state information for various packet flows of the application across several FSTNs (e.g., a chain of 4 FSTNs including a forward-path primary (FPP) FSTN, a forward-path secondary (FPS) FSTN, a reverse-path primary (RPP) FSTN and a reverse-path secondary (RPS) FSTN) of the ING assigned to the CVNI using several types of messages, so that in the event of a failure of an FSTN, the state information for flows handled by that FSTN can be obtained from other FSTNs; state information is not replicated across ING boundaries during the default mode of operation 1511

↓

CPSs of the PPS collect and analyze metrics from the PPS nodes during the default mode, and make re-configuration decisions if needed 1514

*FIG. 15*

A control-plane server (CPS) of a PPS determines, e.g., based on performance or other metrics collected from an ING ING1 assigned to a set of CVNIs, that a workload migration criterion has been met for ING1: at least a portion of the workload of ING1 is to be migrated to a second ING ING2 – e.g., out of N CVNIs whose traffic is being handled using ING1, the traffic of approximately (N-k) CVNIs should be migrated 1601

↓

The CPS initiates a multi-phase migration workflow for the workload associated with each of several CVNIs mapped to ING1; the migration workflows for several CVNIs can be implemented in parallel 1604

↓

During at least a part of the migration workflow associated with a given CVNI CVNI1, state information of a packet flow F1 that was being processed using ING1 is replicated in both ING1 and ING2 – e.g., in a chain of four FSTNs in ING1 and an extended chain of four FSTNs in ING2; during the migration workflow the VNI-to-ING mappings stored at FPNs are modified in a controlled manner so as to avoid dropping packets of any new or existing flow, and migration state configuration (MSC) artifacts stored at the FSTNs of ING1 and ING2 are modified in a controlled manner so as to avoid dropping packets of any new or existing flow 1607

↓

After the migration workflow, ING2 is used for processing packets of all flows associated with CVNI1, with no messages or state information replication required between ING2 and ING1, and packet rewriting rules being generated at ING2's RDNs for new flows and provided to FPNs being used for CVNI1 for caching and implementation 1611

*FIG. 16*

During a default or normal mode of operation at a packet processing service (PPS) with respect to a particular client-side VNI CVNI1 of an application, packet rewriting rules for packet flows directed to CVNI1 are generated at RDN(s) of an ING ING1 assigned to CVNI1 and transmitted by an FSTN of ING1 to FPNs assigned to CVNI1  2001

During the default mode, state information for various packet flows associated with CVNI1 is replicated/synchronized across several FSTNs of ING1; state information is not replicated across ING boundaries  2004

A control plane server (CPS) of the PPS determines that the packet processing workload associated with CVNI1 is to be migrated to a different ING, ING2  2007

The CPS indicates to one or more FSTNs within ING1, a communication mechanism (e.g., a direct network connection, or using a selected FPN as an intermediary) to be used for replication of state information from ING1 to ING2 during a migration workflow; different communication mechanisms may be specified for different kinds of messages (query response replications, live syncs, periodic syncs etc.)  2010

The CPS initiates a multi-stage migration workflow for workload associated with CVNI1  2014

During the migration workflow, state information for various packet flows associated with CVNI1 is replicated/synchronized across several FSTNs of ING1 and several FSTNs of ING2 using the communication mechanism(s); if a selected FPN is used as the intermediary, an FSTN of ING1 may inform the selected FPN that the state information is to be forwarded to ING2 (or VNI-to-ING mapping metadata at the FPN may be used to detect that the state information is to be forwarded to ING2), and an FSTN of ING2 which receives the forwarded state information may initiate a chain of replication of the state information at ING2; the packet flows associated with CVNI1 are not disrupted during the migration workflow, and new flows are processed based on the application's requirements, just as in the default mode of operation  2017

After the migration workflow completes and the default mode is resumed, state information for various packet flows associated with CVNI1 is replicated/synchronized across several FSTNs of ING2, with no communication required between ING2 and ING1; for new flows, rewriting rules are generated at ING2 and transmitted to FPNs for caching and implementation  2020

FIG. 20

SEAMLESS MIGRATION OF PACKET PROCESSING WORKLOADS BETWEEN EXCEPTION PATH NODE GROUPS

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine may be regarded as a software simulation acting as a distinct logical computing system that provides users with the illusion that they are the sole operators and administrators of a given hardware computing resource, while also providing application isolation and security among the various virtual machines.

As demand for virtualization-based services at provider networks has grown, more and more networking and inter-connectivity-related features have been added to the services. Many such features may require network packet address manipulation in one form or another, e.g., at level 3 or level 4 of the open systems interconnect stack. For example, some providers configure groups of resources as isolated virtual networks on behalf of respective customers, with substantial flexibility being provided to the customers with respect to the networking configuration details within their particular subsets of the provider network resources. As customers may assign IP (Internet Protocol) addresses within their isolated virtual networks independently of the addresses assigned at other isolated virtual networks, managing traffic in and out of the isolated virtual networks may require the use of address translation techniques. Using ad-hoc solutions for all the different types of packet transformation requirements may not scale in large provider networks at which the traffic associated with hundreds of thousands of virtual or physical machines may be processed concurrently.

BRIEF DESCRIPTION OF DRAWINGS

FIG. 12 illustrates operations performed for new and existing flows during phase 1 of a migration workflow of a client-side virtual network interface, according to at least some embodiments.

FIG. 13 illustrates operations performed for new and existing flows during phase 2 of a migration workflow of a client-side virtual network interface, according to at least some embodiments.

FIG. 14 illustrates operations performed for new and existing flows during phase 3 of a migration workflow of a client-side virtual network interface, according to at least some embodiments.

FIG. 15 is a flow diagram illustrating aspects of operations which may be performed to configure isolated node groups for packet processing applications, and to utilize the isolated node groups during default modes of operation with respect to client-side virtual network interfaces, according to at least some embodiments.

FIG. 16 is a flow diagram illustrating aspects of operations which may be performed to migrate workloads associated with client-side virtual network interfaces from one isolated node group to another, according to at least some embodiments.

FIG. 20 is a flow diagram illustrating aspects of operations which may be performed using fast-path nodes of a packet processing service as intermediaries for transmitting flow state information from one isolated node group to another during migration workflows of client-side virtual network interfaces, according to at least some embodiments.

Figure 1:
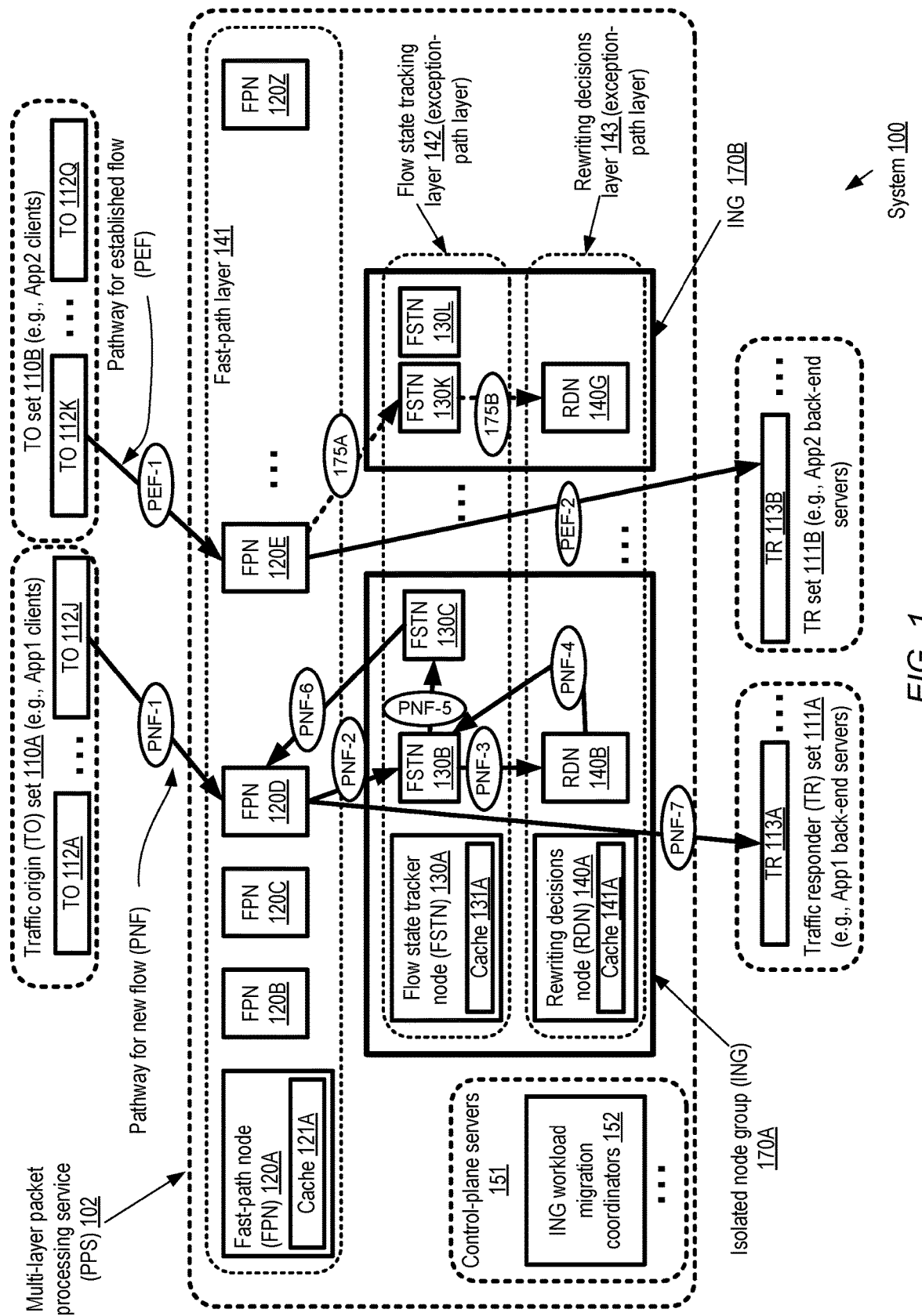
FIG. 1 illustrates an example system environment in which packet processing workloads may be migrated between isolated node groups of a multi-layer packet processing service without disrupting the flows of application request and response packets, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for seamlessly migrating large-scale packet processing workloads (e.g., workloads which can collectively require the processing of millions of packets per second) from one set of nodes of a cloud-based packet processing service to another set of nodes, without causing application disruptions such as connection resets for existing packet flows, and while also continuing to process packets of new packet flows initiated during the migration. A multi-layer packet processing service (PPS) of a cloud provider network is used to rewrite network packets (e.g., by substituting or adding header fields) of various kinds of applications implemented at the provider network according to requirements specified by the application owners. Packet rewriting rules generated and applied by the PPS enable, for example, service requests generated by application clients to be delivered efficiently to the appropriate servers (even though the clients may not be aware of the actual network addresses of the servers in the virtualized computing environment of the cloud) and responses to the application requests to be delivered efficiently to the clients. A PPS is also referred to as a network function virtualization service (NFVS) or a virtualized network function service (VNFS), as the packet rewriting rules are examples of virtualized network functions which can be combined into pipelines or graphs implementing various types of applications.

The packet processing service includes nodes arranged in three layers: a fast-path layer, a flow state tracking layer and a rewriting decisions layer. The flow state tracking layer and the rewriting decisions layer are collectively referred to as exception-path layers, responsible for generating packet rewriting rules based on application requirements and maintaining state information for various packet flows being handled at the service. The fast-path layer nodes query the exception-path layers for rewriting rules when the first packet of a flow is received, store the rewriting rules in local caches, and re-use the rules for rapidly rewriting/transforming subsequent packets of the flow before transmitting them to their intended destinations. Under normal operating conditions, a fast-path node can quickly use cached rewriting rules to process the vast majority of received packets of a flow, and only interacts with exception-path nodes infrequently; hence the use of the terms "fast-path" and "exception-path" and to describe the layers.

Respective groups of exception-path layer nodes of the PPS (referred to as isolated node groups (INGs) or cells) are assigned to respective applications by setting up virtual network interfaces. The INGs are configured in a multi-tenant manner—that is, a given ING can be assigned to process the packet flows of several different applications. Client-accessible network endpoints (e.g., Internet Protocol (IP) addresses of virtual network interfaces (VNI)) are assigned to each of the applications, and traffic associated with each such endpoint is assigned to a given ING. The terms "client-accessible virtual network interface (CVNI)", "client-accessible application endpoint" and "application endpoint" are used as synonyms herein. A VNI is a logical entity with a set of networking and security-related attributes that can be programmatically attached to (or detached from) a compute instance or networking constructs such as logical load balancers or gateways. For example, at least one IP (Internet Protocol) address "IPaddr1" may be assigned to a given virtual network interface VNI1, and security rules restricting inbound and outbound traffic may be set for VNI1. A client-accessible VNI assigned to an application is a VNI with a network address that is accessible to the clients of the application (e.g., via a public IP address if the clients are part of the public Internet). Clients can submit application requests to a network address of the CVNI, and receive responses to those requests from the network address of the CVNI. In scenarios in which a single CVNI is assigned to a given application App1, the terms "workload associated with application App1" or "packets associated with application App1" can be used as the equivalent of "workload associated with the CVNI assigned to App1" or "packets associated with the CVNI assigned to App1". To simplify the presentation, in much of the following description a single CVNI is assumed to be assigned to any given application whose packets are to be processed at the PPS. However, the migration-related techniques described herein can be applied with equal success in scenarios in which multiple CVNIs are assigned to a single application.

After a CVNI is established/configured for an application and a given ING is assigned to the CVNI, for most of the lifecycle of the CVNI and the associated application, workload of that CVNI is typically handled as planned by that ING, without any workload migration being required. This mode of operation, which does not involve CVNI workload migration, is referred to as a default mode of operation of the CVNI, e.g., in contrast to a migration-in-progress mode of operation (typically short periods of time in which a migration workflow is implemented for transferring workload of the CVNI to another ING). After a migration workflow is completed to a destination ING, the default mode of operation is resumed with respect to the CVNI, now using the migration destination ING.

During the default mode of operation, the nodes of a given ING currently assigned to the CVNI perform exception-path packet processing tasks for the packets associated with the CVNI, without requiring communication with other INGs, and are in this sense isolated from all the PPS nodes that are members of other INGs. Such isolation of exception-path nodes is desirable from an operational point of view in that, for example, it reduces the impact of potential failures. In the unlikely event of a failure at a given ING, only those applications to whose CVNI the ING was assigned could potentially be affected, instead of all the applications whose traffic is being handled by the PPS. Furthermore, state information of the packet flows of a given application CVNI (including the rewriting rules being used, as well as other metadata) is replicated among a subset of nodes of the ING assigned to the application during the default mode of operation, enabling packet flows of the application to continue without disruption even if one of the nodes of the ING fails.

Under certain conditions, such as when a given ING becomes overloaded, it may no longer be possible to provide the desired level of performance for the application's packet flows with the current assignment of PPS INGs. The potential occurrence of such scenarios is detected in advance at the PPS, e.g., based on analysis of performance metric trends, and a multi-stage workload migration workflow is implemented, in effect transferring some (or in some cases all) of the workload of an overloaded ING to a migration destination ING. The migration workflow is implemented in a manner that avoids interrupting existing packet flows, and also enables new packet flows initiated during the workflow to be processed according to the rewriting rules in effect for the application. The migration requires the state information of numerous packet flows to be transferred to the destination ING from the source ING. Because of the very large numbers of packet flows being handled, it can take some time (e.g., a few minutes) for the entire set of state information of a given set of client-accessible application endpoints to be transferred. To ensure that packet flows can continue to be processed without being disrupted (e.g., to avoid connection resets for existing flows), an extended state replication technique which crosses ING boundaries is implemented during the migration workflow. During the migration workflow, flow state information of a given client-accessible endpoint is temporarily replicated among PPS nodes of both the migration destination ING and the migration source ING. This enables nodes at either of the INGs to be used for processing the flows of a given application if needed. During different stages of the migration workflow, one or the other of the two INGs can act as the primary ING for a given application; that is, the nodes of the ING that is currently the primary can take responsibility for providing responses to flow requests from fast-path nodes, initiating some types of flow state replications, and so on. As a result of the extended replication of flow state information, the migration is seamless from the perspective of application clients; the clients may not even be aware of the migration. After the migration workflow completes for a given application endpoint, only the destination ING is used for the traffic of that endpoint, without requiring any communication between INGs, thus resuming the default mode of operation. ING nodes can utilize a number of communication mechanisms for transferring the state information across ING boundaries during the migration workflow, including for example using selected fast-path nodes of the PPS as intermediaries. PPS workload migrations may also be implemented for reasons such as anticipated maintenance events and the like.

As one skilled in the art will appreciate in light of this disclosure, certain embodiments may be capable of achieving various advantages, including some or all of the following: (a) providing desired levels of performance (such as response times and throughputs for application requests) for applications and services implemented using virtualized resources a cloud provide network, despite increases in application workload levels over time, and/or (b) reducing the likelihood of connection resets, packet drops, and other disruptions for cloud-based applications with very high request rates.

According to some embodiments, a system may comprise one or more control plane servers (CPSs) of a PPS of a cloud provider network, a pool of exception-path nodes (EPNs) of the PPS, and a pool of fast-path nodes (FPNs) of the PPS. The FPNs may cache and execute packet rewriting rules generated for respective packet flows at the EPNs; the rules may be used for example by the FPNs to deliver packets originating at clients of various applications to the resources implementing the application, and to deliver responses to the clients. A CPS may subdivide or partition the exception-path nodes into a plurality of isolated node groups (INGs) in various embodiments, and assign, to a client-accessible virtual network interface (CVNI) configured for an application, a first ING in some embodiments. The CVNI, also referred to as a client-accessible application endpoint, may be configured to receive packets comprising application requests of an application implemented using one or more resources (e.g., compute instances of a virtualized computing service or VCS) of the provider network. During a default mode of operation of the CVNI, nodes of the first ING may process packets directed to the CVNI without communicating with nodes of other INGs. In some embodiments, the CVNI may be assigned to the application by a control plane server of the PPS, e.g., in response to a programmatic request for packet processing tasks from an application owner or administrator.

During the default mode of operation of the VNI, in various embodiments a particular exception-path node of the first ING may cause flow state information of a particular packet flow of the application to be replicated at a first subset of nodes of the ING, such that in the event of a failure of the particular exception-path node, a packet rewriting rule indicated in the flow state information can be obtained from another node of the first subset. The packet rewriting rule may be used by a fast-path node to direct rewritten versions of packet containing application requests of the application to a resource implementing the application, for example.

In response to detecting that a workload migration criterion has been met with respect to the first ING, a CPS may select a second ING as a workload migration destination for the first ING, and initiate a migration workflow in various embodiments. During the migration workflow, the VNI may be said to be in a migration-in-progress mode of operation, as opposed to the default mode of operation; after the migration workflow completes, the VNI may resume the default mode. During at least a portion of the migration-in-progress mode, flow state information of the particular packet flow may be replicated at (a) the first subset of nodes of the first ING and (b) a second subset of nodes of the second ING in at least some embodiments. Network connections used for transmitting packets of existing packet flows of the first application may remain operational and may not be reset during the migration workflow, and packet processing rules for new packet flows of the first application may be generated at a selected ING of the two INGs. During the migration-in-progress mode, flow state information of the particular flow may be used at the first ING to respond to requests from one or more FPNs, and flow state information of the particular flow may also be used at the second ING to respond to other requests from one or more FPNs. After the migration-in-progress mode of operation has completed and the default mode of operation is resumed, a particular exception-path node of the second ING may cause flow state information of the particular packet flow to be replicated at the second subset of exception-path nodes of the second ING, without replicating the flow state information at the first subset of exception-path nodes of the first ING in various embodiments. The phrases "migrate an application endpoint" or "migrate a VNI" may be used herein as shortened versions of "migrate the workload of an application endpoint", "migrate the workload of a VNI" or "migrate the workload of an application".

At least some of the INGs of the PPS may be configured in multi-tenant mode in one embodiment—e.g., a given ING may be assigned to application endpoints or VNIs of multiple applications. In some embodiments, a given application may be assigned several different client-accessible VNIs, and each of those VNIs may be assigned a respective ING by a CPS (e.g., each of the VNIs of such an application may be assigned a different ING, or some of the VNIs may share the same ING). In some embodiments, at least some nodes of a PPS, including fast-path nodes and/or exception-path nodes of the INGs, may be implemented at respective compute instances of a VCS.

Migration workflows of multiple application endpoints to which a given ING has been assigned may be conducted at least partly in parallel in some embodiments. For example, when a migration triggering condition is detected by a CPS for an ING ING1 which is assigned to application endpoints AE1, AE2, . . . , AE6, migrations of a subset of the application endpoints AE1, AE2, and AE5 may be initiated and performed during overlapping time intervals. The subset of the endpoints for which migration is initiated may be selected based on a variety of factors in some embodiments—e.g., AEs that are assigned to applications of different clients may be selected for migration in preference to AEs of multiple applications of the same client, so that any overhead associated with migration is shared rather than being experienced by a single client's applications. In a scenario in which multiple application endpoints' workload is migrated from a single source ING, in some embodiments different destination INGs may be selected by a CPS for respective application endpoints or CVNIs, based on factors such as the respective current workload levels of the destination ING candidates, the respective current workloads of the source ING, and so on. In the scenario introduced above where AE1, AE2, and AE5 are being migrated from ING1, a destination ING ING2 may be chosen for AE1, while a different destination ING ING3 may be selected for both AE2 and AE5, for example.

A number of different conditions may trigger migrations of application endpoints or CVNIs from one ING to another in different embodiments. For example, detecting that a migration criterion has been met for an ING may comprise one or more of: (a) determining that a resource utilization metric of an ING exceeds a threshold, (b) determining that a workload imbalance metric associated with the ING and one or more other node groups exceeds a threshold (e.g., that the workload level of ING1 is x over the last T minutes, and x is substantially above a range of workload levels of the other INGs) or (c) determining that a maintenance event (e.g., an upgrade of software or hardware) associated with an ING is scheduled. The destination ING for a given source ING may be selected from a number of candidate INGs based on a variety of factors in different embodiments, such as (a) a resource utilization metric of the candidate ING, (b) the number of application endpoints to which the candidate ING has been assigned, (c) the number of active connections whose packets are being processed using the candidate ING, (d) a packet processing rate metric of the candidate ING, or (e) a metric of hardware resource overlap between the source ING and the destination ING. Consider an example scenario in which there are two candidate destination INGs ING2 and ING3 being considered for a source ING ING1, and some the nodes of ING2 are implemented (e.g., using respective compute instances) on the same server rack SR1 as some of the nodes of ING1, while none of the nodes of ING3 are on the SR1, ING3 may be preferred as the destination ING. ING3 may be preferred in some embodiments because migrating workload from ING1 to ING2 may result in some shared resources of the same rack being used before and after migration, while migrating workload from ING1 to ING3 may split the workload among different racks' resources.

State information may be replicated or synchronized among exception-path nodes in response to various categories of triggering events, e.g., during default modes of operation as well as during migration workflows in different embodiments. For example, state information of a packet flow PF1 may be replicated in various embodiments in response to determining, at a flow state tracker node (FSTN) of an ING, that a cache maintained at the FSTN does not contain a rewriting rule requested by a fast-path node (FPN). In such a scenario, the rewriting rule may be obtained at the FSTN from a rewriting decisions node (RDN) of the same ING, and flow state information comprising that rule may be replicated at a subset of other nodes of the ING. Thus, a cache miss at an FSTN in response to a flow query represents one category of a state information replication triggering event. Flow state information may also be replicated in some embodiments as part of a "live sync" operation for an in-progress packet flow after a cache hit occurs at an FSTN in response to a query for a rewriting rule from an FPN, as part of a "periodic sync" operation initiated by an FSTN periodically even if a query for a rewriting rule has not been received from an FPN but a threshold amount of time has elapsed since a previous state information synchronization, and so on. The events that trigger the replication or synchronization of flow state information may collectively be referred to as flow state information replication triggering events. In at least some embodiments, a replication chain of four FSTNs may be used during the default mode of operation of an application endpoint: (a) a primary FSTN for a forward direction of packet transmissions of the flow, (b) a secondary FSTN for the forward direction of packet transmissions of the packet flow, (c) a primary FSTN for a reverse direction of packet transmissions of the packet flow, and (d) a secondary FSTN for a reverse direction of packet transmissions of the particular packet flow. During the migration workflow, the default-mode replication chain may be extended to eight nodes in such embodiments—four FSTNs in the source ING and four (fulfilling similar roles for the different directions of the flow) in the destination ING.

The PPS may provide a number of metrics to application owners or other PPS clients via programmatic interfaces (e.g., web-based consoles, command-line tools application programming interfaces (APIs), graphical user interfaces and the like) in different embodiments. Such metrics may, for example, indicate the rates at which packets are being processed, the request-response latencies for application requests, the number of INGs that are being used for the application, the number of migrations that have been initiated or performed, the differences in metrics such as response times between default modes of operations and migration-in-progress modes, and so on.

During a migration workflow of an application endpoint from a source IN to a destination ING, flow state tracker nodes (FSTNs) of the source ING may communicate with FSTNs in the destination ING via a variety of different communication mechanisms in some embodiments to propagate flow state information that is to be replicated at the destination ING. In some embodiments, control plane servers of the PPS may transmit an indication of a communication policy to be used for such inter-ING flow state replication messages to the FSTNs of the source ING. According to one such policy, an FSTN of the source ING may select a fast-path node (FPN) as a forwarding intermediary for flow state information which is currently being replicated at a chain of FSTNs of the source ING. The FSTN may provide an identifier of (or some other descriptor of) the destination ING to the selected FPN. This information about the destination ING may have been provided to the FSTNs of the source ING by the control plane server, for example, which selected the destination ING for the migration. The FPN may use the information about the destination ING to identify a particular FSTN within the destination ING as the target to which the flow state information should be forwarded. The selected FSTN within the destination ING may receive the forwarded flow state information from the FPN, and cause the flow state information to be replicated at a chain of FSTNs in the destination ING during the migration workflow. After the migration workflow has completed and the default mode of operation is resumed for the application endpoint or VNI, flow state information of the various packet flows associated with that endpoint may be replicated only at the destination ING's exception-path nodes, and may no longer be replicated at nodes of the source ING.

Using the FPNs as intermediaries as described above may be effective and appropriate in various embodiments because, among other reasons, (a) FSTNs of the source ING may already communicate with FPNs for the packet flows during the default mode of operation, and replication of state information during the default mode may in several cases be triggered by queries from the FPNs, so the FSTNs may not need additional information informing them how to communicate with FPNs or which FPNs to communicate with regarding a given packet flow, (b) FPNs may already be aware of the membership of various INGs including the ING chosen as the destination of the migration, because a given FPN may have to rewrite packets of many different applications, and hence the FPNs may need to communicate with FSTNs in numerous INGs in the default modes of operations of those applications' endpoints, (c) FPNs may already have access to the algorithm required to select one of the FSTNs within a given ING as the first FSTN of a chain of flow state replication (again, because the FPNs have to identify such FSTNs in any case during default modes of operation) and/or (d) using FPNs as intermediaries may maintain the logical isolation between INGs, in that FSTNs in the source ING may not need to obtain details about membership of other INGs. However, the PPS may not be limited to using FPNs as forwarding intermediaries for all migration workflows; in some embodiments, for example, a fleet of inter-ING communication nodes may be set up and used, or FSTNs of the source ING may communicate directly with FSTNs of the destination ING.

In at least some embodiments, at least a subset of the FSTNs of different INGs may be configured within the same isolated virtual network of the VCS, enabling direct FSTN-to-FSTN communication without having to use resources or routes across IVNs. An isolated virtual network (IVN) may comprise a collection of networked resources (including, for example, compute instances used as PPS nodes) allocated to a given VCS client such as the PPS, which are logically isolated from resources allocated for other clients in other IVNs. The client on whose behalf an IVN is established may be granted substantial flexibility regarding network configuration for the resources of the IVN—e.g., private IP addresses for compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on.

An encapsulation protocol (e.g., a variant of the Generic Network Virtualization Encapsulation or Geneve protocol) may be used for communication between the various types of PPS nodes in some embodiments. In one embodiment in which an FPN is used as a forwarding intermediary for flow state information between INGs, a particular encapsulation protocol header may be used to indicate that a packet represents a forwarding request. The FPN receiving a packet may examine contents of the encapsulation protocol header of the packet to determine what kind of action the FPN should take with respect to the received packet—e.g., whether the FPN is to forward the received packet to a destination ING without applying a packet rewriting rule, or whether a packet rewriting rule is to be found and applied. The FSTN that sends the packet may store a particular value in the header before sending the packet to the FPN, which causes the FPN to forward the packet to the destination ING. As indicated above, FPNs may be provided membership information about various INGs in some embodiments, e.g., by control plane servers of the PPS; in at least some embodiments, the FPNs may also be provided an indication of a state information replication methodology or algorithm (e.g., indicating how many FSTNs should be included in a chain of replication within a given ING, how a first FSTN of a replication chain should be selected as the target FSTN to which the FPN should forward state information of a particular flow, and so on) of various INGs, enabling the FPN to choose the FSTN to which flow state information should be forwarded. In one embodiment, instead of or in addition to providing information about the state information replication methodology, an FPN may simply be provided an identifier (e.g., an IP address) of an FSTN to which the flow state information should be forwarded. According to some embodiments, FPNs may be provided health state information about the FSTNs in various INGs. The obtained health information may be used by an FPN to select a healthy FSTN to receive forwarded flow state information in one such embodiment—e.g., if the FPN determines that a particular FSTN which would (based on the state information replication methodology/algorithm of the destination ING) usually be selected to receive forwarded flow state information happens to be unhealthy or unresponsive, a different FSTN may be chosen as the recipient of forwarded flow state information by the FPN. In some embodiments, for different types of events that trigger the replication of flow state information of a given packet flow (such as cache misses at an FSTN in response to an FPN's query, cache hits at an FSTN, or expiration of a timer indicating that a periodic sync operation is to be initiated), different FPNs may be chosen as forwarding intermediaries by the FSTN that sends state information for forwarding.

In at least some embodiments, as indicated above, a PPS and/or a VCS may be implemented as one of a suite of services of a cloud provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS, which may be utilized for implementing nodes of a PPS, may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the CMS VCS (which remain at provider network data centers) to the extension location data plane servers in various embodiments.

The cloud provider network may implement various computing resources or services, which may include, in addition to the PPS and the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers, edge locations and/or extension locations of the provider network in different embodiments. Network-accessible computing services can include an elastic compute cloud service (referred to in various implementations as an elastic compute service, a virtual machines service, a computing cloud service, a compute engine, or a cloud compute service). Such a service may offer compute instances (also referred to as guest virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

In some embodiments, resources of the cloud provider network may be used to run software containers on behalf of clients. A software container represents a logical packaging of a software application that abstracts an application from the computing environment in which the application is executed. For example, a containerized version of a software application can include the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. The orchestration of such containerized applications may be conducted by a container management service or a container orchestration service of the provider network.

The traffic and operations of the cloud provider network (or individual services of the cloud provider network) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which packet processing workloads may be migrated between isolated node groups of a multi-layer packet processing service without disrupting the flows of application request and response packets, according to at least some embodiments. As shown, system 100 includes respective collections or pools of nodes of a fast-path layer 141, a flow state tracking layer 142, and a rewriting decisions layer 143 of a multi-layer packet processing service (PPS) 102. The flow state tracking layer and the rewriting decisions layers are collectively referred to as exception-path layers, and the nodes of the exception path layers are organized into a set of isolated node groups (INGs), such as ING 170A and ING 170B. ING 170A comprises flow state tracker nodes (FSTNs) 130A, 130B and 130C, as well as rewriting decisions nodes 140A and 140B in the depicted embodiment, while ING 170B comprises FSTNs 130K and 130L and RDB 140G. Data packets of a given application may typically be processed at a single ING during normal or default modes of operation (when migration workflows for ING workloads are not underway), without communications between INGs. Fast-path layer 141 comprises a plurality of fast path nodes (FPNs) 120A-120Z. In general, any desired number of nodes may be instantiated at any of the layers or tiers of the PPS. In the embodiment depicted in FIG. 1, each of the PPS nodes at the different layers may maintain a respective cache containing packet rewrite entries (indicating the rules to be applied to packets of different flows to transform the packets, packet flow state information and the like) such as cache 121A of FPN 120A, cache 131A of FSTN 130A, and cache 141A of RDN 140A. The cached information may enable faster processing of packet flows at the different layers. In some embodiments, at least some nodes at one or more of the layers may not maintain such caches.

The different layers 141, 142 and 143 may collectively be responsible for implementing a variety of packet rewriting directives on behalf of numerous clients, with each such directive being applicable to one or more flows comprising respective pluralities of packets. A given rewriting directive may for example contain or indicate one or more specific packet processing rules. In the depicted embodiment, one packet flow may be distinguished from another based on some combination of the following attributes: the network protocol used at least for the packets received at the PPS, the source and destination addresses, the source and destination ports, and/or the direction in which the packets are transmitted with respect to an application on whose behalf the packets are to be processed. For example, one or more rewriting directives may be generated and enforced in the depicted embodiment for packets originating at traffic origin set 110A (e.g., including traffic origins (TOs) 112A and 112J) and directed towards a traffic responder set 111A (e.g., traffic responder (TR) 113A). Similarly, a different rewriting directive may be implemented (e.g., concurrently with the rewriting directives being used for TO set 111A) for traffic originating at TO set 110B, such as TOs 112K and 112Q, and directed to traffic responder set 111B. A traffic responder set 111 may, for example, comprise a set of back-end servers implementing a particular application (e.g., application App1 in the case of TR set 111A, and application App2 in the case of TR set 111B) using some set of resources of a provider network, and the traffic origins may represent client devices from which requests for that application are sent. An entity responsible for the application (e.g., a customer or client of a provider network at which the PPS is implemented) may submit a request indicating a particular type of packet processing requirement (e.g., a multicast requirement, an anycast requirement, a load balancing requirement, a source address substitution requirement, or the like) to the PPS 102, and one or more directives comprising rules to fulfill the requirement may accordingly be generated for corresponding flows of received packets.

In some embodiments, respective directives may be generated for both directions of traffic flow between two sets of endpoints: e.g., one directive may be applied for packets originating at a traffic originator set 110 and directed towards a traffic responder set 111, and another directive may be applied for packets flowing from the responders back to the originators. In other embodiments, a given rewriting directive may contain respective elements or sub-rules for each direction of traffic. It is noted that in situations in which packets in both directions are transformed by the PPS, the roles of traffic "origins" and "responders" may be switched depending on the direction—e.g., when an entity or device receives a transformed packet from the PPS in the role of a responder, that same entity may subsequently send a packet to the PPS in the role of a traffic origin. In one embodiment, at least some of the PPS nodes used for packets transmitted in one direction (e.g., from a first set of hosts to a second set of hosts) may differ from the FMS nodes used for packets transmitted in the reverse direction (from the second set of hosts to the first set of hosts). For example, at least one node of the fast path layer, the flow state tracking layer and/or the rewriting decisions layer which participates in the process of transforming and routing packets flowing in one direction may not necessarily be used for packets flowing in the reverse direction. In some embodiments, at least at one of the PPS layers, there may be no overlap between the respective fleets of nodes used for the different directions of traffic.

Two examples of the paths that may be taken when responding to a packet received at the fast path layer are indicated in FIG. 1 to help explain the respective functions of the different layers. The arrows labeled "PNF" (pathway of a new flow), e.g., PNF-1, PNF-2, and the like represent the operations and messages that may result when the first packet of a particular flow (i.e., a flow for which a packet rewriting directive has not yet been generated) is received at the PPS. From among the FPNs 120A-120Z, a particular subset may be selected for a given client's packet processing requirement. One of the nodes from the subset (e.g., FPN 120D) may be selected for the first packet of a new packet flow originating at TO 112J, as indicated by the arrow PNF-1. FPN 120D may examine a local cache of rewrite entries, and determine that no entry applicable to the new flow exists in the cache. FPN 120D may then identify a particular FSTN 130B of a selected ING 170A to which a cache miss indicator is to be sent, as indicated by arrow PNF-2. As an entry point into the PPS, a respective virtual network interface (VNI) may be assigned in various embodiments, and mappings between the identifiers of such VNIs and INGs may be maintained at the FPNs, enabling an FPN to identify the ING to which a query for a rewriting entry should be sent. Within a given ING, which may contain several FSTNs, a particular FSTN may be chosen using a flow hashing-based technique in various embodiments. The FPN to which an application packet is sent may be chosen using any of a number of techniques such as client-based partitioning, shuffle-sharding and/or flow hashing. In some embodiments, respective subsets of the pool of FPNs may be assigned for different applications.

Upon receiving the cache miss indicator PNF-2, FSTN 130B may discover that it too does not have any indication of a rewriting directive for the new flow, and may send a request for a directive (e.g., the equivalent of its own cache miss) to a selected rewriting decisions node (RDN) 140B, as indicated by the arrow PNF-3. RDN 140B may look up the details of the client requirement associated with the new flow (e.g., in a repository of mappings between packet source/destination addresses and packet processing requirements, by querying a control plane component of the service being used to implement the targeted application at the traffic responders, or using other techniques). RDN 140B may generate a new rewriting directive comprising one or more packet rewriting rules corresponding to the requirement. The directive may indicate various characteristics of the packet or packets to be generated for each received packet of the new flow—e.g., how many packets are to be transmitted for each received packet, the networking protocol to be used for the transmitted packet or packets, the destination address/port, which address and port combination is to be used if the source address information of the received packets is to be changed, and so on.

In some implementations, the newly-generated directive may be replicated at several RDNs; such replication is not shown in FIG. 1. As indicated by arrow PNF-4, the RDN 140A may transmit the directive back to FSTN 130B, where a local copy of the directive may also be stored in at least some embodiments. In various embodiments, the directive may be replicated at multiple nodes of layer 142—e.g., FSTN 130B may cause the directive (which contains flow state information of the flow being processed) to be replicated at FSTN 130C. In the default or non-migration mode of operation, flow state information for the packet flows of a given application may be replicated at a plurality of FSTNs of a given ING assigned to the application, but may not be replicated across ING boundaries in such embodiments. In the depicted embodiment, the directive may be transmitted from one of the FSTNs at which it was replicated to FPN 120D (arrow PNF-6), where an entry representing the directive may be stored in the FPN's local cache. The received directive may then be implemented at FPN 120D: that is, one or more output or transformed packets corresponding to the packet that led to the cache miss may be generated and transmitted to a selected destination (as indicated by arrow PNF-7). In some embodiments, a response to the transformed packet or packets may be received at the packet transformation layer (e.g., at FPN 120D or at a different FPN to which the response packet is directed from TR 113A). If transformations are required to the response packets, they may be applied (e.g., using one or more elements of the same directive that was generated earlier in response to the cache miss) at layer 141, and the transformed response packets may be sent on to the traffic origin TO 112J.

The second example pathway illustrated in FIG. 1 is for a packet of an established flow—i.e., a flow for which a rewrite directive and associated flow state information has already been generated and propagated to one or more nodes of layer 141 at which the directive is to be applied. The arrows associated with this second flow are labeled PEF (pathway for established flow). As indicated by PEF-1, a packet of the established flow may be transmitted from a traffic origin 112K to FPN 120E. There, a rewrite entry for the flow may be found in the local cache. One or more outbound packets corresponding to PEF-1 may be generated according to the cached entry, and send to a destination TR 113B as indicated by arrow PEF-2. If and when additional packets of the established flow are received at FPN 120E, the directive may be reapplied, e.g., without further interactions with layers 142 or 143.

In at least some embodiments, the FPNs 120 may update metadata records corresponding to packets rewritten for various flows (e.g., indicating when the most recent packet of a given flow was processed as well as various other parameters discussed below in further detail) and transmit the contents of the metadata records (either in raw form, or in some compressed/aggregated form) to the FSTNs 130, as indicated by arrow 175A. Such metadata updates or refresh messages may be sent periodically in some implementations, e.g., once every K seconds, or in response to metadata update requests from layer 142. Such metadata refreshes may be among the events that trigger flow state information replications among nodes of the INGs in some embodiments. Similarly, as indicated by arrow 175B, representations of flow state metadata records may be transmitted from layer 142 to layer 143 in at least some embodiments, and may be used at the RDNs to make various choices required for the rewriting directives (e.g., the particular port or IP address to be used as a substitute for a source port, or a particular destination server to which the transformed packets of a load-balanced flow should be sent). For example, updates flow metadata may indicate to an RDN that a particular (address, port) combination that was being used for a particular client's packet processing requirement is no longer in use because a connection has been closed, and that (address, port) pair may subsequently be used for some other packet processing requirement of the same client or another client. The metadata may also be stored as part of the flow state information and replicated in local caches at one or more layers of the PPS.

In the embodiment shown in FIG. 1, the PPS 102 may include a set of control plane servers 151, including ING workload migration coordinators 152. The control plane servers may monitor various health and performance metrics collected at the INGs and the FPNs, and/or respond to programmatic requests for various administrative tasks including explicit requests from application administrators or PPS administrators to assign PPS nodes, INGs and/or VNIs to applications, initiate and orchestrate migrations of the workload of an application from one ING to another, and so on. In the embodiment depicted in FIG. 1, the PPS 102 may implement one or more control plane programmatic interfaces (e.g., application programming interfaces (APIs), web-based consoles, command-line tools, graphical user interfaces (GUIs) and the like) which may be used by clients to indicate various types of packet processing requirements and/or workload migration requirements. The nodes at the various layers of the flow management service may be implemented using virtual machines (e.g., compute instances hosted at a virtualized computing service) in some embodiments, and/or as un-virtualized machines.

The control plane servers 151 may be responsible for assigning FSTNs and RDNs to INGs in some embodiments. In at least one embodiment, a control plane server may assign a VNI as a client-side access point to an application, and then assign a selected ING to that VNI. The VNI may be configured to receive packets comprising application requests of the application, which may be implemented using one or more resources of the provider network at which the PPS is implemented. During a default mode of operation of the VNI, nodes of the assigned ING may process packets directed to the VNI without communicating with nodes of other INGs. Furthermore, during the default mode in at least some embodiments a particular node of an ING may cause flow state information of a particular packet flow of the application to be replicated at a subset of nodes of the ING (including the particular ING node itself). This subset of nodes may be referred to as a replication chain. As a result of such replication, a packet rewriting rule used for the flow, which is replicated as part of the flow state information, may be obtained from one of the other nodes of the chain in the event of a failure of one of the nodes.

In response to detecting that a workload migration criterion has been met for a particular ING, a migration procedure or workflow may be initiated by a control plane server such as a migration coordinator in the depicted embodiment. The criterion may for example be the reaching of a threshold resource utilization level at the nodes of an ING during some time interval in some embodiments, the reaching of a threshold imbalance among the workloads of different INGs, and/or be based on various other metrics and factors in different embodiments. The control plane server may select a different ING as a workload migration destination for the first ING (the migration source ING) in the depicted embodiment.

A short term migration-in-progress mode of operation (i.e., a mode of operation different from the default or normal mode) of the VNI may be initiated by the control plane server. During at least a portion of the migration-in-progress mode or migration workflow, flow state information of a given packet flow may replicated at respective subsets of nodes of both the source and destination INGs, thus temporarily expanding the replication chain across ING boundaries. During the migration-in-progress mode, network connections used for transmitting packets of the application may remain operational and may not be reset in various embodiments. Flow state information of a given flow may be used at the source ING may be used to response to requests from one or more FPNs, and flow state information of the flow may also be used at the destination ING to respond to other requests from one or more FPNs during the migration-in-progress mode of operation, e.g., during different phases of the migration workflow as discussed below. After the migration-in-progress mode of operation completes, the default mode of operation may be resumed, with nodes of only the destination ING (and not the source ING) being used for processing packets of the application.

In various embodiments, the control plane servers may provide communication policies to the nodes of a source ING to indicate how the flow state information should be replicated at the destination ING during the migration workflow. In some embodiments, for example, FPNs may be used as forwarding intermediaries for the flow state information.

For example, a node of the migration source ING may select a particular FPN in accordance with a communication policy, and send a message containing state information of a particular flow to that selected FPN with a header indicating that the contents of the packet should be forwarded to a specified destination ING. The FPN may then forward the message to a selected node of the destination ING in at least some embodiments.

Figure 2:
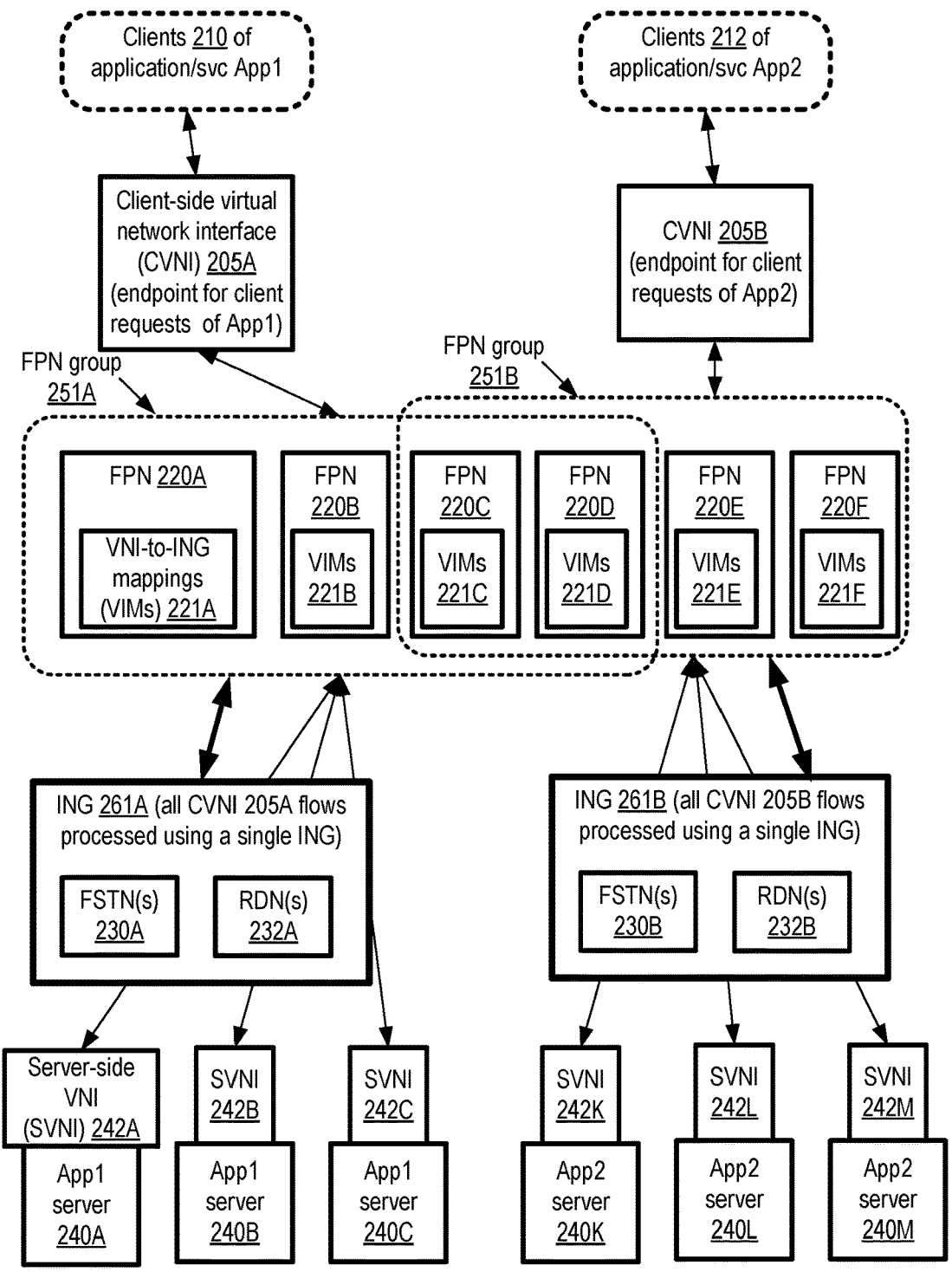
FIG. 2 illustrates an example scenario in which packets directed to a given client-side virtual network interface of an application may be processed using a single isolated node group of a packet processing service during a default mode of operation, according to at least some embodiments.

FIG. 2 illustrates an example scenario in which packets directed to a given client-side virtual network interface of an application may be processed using a single isolated node group of a packet processing service during a default mode of operation, according to at least some embodiments. In the embodiment depicted in FIG. 2, an ING 261A has been selected (e.g., by the PPS control plane servers) for processing packets of an application or service App1 implemented at a set of servers which includes App1 server 240A, App1 server 240B and App1 server 240C. Similarly, ING 261B has been assigned for processing packets of application or service App2, which is implemented at a different set of servers including App2 server 240K, App2 server 240L and App2 server 240M. A client-side virtual network interface (CVNI) 205A has been configured as an endpoint for client requests of App1, which originate at clients 210, and another CVNI 205B has been configured for client requests of App2, which originate at clients 212.

In the scenario shown in FIG. 2, respective server-side VNIs (SVNIs) have also been configured for each of the servers implementing the applications. For example, SVNIs 242A, 242B and 242C have been assigned to App1 servers 240A, 240B and 240C respectively, while SVNIs 242K, 242L and 242M have been assigned to App2 servers 240K, 240L and 240M respectively. A VNI may comprise a logical entity with a set of networking and security-related attributes that can be attached to (or detached from) a compute instance of a virtualized computing service and/or other types of servers programmatically. In some embodiments, each of the App1 servers and App2 servers may comprise compute instances to which SVNIs are programmatically attached. A VNI may also be attached to logical networking constructs such as load balancers (e.g., the CVNIs 205A and 205B may be attached to respective logical load balancers implemented using the PPS). At least one IP address IPaddr1 may be assigned to a given virtual network interface VNI1, and security rules restricting inbound and outbound traffic may be set for VNI1. When that VNI is programmatically attached to a given compute instance CI1 launched at a virtualization host with a physical network interface card NIC1, network packets indicating IPaddr1 as their destination address (and complying with the security rules) may be received at CI1 via NIC1. In addition, outbound packets generated at CI1 may indicate IPaddr1 as their source address and may be physically transmitted towards their destinations via NIC1. If VNI1 is then programmatically detached from CI1 and attached to a different compute instance CI2 (which is executing at a different virtualization host with a different physical network interface card NIC2), the IPaddr1 traffic that was previously being received at CI1 may now be received at CI2, with the same security rules in place. Support for virtual network interfaces may thus considerably simplify network configuration tasks. In the scenario shown in FIG. 2, the IP addresses of the CVNIs may differ from those of the SVNIs.

A respective FPN group may be assigned to each CVNI in the depicted embodiment. For example, FPN group 251A may be assigned to CVNI 205A, and FPN group 251B may be assigned to CVNI 205B. As shown, some FPNs may be assigned to several FPN groups—e.g., FPN group 251A may include FPNs 220A, 220B, 220C and 220D, while FPN group 251B may comprise FPN 220C, 220D, 220E and 220F. Thus, members of two or more FPN groups may potentially be used for processing packets of a given CVNI in the depicted embodiment. In contrast, only nodes of a single ING may be used for processing packets of a given CVNI during the default mode of operation of that CVNI in various embodiments. In at least some embodiments, the INGs may be configured in multi-tenant mode, in that traffic of multiple CVNIs may be processed at a given ING. In one embodiment, multiple CVNIs may be assigned for a single application or service; each such CVNI may be assigned a respective FPN group and a respective ING in such an embodiment.

Each of the FPNs shown in FIG. 2 may be provided VNI-to-ING mappings in the depicted embodiment, e.g., by the PPS control plane servers, enabling the FPNs to identify the specific ING whose nodes are to be used for packets directed to a given CVNI by clients, as well as for packets flowing in the reverse direction (e.g., from App1 servers or App2 servers to clients). Thus, VNI-to-ING mappings 221A, 221B, 221C, 221D, 221E and 221F are provided to FPNs 220A, 220B, 220C, 220D, 220E and 220F respectively. In addition to the VNI-to-ING mappings, the control plane may also provide algorithms or replication schemes/policies to the FPNs in some embodiments, which can be used to identify the specific FSTNs 230A or 230B to which queries regarding different packet flows should be directed within different INGs. Similarly, in at least some embodiments in which a given ING may comprise multiple RDNs 232A or 232B, policies/algorithms for selecting RDNs to which queries for rewriting rules/directives should be sent may be provided by the PPS control plane. During the default mode of operation of a given CVNI, only the nodes within a single ING may be employed for packets associated with (i.e., received at) that CVNI in the embodiment shown in FIG. 2.

Figure 3:
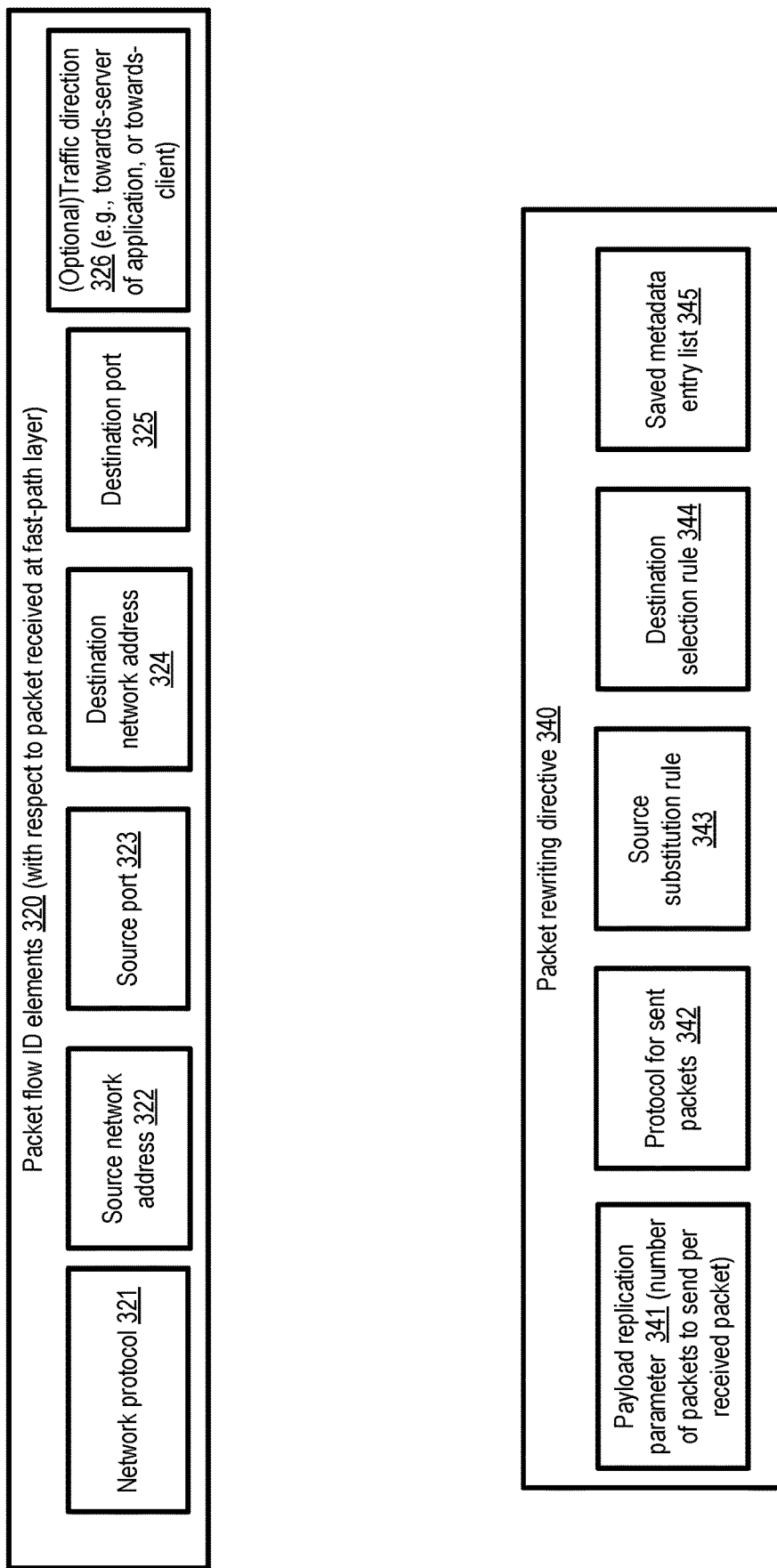
FIG. 3 illustrates examples of packet flow identifier attributes and example elements of a packet rewriting directive, according to at least some embodiments.

FIG. 3 illustrates examples of packet flow identifier attributes and example elements of a packet rewriting directive, according to at least some embodiments. A flow may be characterized (or distinguished from other flows) based on one or all of the following attributes of packets received at the fast path layer in the depicted embodiment: the network protocol 321 used for sending the packet to the fast-path layer tier, the source network address 322, the source port 323, the destination network address 324, the destination port 325, and/or the traffic direction 326 with respect to the application for which the packet processing is being performed (e.g., whether a packet represents a client request being sent towards a back-end server of an application, or whether the packet is being sent to a client device from a back-end server in response to an earlier request). In some embodiments the traffic direction 326 may be implied by or deduced from the source and destination addresses, and/or a VNI identifier A number of different networking protocols may be supported in different embodiments—e.g., including IP, the Transmission Control Protocol (TCP), the User Datagram Protocol (UDP), the Internet Control Message Protocol (ICMP) and the like. The particular combination of attributes 321-326 that are used to distinguish one flow from another for a given packet processing requirement or client may be referred to collectively as packet flow identifier elements 320. As mentioned earlier, the process of selecting a particular node from among the nodes of a flow management service's layers may include flow hashing in some embodiments. Some or all of the packet flow identifier elements of a given packet may be aggregated (e.g., via concatenation or using some other function) in some implementations, and the result of the aggregation may be provided as input to a selected hash function, with the output of the hash function used to select the particular node.

The PPS may support a variety of packet transformations in the depicted embodiment. A packet rewriting directive 340 produced at the rewriting decisions layer of the PPS and implemented/enforced at the fast-path layer may include any combination of several elements or parameters. The particular set of parameters used for a given client requirement may differ from the particular set of parameters used for a different requirement of the same client (or from the parameter set used for some other client's requirement). A payload replication parameter 341 may indicate how many replicas of a given received packet's contents or body are to be transmitted to respective destinations—e.g., if a multicast protocol is to be implemented by the PPS for a given client and the destination multicast group contains eight endpoints, the payload replication parameter may indicate that eight replicas are to be transmitted. By default, e.g., if the payload replication parameter is not included in the directive 340, a single outbound or transformed packet may be generated corresponding to each received packet. For some packet processing applications, the PPS may act as a protocol translator—e.g., incoming packets may be received via a particular networking protocol (such as TCP), while corresponding outgoing packets may be sent via a different protocol (such as UDP). The protocol for sent packets parameter 342 may indicate whether such a protocol change is to be implemented, and if so, the specific protocol to be used for the transformed packets. Source substitution rule 343 may indicate whether the source address and/or source port are to be changed, and if so, the acceptable source (address, port) range to be used for the transformed packets. Similarly, destination selection rule 344 may indicate whether the destination address and/or port is to be changed as part of the packet transformation, and if so, what the acceptable destination addresses and/or ports are for the flow for which the directive 340 was generated. In some cases (e.g., for multicast), multiple destinations may be indicated corresponding to a given received packet. The particular kinds of metadata to be collected for a given flow and stored as part of flow state information maintained at the PPS nodes of one or more layers may be indicated via saved metadata entry list 345 in the depicted embodiments. In some embodiments, at least some of the packet rewriting directives 340 may not include all the different elements shown in FIG. 3, and/or elements not shown in FIG. 3 may be included in one or more directives. In various embodiments, some or all of the components of a rewrite directive may be stored in a rewrite entry (also referred to as a flow state information entry) and cached at one or more layers of the PPS.

Figure 4:
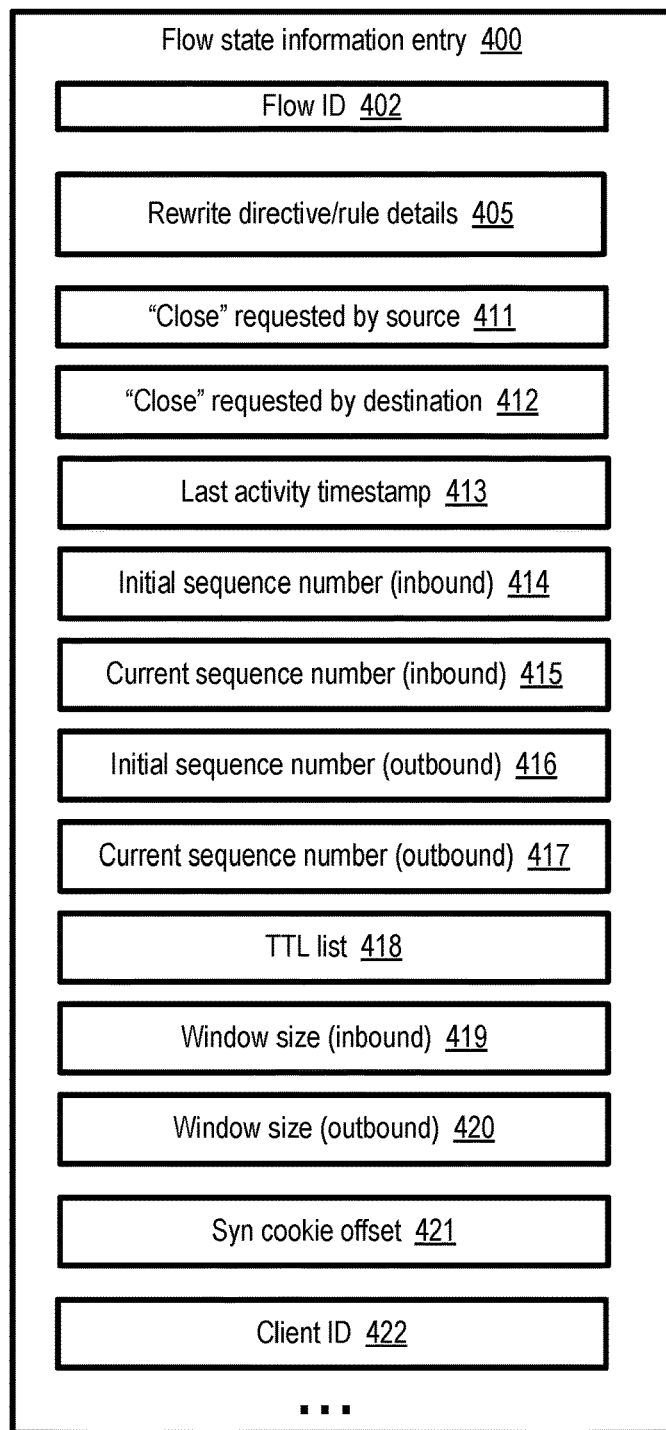
FIG. 4 illustrates example elements of state information which may be maintained at a packet processing service for a packet flow, according to at least some embodiments.

FIG. 4 illustrates example elements of state information which may be maintained at a packet processing service for a packet flow, according to at least some embodiments. Flow state information entry 400 may be generated for a particular flow, and the corresponding flow identifier 402 may be explicitly or implicitly indicated within the entry in the depicted embodiment. Flow state information entries may also be referred to as rewrite entries. An indication of the category of packet transformation being implemented for the flow (e.g., multicast, anycast, etc.) and the details of the rewriting directives (e.g., the particular source or destination addresses to be used for the transformation packets, etc.) to be implemented may be stored in element 405. In some embodiments, the rewrite directive details may comprise the values to be written into one or more headers of the packets, such as the destination IP address and port. Respective indications 411 and 412 as to whether either the source or destination has requested a "close" of a connection established between them may be included in entry 400 in the depicted embodiment. A last activity timestamp 413 may be included in the entry in some embodiments, which may for example be useful in cache replacement operations if an LRU algorithm is being used at various PPS nodes, and may also be useful in detecting whether a particular flow may have reached an error state (e.g., if no activity has been observed for a long time).

A number of fields associated with sequence numbers which may be used in some networking protocols may be included in the entry 400 in some embodiments. These fields may include, for example, the initial and current sequence numbers 414 and 415 respectively for inbound packets (e.g., packets received at the PPS from the sources or traffic origins associated with the flow), as well as the initial and current sequence numbers 416 and 417 for outbound packets (e.g., packets received at the PPS from traffic responders).

In some embodiments, the flow state information entries may also include metadata elements which can be used to detect and/or respond to one or more kinds of denial of service attacks. The IP TTL (time-to-live) value is a measure of how many hops a packet has traversed to reach the PPS. For the vast majority of legitimate flows, the IP TTL is very unlikely to change among the different packets of a given flow. For a small fraction of legitimate flows, there may be a few distinct TTL values. Thus, by tracking up to some small number N (e.g., four) unique IP TTL values per flow and rejecting packets with other TTLs, it may be easy to filter out packets associated with at least some types of denial of service attacks. Accordingly, a TTL list 418 with some configurable number of distinct TTL values seen for the flow may be maintained in the entry 400 in some embodiments. A denial of service attack may sometimes involve so-called "ACK Floods", in which large numbers of TCP packets with their "ACK" bits set may be sent to the FMS. ACK floods may be handled at least in part by dropping packets that do not have a matching rewrite entry in some embodiments. It may be possible to make this defense more effective by also tracking the TCP window size in either direction (e.g., using entries 419 and/or 420 in the depicted embodiment), and rejecting packets that are too far from the valid TCP transmission window. Denial of service attacks may also comprise illegitimate TCP SYN packets in some cases. Mitigating this type of attack may include responding to SYN packets with "SYN cookies". SYN cookies are SYN|ACK response packets that have a cryptographically generated sequence number. Denial of service attackers may typically ignore this response, but a legitimate sender (i.e., an entity that is not participating in a denial of service attack) may typically reply to it. If and when a reply to such a SYN/ACK response packet is received, the sender may be deemed to be legitimate. In at least some embodiments, a SYN cookie offset 421 may be included in a flow state information entry 400 to enable the FPN to modify the sequence and/or acknowledgement numbers of transformed packets in accordance with the use of a SYN cookie.

In the embodiment depicted in FIG. 4, a client identifier 422 (e.g., an account identifier or customer identifier associated with the sources and/or destinations of the flow) may also be maintained in at least some flow state information entries. In some implementations in which at least some of the packets received at the PPS include such client identifiers, the PPS nodes may verify that the client identifiers in the received packets match those stored in the entry 400, and may reject packets which do not indicate the expected client identifier. It is noted that in various embodiments, one or more of the elements shown in FIG. 4 may not be stored in the flow state information entries—e.g., if defending against denial of service attacks is not a priority for some PPS customers because all their traffic originates at a small set of sources, the TTL list, window size, or SYN cookie offset may not be required. In some cases, a flow state information entry 400 may include one or more elements not shown in FIG. 4. The particular kinds of metadata to be included in the flow state information entries associated with a given packet processing requirement may be determined in some embodiments by the rewrite decision nodes based on control plane interactions with PPS clients.

Figure 5:
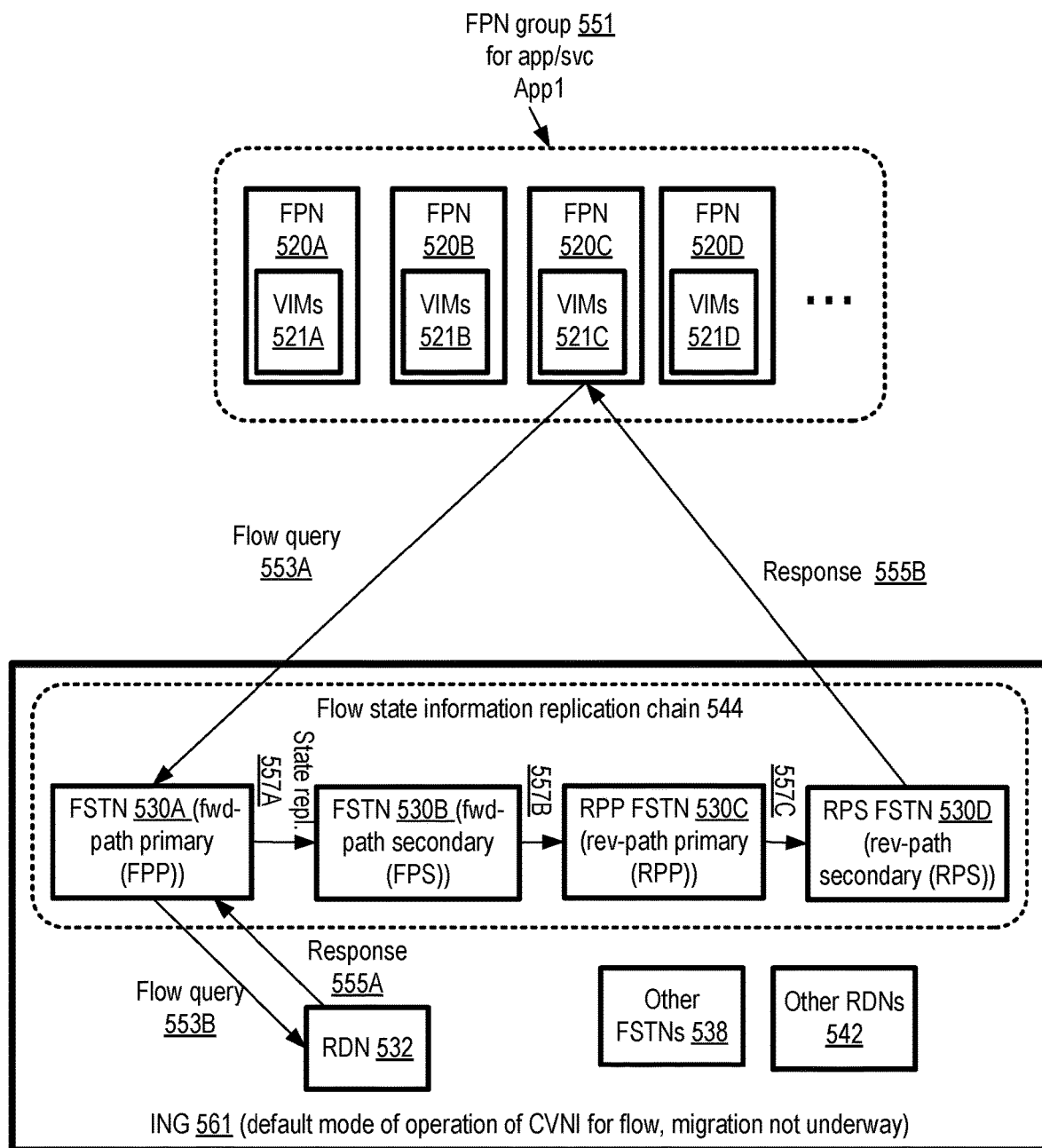
FIG. 5 illustrates an example of replication of state information associated with cache misses at a flow state tracker node during a default mode of operation of a client-side virtual network interface, according to at least some embodiments.

FIG. 5 illustrates an example of replication of state information associated with cache misses at a flow state tracker node during a default mode of operation of a client-side virtual network interface, according to at least some embodiments. FPN group 551, comprising FPNs 520A, 520B, 520C and 520D, is assigned to process packet flows of an application or service App 1 in the example scenario shown. Each of the four FPNs is provided respective VNI-to-IGN mappings (VIMs) 521A, 521B, 521C and 521D by the PPS control plane.

The first packet of a particular packet flow PF1 originating at an App1 client (containing a request to be fulfilled by a back-end server implementing App1) may be received at FPN 520C in the depicted scenario. FPN 520C may have been selected from among the FPNs of the FPN group 551 to receive the packets of PF1 using a flow hashing scheme. Because it is the first packet of a new flow, cached flow state including a rewriting rule for PF1 may not be found in FPN 520C's local cache. FPN 520C may consult VIMs 521C to identify the specific ING to which a flow query should be sent to obtain the rewriting rule and other flow state information in the depicted embodiment. ING 561 may be identified as the target ING to be used for PF1.

The set of packets of PF1 which originate at App1 clients and are directed to the App1 back-end servers may be designated as the "forward" path or direction of the flow, while packets sent from the App1 back-end servers to the App1 clients (for example, containing responses to client requests) may be designated as the "reverse" path or direction of the flow. Within ING 561, a particular FSTN may be selected by the FPN 520C as the FSTN to which the flow query should be directed, e.g., based on a replication scheme or FSTN selection algorithm provided by the control plane to the FPN in various embodiments. In the embodiment depicted in FIG. 5, flow state information of PF1 may be replicated at a total of four FSTNs, designated as the forward-path primary or FPP FSTN, the forward-path secondary or FPS FSTN, the reverse-path primary or RPP FSTN and the reverse-path secondary of RPS FSTN. Two FSTNs are chosen for each direction of the flow in some embodiments because, when using flow hashing, different FSTNs may be selected for flow queries by FPNs (in the event of a cache miss) depending on the direction of transmission of the packets, and at least two replicas of the flow state information entries may be maintained for each direction to enable rapid recovery from FSTN failures. A detailed example of forward and reverse direction of packet flows is provided in FIG. 6.

The FSTN selected as the destination for a flow query FSTN 530A for the first packet of the forward direction of the flow is selected as the FPP, FSTN 530B is chosen as the FPS, FSTN 530C is chosen as the RPP, and FSTN 530D is selected as the RPS. The information (replication scheme or FSTN selection algorithm) provided to the FPN 520C may enable the FPN 520C to identify the FPP FSTN 530A for flow PF1, and send flow query 553A for flow PF1 to the FPP FSTN 530A.

The FSTN 530A may not find flow state information for PF1 in its cache, and send a flow query 553B for PF1 to a selected RDN 532 in the depicted embodiment. RDN 532 may generate a packet rewriting rule/directive for PF1 based on App1 requirements provided by the PPS control plane, and send a response 555A to the FPP FSTN in the depicted embodiment. A flow state information entry (e.g., comprising some of the types of fields shown in FIG. 4) may be created for PF1 by the RDN 532A and sent in response 555A to the FSTN 530A in some embodiments. That flow state information entry, including the rewriting rule generated by the RDN 532 may then be propagated/replicated at the FPS FSTN, the RPP FSTN and the RPS FSTN, as indicated by state replication arrows 557A, 557B and 557C. These other members of the replication chain may be selected using various hashing-based algorithms in at least some embodiments, e.g., by the FPP FSTN and/or by the FPN itself. Each of the FSTNs may store a replica of the entry in their respective caches. The RPP FSTN may send at least a portion of the response 555B to the requesting FPN 520C, where the packet rewriting rule and/or other elements of the flow state entry may be stored in the FPN's cache. The packet rewriting rule may then be applied by the FPN 520C to send a transformed version of the first packet of PF1 to a destination (e.g., a server implementing App1). Subsequent packets of the flow may be transformed by the FPN using its cached rewriting rule, without needing to communicate with the ING 561.

During the default mode of operation of the client-accessible VNI (CVNI) used for the flow PF1, state information of PF1 may be replicated among the members of flow state information replication chain 544, and communication between ING 561 and any other Ings may not be required in the depicted embodiment. As discussed below, if/when a decision to migrate workload associated with that CVNI is made, a longer replication chain which includes FSTNs in a migration-destination ING may be used during the migration workflow. A given ING such as ING 561 may include other FSTNs 538 and/or other RDNs 542 than those included in any given state information replication chain in some embodiments—that is, in such embodiments, a subset of the nodes of the ING may be used as a replication chain, and not the entire set of nodes of the ING. In some implementations, a replication chain if RDNs may also be used—e.g., before a query response is sent to an FSTN from the rewriting decisions layer, copies of the state information entry contained in the response may also be replicated at several different RDNs.

Figure 6:
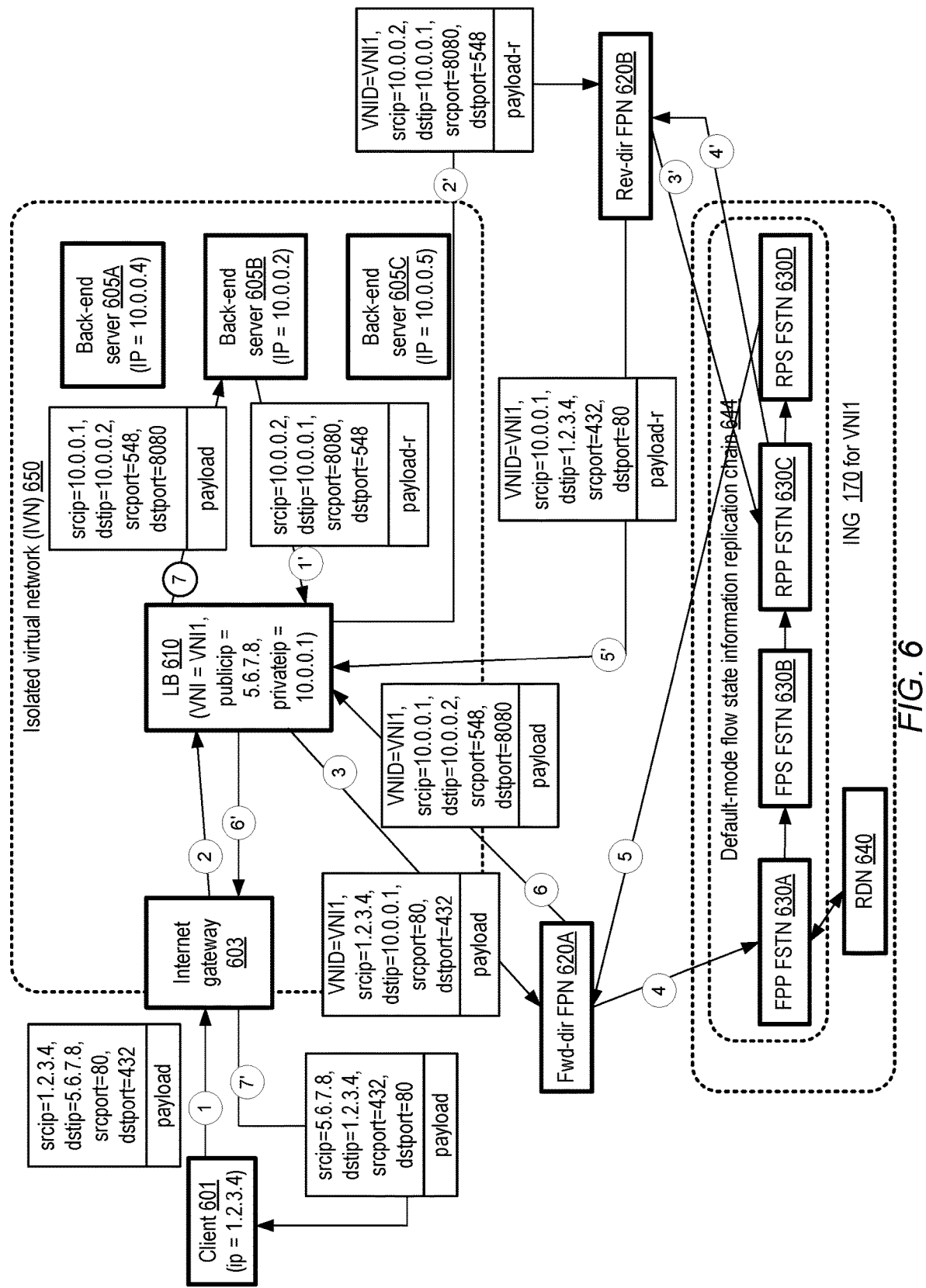
FIG. 6 illustrates an example flow of request and response packets for an application for which a packet processing service provides load balancing functionality, according to at least some embodiments.

As indicated earlier, various categories of packet processing functions may be implemented using a PPS in different embodiments, including anycast, multicast, address translation, protocol transforms, load balancing and the like. FIG. 6 illustrates an example flow of request and response packets for an application for which a packet processing service provides load balancing functionality, according to at least some embodiments. In the embodiment depicted in FIG. 6, a set of back-end servers including back-end servers 605A, 605B and 605C implements the logic of an application for which the PPS is used to direct client requests and application responses. The back-end servers are configured within an isolated virtual network (IVN) 650 of a virtualized computing service (VCS) of a provider network at which the PPS is implemented. Back-end server 605A is assigned a private IP address 10.0.0.4 within the IVN 650 (to be more specific, IP address 10.0.0.4 is assigned to a VNI programmatically attached to a compute instance used as the back-end server), back-end server 605A is assigned private IP address 10.0.0.2, and back-end server 605C is assigned private IP address 10.0.0.5.

IVN 650 comprises an Internet gateway 603, through which packets originating in the public Internet are routed to devices within the IVN, and through which outbound messages to destinations in the public Internet are routed from the devices of the IVN as well. A logical load balancer (LB) 610 has been established, e.g., by the PPS control plane and/or the VCS control plane, as the network entity to which requests of the application implemented at the back-end servers 605 should be directed by clients. A client-accessible VNI (CVNI) VNI1 has been configured for LB 610. A public IP address (publicip) 5.6.7.8, accessible from the public Internet, has been assigned to VNI1. In addition, a private IP address (privateip) 10.0.0.1 for communicating with entities within the IVN in the depicted embodiment has also been assigned to VNI1.

Clients in the public Internet may submit packets containing application requests (for which responses are generated at the back-end servers) to the public IP address of the load balancer. Packets flowing from the clients to the back-end servers are said to be moving in the forward direction with respect to the application, and packet containing responses to the application requests are said to be moving in the reverse direction.

An application client 601 in the public Internet has an IP address 1.2.3.4, and sends an application request to the LB 610, as indicated by the arrow labeled 1. The source IP address (srcip) of the packet is 1.2.3.4, the destination IP address (dstip) is the LB 610's public IP address 5.6.7.8, the source port (srcport) is 80, and the destination port is 432. The payload portion of the packet contains the application request.

The internet gateway 603 forwards the packet to LB 610, as indicated by the arrow labeled 2. To determine how the packet should be processed, the LB 610 sends a version of the packet to a forward-direction (fwd-dir) FPN 620A of the PPS (arrow 3), chosen from an FPN group designated for the application. The VNI ID VNI1 of the LB is included in the packet, and the destination IP is set to the private IP address 10.0.0.1 of the LB.

FPN 620A has VNI-to-ING mappings provided by the PPS control plane. The FPN 620A has a cache miss, and sends a flow query indicated by arrow 4 to a forward-path primary (FPP) FSTN 630A of a default-mode flow state information replication chain 644 within an ING 170 designated for VNI1 traffic in the depicted embodiment. That is, ING 170 is selected as the ING to which the flow query should be sent based on the mapping of VNI VNI1 to ING 170. At the ING 170, a rewriting rule for the flow to which the packet belongs is generated by an RDN 640, and a flow state information entry for the flow is replicated at the FPP FSTN 630A, the FPS FSTN 630B, the RPP FSTN 630C and the RPS FSTN 630D. The flow state information entry may be stored in a cache or store implemented as a key-value store in some embodiments at the FPP and FPS, with the key for the forward flow state information being (srcip: 1.2.3.4, dstip: 10.0.0.1, srcport: 80, dstport: 432) and the value including the rewritten headers (srcip: 10.0.0.1, dstip: 10.0.0.2, srcport: 548, dstport: 8080)). The RPP and RPF FSTNs may reverse the keys and values when storing the information in their stores/caches in the depicted embodiment, with the flow key being set to (srcip: 10.0.0.1, dstip: 10.0.0.2, srcport: 548, dstport: 8080) and the value including the rewritten headers (srcip: 1.2.3.4, dstip: 10.0.0.1, srcport: 80, dstport: 432).

The response containing the rewriting rule/value may be provided to the FPN 620A (arrow 5), and a rewritten version of the packet may be generated using the rule and transmitted to the LB 610 (arrow 6). In this rewritten version, the LB may be informed that the packet should be forwarded to the IP address 10.0.0.2 of a selected back-end server 605B, with the destination port being set to 8080. The source IP address of the rewritten version of the forward direction packet is set to the private IP address of the LB (10.0.0.1) (so that the response to the application request contained in the packet may be sent by the back-end server to the LB for transmission on to the client) and the source port is set to 548. These values of the source and destination addresses and ports may be chosen based on the logic of the rewriting rule (e.g., a rule implementing a technique for load balancing among the back-end servers), which in turn may be derived (at the RDN 640) based on application requirements indicted by the client. The LB 610 may then send the rewritten packet on to the selected back-end server 605B for processing (arrow 7).

The back-end server 605B may extract the payload from the packet, and generate a response to be included in the payload of a reverse-direction packet. Arrows 1', 2', 3' etc. designate the transmission of reverse-direction packets in FIG. 6, and payload-r indicates the payload containing the response to the application request packet received at the back-end server. As indicated in the packet corresponding to arrow 1', the source and destination fields are flipped relative to the fields in the packet that was received at the back-end server 605B—the destination IP is now the source IP, the source IP is the destination IP, and so on.

The LB 610 may send a version of the packet to a reverse-direction (rev-dir) FPN 620B. In this version, the VNI ID VNI1 is again included. Because the source and destination header values are flipped, a different FPN 620B may be chosen for the reverse direction of the flow than was chosen for the forward direction (FPN 620A). Similarly, to determine what to do with the packet, the reverse direction FPN 620B may identify a different FSTN (the reverse-path primary FSTN 630C) as a destination for a flow query (arrow 3') within ING 170 than was chosen for the forward direction. ING 170 may be chosen based on the mapping of BNI1 to ING 170 in the set of VNI-to-ING mappings provided to FPN 620B by the PPS control plane. The flow state information entry (which may contain the same fields regardless of the direction of the flow) may be found in the RPP FSTN's cache (where it may have been cached using the flipped key, relative to the forward path, as indicated above), and a response to the flow query comprising the packet rewriting rule for the reverse direction may be sent to the reverse-direction FPN (arrow 4'). The rewritten packet may be sent to the LB 610 by the FPN 620B (arrow 5'). The LB may remove the VNI information from the packet, substitute the LB's public IP address in place of the private address 10.0.0.1, and send the response on to the client via the Internet gateway (arrows 6' and 7'). Note that the operations shown in FIG. 6 represent default-mode behavior, when a migration workflow for CVNIs associated with ING 170 is not underway.

Figure 7:
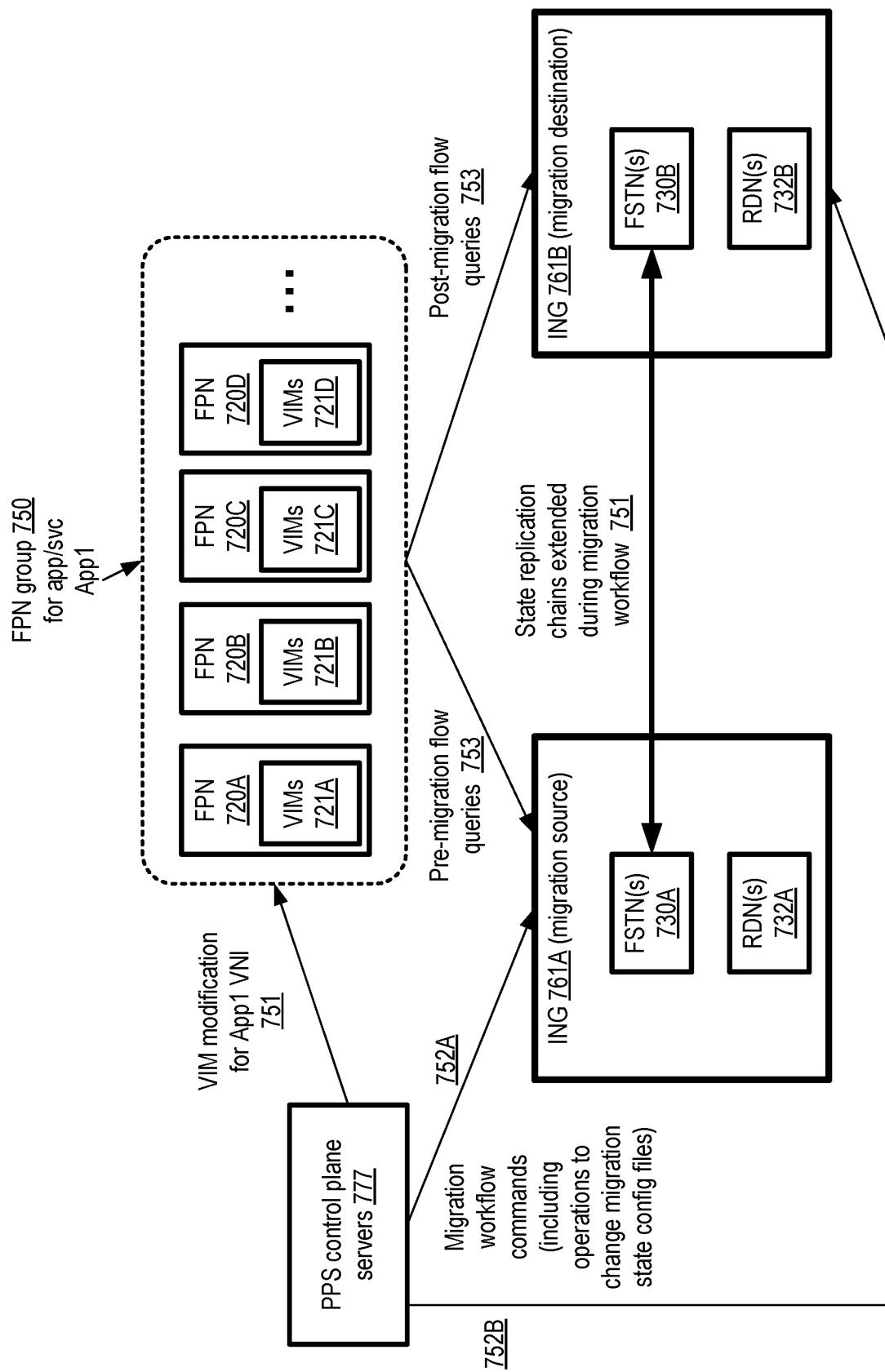
FIG. 7 illustrates an overview of a migration of workload associated with a client-side virtual network interface of an application from one isolated node group to another, according to at least some embodiments.

FIG. 7 illustrates an overview of a migration of workload associated with a client-side virtual network interface of an application from one isolated node group to another, according to at least some embodiments. PPS control plane servers 777 may make the decision to migrate at least a portion of the workflow of an ING 761A (the migration source ING) to another ING 761B (the migration destination ING). As indicated above, traffic associated with a number of client-accessible VNIs (CVNIs) and applications may be processed during the default or non-migration mode of operation at a given ING such as 761B. The workload associated with each such CVNI may be migrated independently of, and at least in some cases concurrently with, the migration of workload associated with other CVNIs for which the ING has been assigned.

At a high-level, the migration of workload for a given CVNI of an application App1 may include the following kinds of operations in various embodiments. The VNI-to-ING mappings (VIMs) 721 of the FPN group 750 being used for the flows of App1 may be updated by PPS control plane servers as indicated by arrow 751. For example, VIMs 721A, 721B, 721C and 721D of FPNs 720A, 720B, 720C and 720D may all be updated based on messages received from the control plane servers. Migration workflow commands 752A and 752B may be sent to the nodes of the source ING 761A and/or the destination ING 761B to orchestrate a multi-phase migration workflow. Details of various phases of migration workflows that may be implemented in various embodiments are provided below.

ING 761A may comprise FSTNs 730A and RDNs 732A, while ING 761B may comprise FSTNs 730B and RDNs 732B in the depicted embodiment. Pre-migration flow queries 753 from FPNs of FPN group 750 may be directed exclusively to ING 761A. During the migration workflow, flow state replication chains may be extended, and may include a subset of FSTNs 730A and a subset of FSTNs 730B at the two INGs. During different stages of the migration workflow, flow state queries for a given flow of a given CVNI may be directed by FPNs to, and processed at, either ING as discussed below, using the flow state entries that are replicated at both INGs. After the migration workflow completes, post-migration flow queries for the CVNI may be processed at a single ING, the destination ING 761B. Note that in a large-scale distributed system, it may be impractical to expect or require full synchronization between all the nodes of an ING or an FPN group at all times, so the extent to which the migration workflow has processed at different nodes of the PPS may differ at any given point in time in various embodiments, although eventually all the nodes of INGs and the FPN groups involved may converge in various embodiments. The fact that the nodes may not be fully synchronized at some points in time adds to the challenge of the migration of ING workflows without allowing connections to be reset or packets to be dropped. Details of the manner in which such seamless migrations are orchestrated are provided below.

Figure 8:
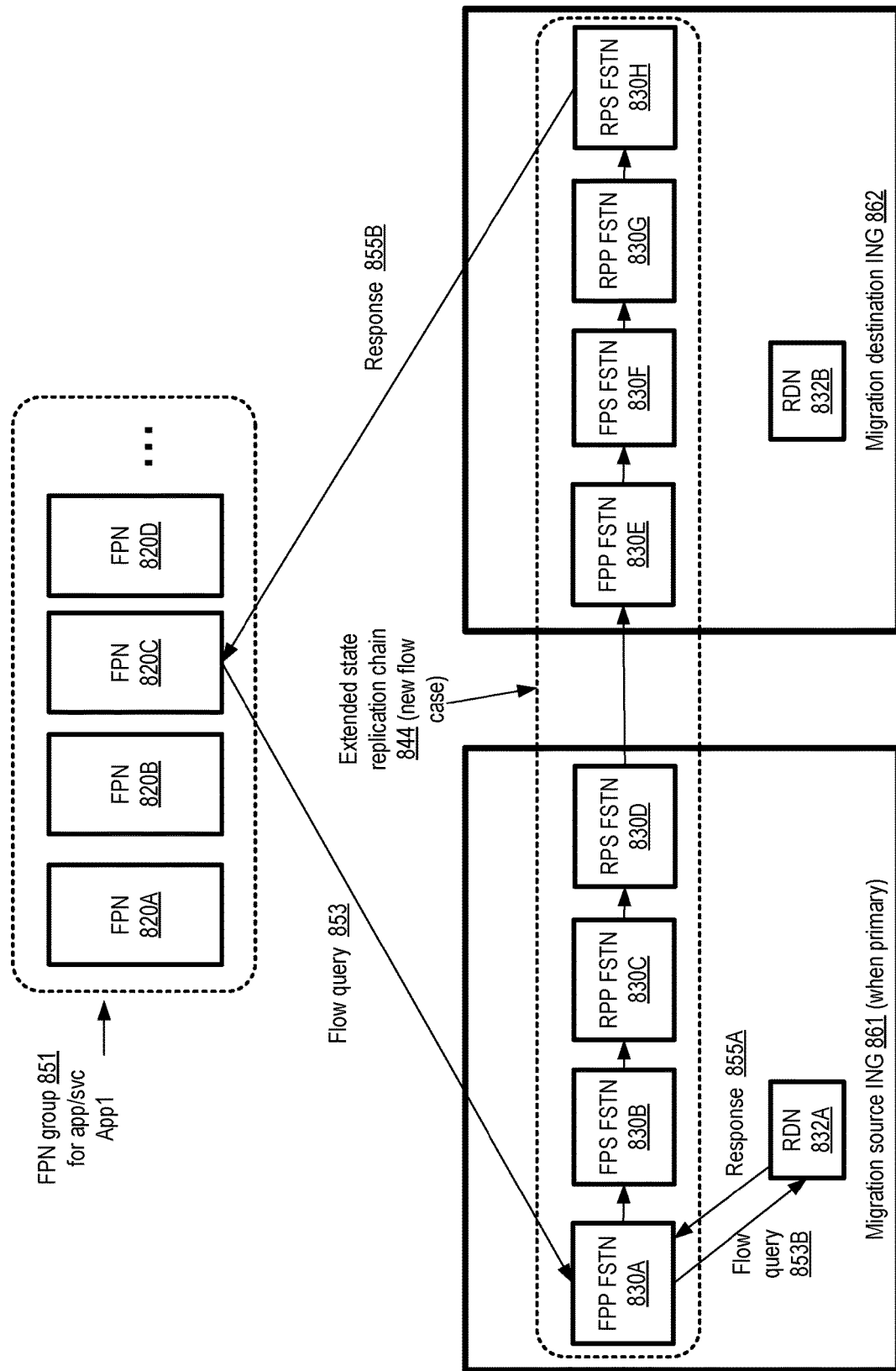
FIG. 8 illustrates an example of extended replication of state information associated with cache misses at a flow state tracker node during a migration workflow of a client-side virtual network interface, according to at least some embodiments.

FIG. 8 illustrates an example of extended replication of state information associated with cache misses at a flow state tracker node during a migration workflow of a client-side virtual network interface, according to at least some embodiments. In various embodiments, flow state information replication may be triggered due to various types of events, one of which is the occurrence of a cache miss at an FSTN when the FSTN tries to find a packet rewriting rule for a flow for which a flow query has been received from an FPN. Other events that lead to the replication of flow state information or the refreshing of flow state information at various replication chain nodes are discussed below, e.g., in the context of FIG. 9 and FIG. 10.

In the scenario depicted in FIG. 8, a migration workflow has been initiated for a CVNI to which a migration source ING 861 was assigned, and migration destination ING 862 has been chosen to assume the workload associated with the CVNI. The set of messages illustrated in FIG. 8 may be transmitted during a phase of migration in which the migration source ING 861 is still designated as the primary ING (details of the phases and the changes in primary versus secondary status for INGs are provided below). An FPN group 851 comprising FPNs 820A, 820B, 820C and 820D has also been assigned to the workload associated with the CVNI. An FPN 820C may receive a packet of a flow for which no entries are found in the FPN's cache, so the FPN may send a flow query 853 for a rewriting rule for the flow to an FPP FSTN 830A of the migration source ING 861. The FPP FSTN 830A may also detect a cache miss at its own cache of flow state information entries, and may send flow query 853B to an RDN 832A within ING 861. A response 855A comprising a packet rewriting rule may be sent from the RDN 832A to the FPP FSTN.

Just as the flow state information entry which includes the packet rewriting rule may be replicated during the default mode of operation at four FSTNs of an ING designated for a CVNI in the scenario depicted in FIG. 5, the flow state information entry provided by RDN 832A is also replicated during the migration workflow at four FSTNs in the migration source ING 861 in the depicted embodiment. However, in addition to being replicated at the four FSTNs of the source ING, the entry may also be replicated at another set of four FSTNs in the migration destination ING during the migration workflow in at least some embodiments, resulting in an extended state replication chain 844 for the case where a new flow is encountered and a cache miss occurs at the FPP FSTN. Thus, for example, the entry may be replicated at FPP FSTN 830A, FPS FSTN 830B, RPP FSTN 830C, and RPS FSTN 830D in the migration source ING 861, and also at FPP FSTN 830E, FPS FSTN 830F, RPP FSTN 830G, and RPS FSTN 830H in the migration destination ING 862. A number of different techniques may be used for communication across ING boundaries in different embodiments, e.g., for the entry to be propagated from RPS FSTN 830D to FPP FSTN 830E. The migration destination ING 862 may include one or more RDNs such as RDN 832B in the depicted embodiment, although such RDNs may not participate in the replication of flow state information during migration workflows in at least some embodiments. A response 855B comprising the rewriting rule may be sent from the RPS FSTN 830H of the migration destination ING 862 to the FPN 820C whose flow query led to the cache miss at the FPP FSTN 830A in the scenario depicted in FIG. 8.

Figure 9:
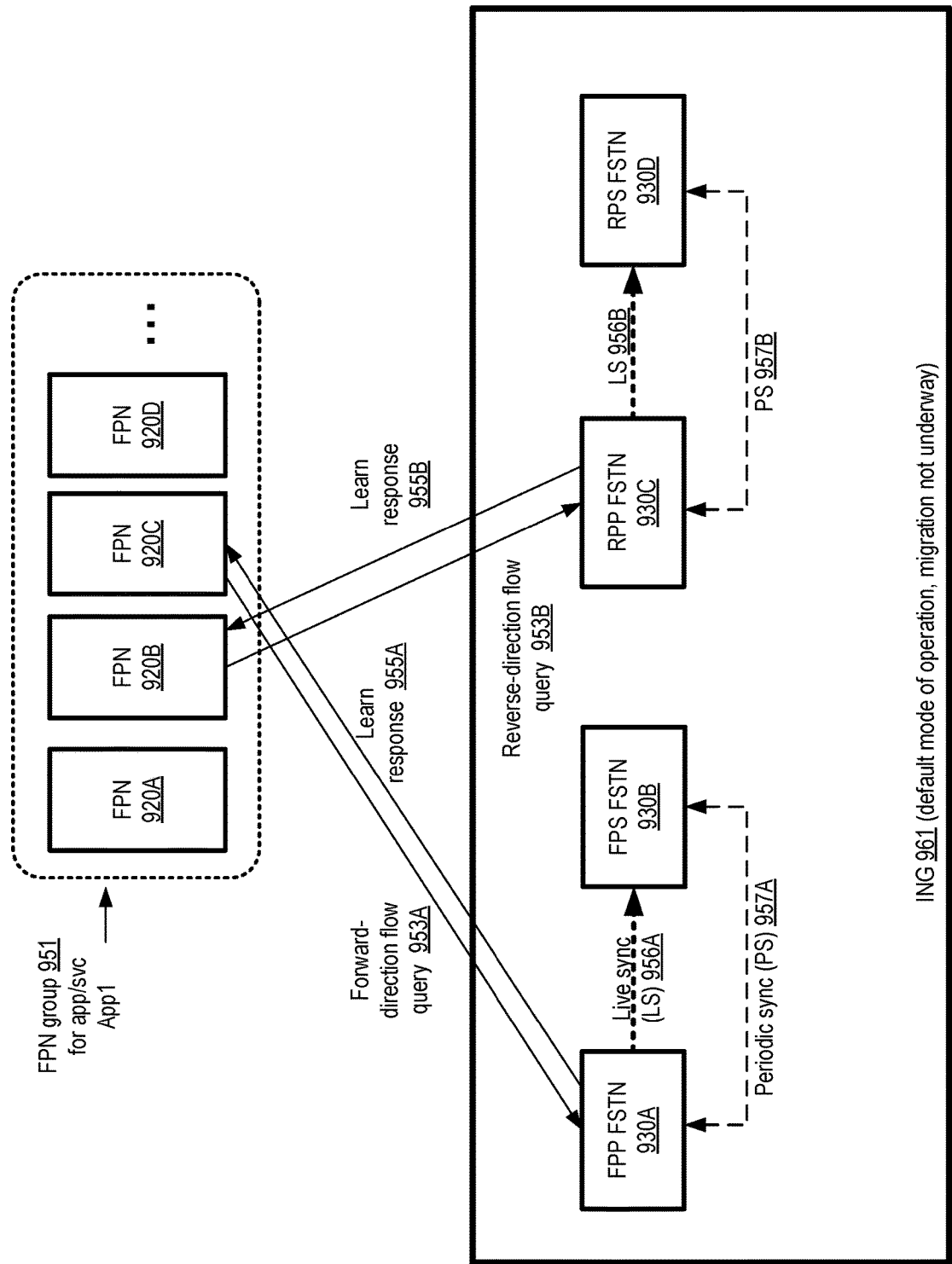
FIG. 9 illustrates additional examples of replication of state information, associated with events other than cache misses during a default mode of operation of a client-side virtual network interface, according to at least some embodiments.

FIG. 9 illustrates additional examples of replication of state information, associated with events other than cache misses during a default mode of operation of a client-side virtual network interface, according to at least some embodiments. In the depicted embodiment, an FPN group 951 (comprising FPNs 920A, 920B, 920C and 920D) and an ING 961 (comprising at least four FSTNs) have been assigned to process traffic associated with a client-side virtual network interface of an application App1. FPN 920C may receive a packet of an existing packet flow (a flow whose packets have been processed earlier at the PPS) EPF1 from a client of App 1. Even though packets of EPF1 have been processed earlier, so a rewriting rule may have been generated for EPF1, the FPN 920C may nevertheless detect that its cache does not contain the rewriting rule for EPF1 in some cases, e.g., because the entry for EPF1 has been evicted from the cache. A forward-direction flow query 953A may be sent by FPN 920C to the FPP FSTN 930A for the flow. The FPP FSTN 930A may discover that its cache does contain the rewriting rule needed by FPN 920C (i.e., a cache hit may occur at the FPP FSTN), so it may send the rewriting rule (e.g., as part of a flow state information entry similar to the entry shown in FIG. 4) in a "learn" response 955A to FPN 920C. The learn response may in effect instruct the FPN to learn or retain the flow state information of EPF1 for potential re-use later. In at least some embodiments, in the event of a cache hit of this type, the FPP FSTN may send a live sync (LS) message 956A containing the flow state information entry of EPF1 to the FPS FSTN 930B, thereby replicating or refreshing the slow state information for EPF1 at the FPP FSTN.

Cache hits at the RPP FSTN in response to flow queries for existing flows may also result in similar updates/refreshes of flow state information in various embodiments. For example, if FPN 920B receives a reverse-direction packet of EPF1 and does not find an entry for EPF1 in its cache, it may send a reverse-direction flow query 953B to RPP FSTN 930C. If RPP FSTN 930C has a cache hit (i.e., finds the required flow state information entry in its cache), RPP FSTN 930C may send a learn response 955B containing the flow state information entry to FPN 920B, and send a live sync message LS 956B to RPS FSTN 930D to replicate the latest version of the flow state information at the RPS FSTN.

In addition to live sync messages, periodic sync (PS) messages may also be exchanged between FSTNs in some embodiments to ensure that multiple FSTNs have the latest version of flow state information for various flows. The triggering event for sending a PS message may be the detection that a certain amount of time has elapsed since the last transfer of the flow state information of a given flow or a given set of flows between an FPP FSTN and an FPS FSTN, or between an RPP FSTN and an RPS FSTN. Unlike the replication of state information in response to a cache miss at an FSTN (as shown in FIG. for the default mode of operation of a CVNI), or the replication of state information in response to a cache hit at an FSTN (accomplished using LS messages), PS messages may not be sent in response to a cache lookup required for a flow query. FPP FSTN 930A may send a PS message 957A containing its latest flow state information entry for a packet flow to FPS FSTN 930B periodically (e.g., if it has not sent an LS or a PS within the previous T seconds, and has not received a PS from FPS FSTN in the previous T seconds), for example. Similarly, RPP FSTN 930C may send a PS message 957B containing its latest flow state information entry for a packet flow to RPS FSTN 930D periodically (e.g., if it has not sent an LS or a PS within the previous T seconds, and has not received a PS from RPS FSTN in the previous T seconds). The secondary FSTNs (FPS FSTN 930B or RPS FSTN 930D) may also send PS messages containing flow state information based on similar timing considerations to the corresponding primary FSTNs (FPP FSTN 930A or RPP FSTN 930C) in some embodiments. The PS messages may be useful, for example, in re-populating caches of the FSTNs after an FSTN has resumed operations (with an initially empty cache) after a failure or crash, for example.

In some embodiments, in addition to LS messages, FIN sync messages may also be sent by primary FSTNs to the corresponding secondary FSTNs. A FIN sync message may be sent, for example from an FPP FSTN to an FPS FSTN, when an FPN informs the FPP FSTN that a connection has been closed (using a FIN packet) by a client, or an FPN informs the RPP FSTN that a connection has been closed by a back-end server. Receiving an indication that a connection has been closed may lead the primary FSTN to delete the corresponding flow state entry from its cache in such embodiments; similarly, receiving a FIN sync message for a flow may result in the removal of flow state information of the flow from the caches of the secondary FSTNs.

Figure 10:
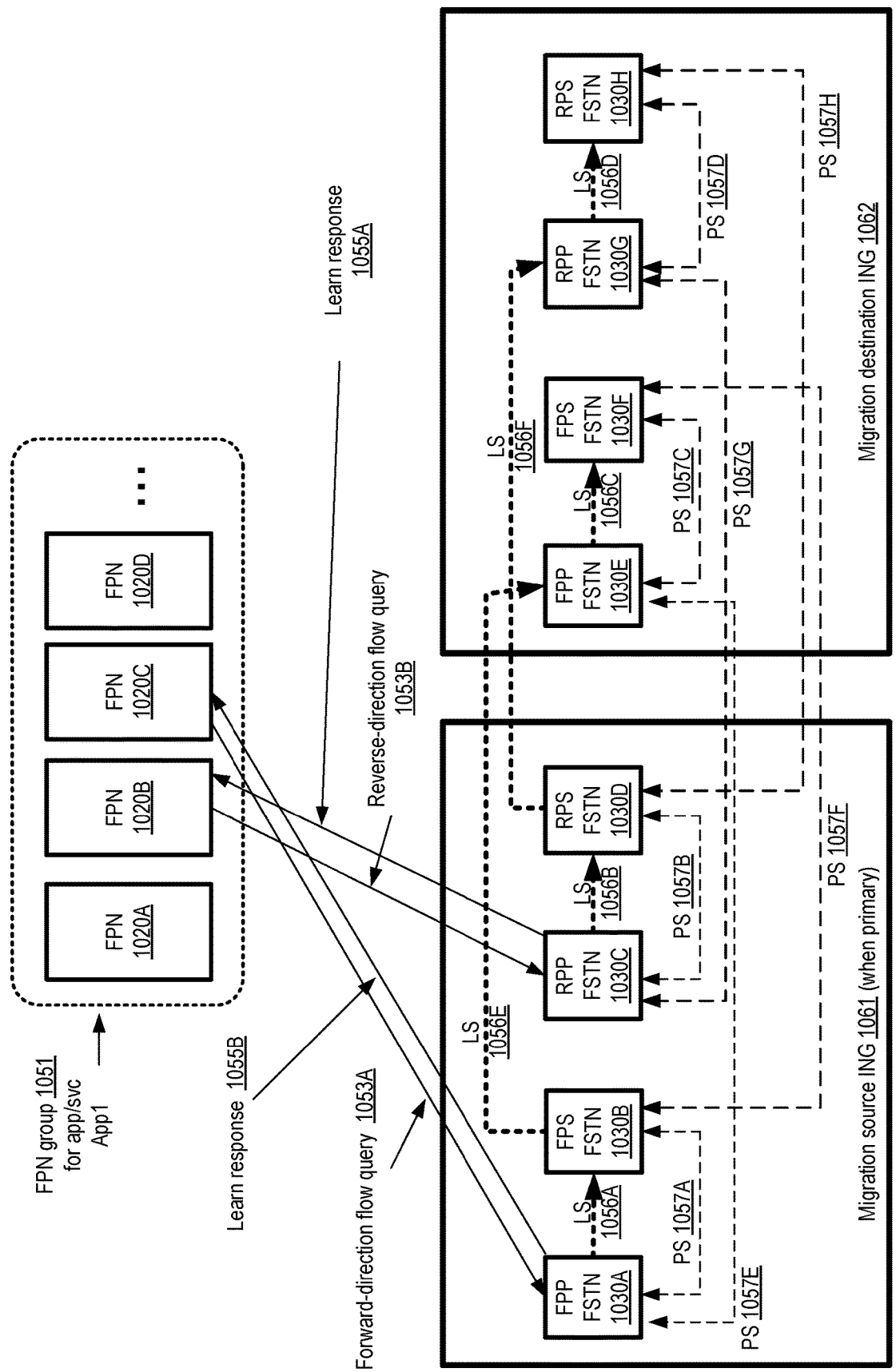
FIG. 10 illustrates additional examples of extended replication of state information, associated with events other than cache misses during a migration workflow of a client-side virtual network interface, according to at least some embodiments.

FIG. 9 illustrated the use of LS and PS messages for updating/refreshing replicas of flow state information entries within a single ING during the default mode of operation. Just as the flow state information replication chain was extended across during migration workflows when a cache miss occurred at an FPP FSTN, the updating/refreshing of flow state may also be extended across ING boundaries during migration workflows. FIG. 10 illustrates additional examples of extended replication of state information, associated with events other than cache misses during a migration workflow of a client-side virtual network interface, according to at least some embodiments. FPN group 1051 comprising FPNs 1020A, 1020B, 1020C and 1020D has been assigned for processing packets of an application App1. A migration of the workload associated with a CVNI of App1 has been initiated from migration source ING 1061 (which happens to remain the primary ING during the phase of migration illustrated in FIG. 10) to migration destination ING 1062 in the example scenario depicted in FIG. 10.

In response to a cache miss at FPN 1020C, a forward-direction flow query 1053A is sent to FPP FSTN 1030A of the migration source ING in the depicted embodiment. The FPP FSTN 1030A finds the requested flow state information in its cache, and sends a learn response 1055B to FPN 1020C. In addition, FPP FSTN 1030A sends an LS message 1056A to FPS FSTN 1830B to refresh the state information (of the flow for which the cache hit occurred at the FPP FSTN 1030A) at FPS FSTN 1030B. Because the migration is underway, the FPS FSTN 1030B sends a corresponding LS message 1056E to the FPP FSTN 1030E of the migration destination ING 1062. The FPP FSTN 1030E then sends a corresponding LS message 1056C to the FPS FSTN 1030F of the migration destination ING. Thus, LS messages are sent during migration workflows in the event of a cache hit at the FPP FSTN so as to synchronize flow state information not only at the FPP and FPS of the migration source ING, but also at the FPP and FPS of the migration destination ING.

Similarly, in the event of cache hits at the RPP FSTN of the migration source ING (in response to a reverse-direction flow query 1053B from FPN 1020B), the RPP FSTN may send a learn response 1055A to the requesting FPN. LS messages 1056B, 1056F, and 1056D and may be sent, respectively, from RPP FSTN 1030C to RPS FSTN 1030D, from RPS FSTN 1030D to RPP FSTN 1030G, and from RPP FSTN 1030G to RPS FSTN 1030H during the migration workflow in the depicted embodiment. FIN sync messages may also be sent along similar paths in various embodiments.

PS messages may be sent to refresh/update flow state information across ING boundaries during the migration workflow as well in the depicted embodiment. For example, in response to similar events (such as expirations of timers indicating that the time elapsed since a previous exchange of flow state information between the FSTNs has reached or exceeded a threshold) as those discussed with respect to PS messages in the context of FIG. 9, PS messages 1057A, 1057E, 1057C and 1057F may be transmitted, respectively, between FPP FSTN 1030A and FPS FSTN 1030B, FPP FSTN 1030A of the migration source ING 1061 and FPP FSTN 1030E of the migration destination ING 1062, FPP FSTN 1030E and FPS FSTN 1030F, and FPS FSTN 1030B and FPS FSTN 1030F. Similarly, PS messages 1057B, 1057G, 1057D and 1057H may be transmitted, respectively, between RPP FSTN 1030C and RPS FSTN 1030D, RPP FSTN 1030C of the migration source ING 1061 and RPP FSTN 1030G of the migration destination ING 1062, RPP FSTN 1030G and RPS FSTN 1030H, and RPS FSTN 1030D and RPS FSTN 1030H. In general, PS messages may be sent in the depicted embodiment between all possible pairs of forward-direction FSTNs in both the migration source and migration destination INGs, and between all possible pairs of reverse-direction FSTNs in both the migration source and migration destination INGs.

Figure 11:
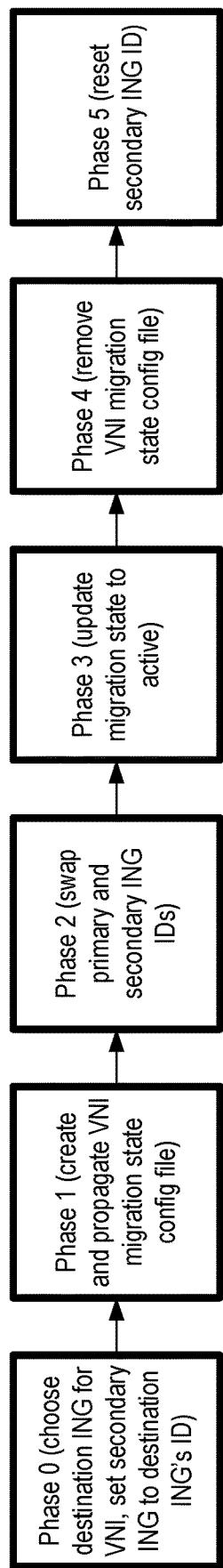
FIG. 11 illustrates an overview of phases of a migration workflow of a client-side virtual network interface, according to at least some embodiments.

In various embodiments, the migration workflow with respect to a given CVNI may comprise a sequence of carefully orchestrated phases to ensure that both new and existing flows continue to be handled seamlessly (e.g., without causing connection resets and without dropping packets) while flow state information is being replicated at the migration destination ING. FIG. 11 illustrates an overview of phases of a migration workflow of a client-side virtual network interface, according to at least some embodiments. In phase 0, a destination ING may be selected by the PPS control plane in response to detecting that a criterion for the migration has been met. A metadata field may be set (by or at the request of a control plane server) at the FPNs of the FPN group assigned to the CVNI, and/or at the FSTNs of both the source and destination INGs, indicating that the migration destination ING (identified by its ING ID) has been temporarily designated as a secondary ING for the CVNI's flows. The migration source ING may remain the primary ING for the CVNI's flows—that is, the FPNs may continue directing flow requests to the FSTNs of the migration source ING in the event of cache misses at the FPNs.

In phase 1, VNI migration state configuration files or artifacts may be created at and/or propagated among the FSTNs of both the INGs in the depicted embodiment. These artifacts may indicate the source and destination INGs of the migration for the CVNI, and indicate whether the migration is still in a passive state (indicating that the destination ING has not yet fully taken over the responsibilities for handling FPN requests) or has entered an active state (indicating that the destination ING is responsible for handling all FPN requests). Note that in general, not all the FSTNs and/or FPNs being used for the CVNI's traffic may all reach the same phase of the migration workflow at the same time; some FSTNs and/or FPNs may lag behind others due to reasons such as the extent to which they are busy handling existing or new flows, the extent to which communications with the control plane may take different amounts of time for different PPS nodes, and so on. In some embodiments, the PPS control plane may abandon a migration if the PPS nodes involved in the migration fail to reach a targeted migration phase for a time period that exceeds the threshold, or for example if a given PPS node falls more than one phase behind other PPS nodes.

In phase 2, the primary and secondary ING IDs may be swapped at the FPNs, e.g., at the command of the PPS control plane in some embodiments. This may in effect direct the FPNs to start directing flow queries to FSTNs within the migration destination ING. In phase 3, the migration state may be changed to active with the migration state configuration files/artifacts at the FSTNs, indicating that the FSTNs of the migration destination ING are to handle all flow state queries from FPNs. In phase 4, the VNI migration state configuration files/artifacts may be removed from the FSTNs in various embodiments. In phase 5, the secondary ING ID that was stored at the FPNs during the migration workflow may be removed. Further details regarding how existing and new packet flows are processed during phases 1, 2 and 3 are provided below; the other phases primarily involve changes to configuration settings/artifacts, and do not result in changes to the manner in which packets are processed relative to the previous phase, so additional details about phases 0, 4 and 5 are not provided below. Note that in various embodiments, different phases of the workflow may proceed as soon as the previous phase (if there is a previous phase) completes, with no gaps or pauses between the phases. The successful completion of a given phase may be determined, for example, by ascertaining that the content of the configuration information (VNI-to-ING mappings, primary and secondary ING settings, migration state being set to active or passive in the migration state config files, etc.) maintained at the FPNs and FSTNs has reached a set of values expected for that phase.

FIG. 12 illustrates operations performed for new and existing flows during phase 1 of a migration workflow of a client-side virtual network interface, according to at least some embodiments. The left part of FIG. 12 illustrates how new flows are handled during phase 1 of a workflow similar to that shown in FIG. 11 when workload associated with a VNI xyz is being migrated, and the right part of FIG. 12 indicates how existing flows are handled. The VNI-to-ING mapping 1221 stored at the FPNs indicates that VNI xyz is mapped to ING 1261 (i.e., that the ING 1261 is the primary ING, and that flow queries should therefore be sent to ING 1261). The migration state configuration files (MSCs) 1241A and 1241B at the source and destination ING FSTNs for VNI xyz indicate that xyz's workload is being migrated to ING 1262 (hence the "to:1262") from ING 1261 (hence the "from:1261"), and the state of the migration is currently passive. In some embodiments, each of the FSTNs may be responsible for obtaining the MSCs from a storage service or other source indicated by the PPS control plane. Existing and new connections may be processed initially at the source ING, and flow state information may be forwarded from the source ING to the destination ING in phase 1 in the depicted embodiment.

For a new flow, FPN 1220 sends a flow query 1255 to an FSTN at the migration source ING 1261. The FSTNs at the ING 1261 obtain the rewriting rule (e.g., with the help of an RDN), replicate a response message with a flow state information entry comprising the rewriting rule at a chain of FSTNs within ING 1261, and also cause the response message to be replicated (as indicated by response replication 1256) at a chain of FSTNs at migration destination ING 1262. The flow query response 1257 is sent to the FPN 1220 from an FSTN at the migration destination ING 1262.

For an existing flow, the FPN 1220 may send a flow query 1275 to the migration source ING 1261, and receive a learn response 1277 from the ING 1261. The migration source ING FSTNs may transmit live sync messages among themselves, and also send live sync messages 1276 to corresponding FSTNs in the migration destination ING. FIN syncs may be sent from the migration source ING to the migration destination ING in some embodiments. Periodic sync messages 1267 may also be transmitted among the FSTNs assigned for the forward and reverse directions of various flows in the two INGs 1261 and 1262, as discussed earlier in the context of FIG. 10.

FIG. 13 illustrates operations performed for new and existing flows during phase 2 of a migration workflow of a client-side virtual network interface, according to at least some embodiments. The left part of FIG. 13 illustrates how new flows are handled during phase 2 of a workflow similar to that shown in FIG. 11 when workload associated with a VNI xyz is being migrated, and the right part of FIG. 13 indicates how existing flows are handled. The primary and secondary ING IDs stored at the FPNs have been switched or reversed in phase 2. The VNI-to-ING mapping 1321 stored at the FPNs thus indicates that VNI xyz is now mapped to ING 1262 (i.e., that the ING 1262 is the primary ING, and that flow queries should therefore be sent to ING 1262). The migration state configuration files (MSCs) 1341A and 1341B at the source and destination ING FSTNs for VNI xyz continue to indicate that xyz's workload is being migrated to ING 1262 (hence the "to:1262") from ING 1261 (hence the "from:1261"), and the state of the migration remains passive. At least some existing and new connections may be processed initially at the destination ING, and flow state information may be forwarded from the destination ING to the source ING in phase 2 in the depicted embodiment. Note that because the VNI-to-ING mapping may not have been changed at some FPNs as quickly as at other FPNs, some FPNs may continue to send their flow queries to the source ING in some embodiments.

For a new flow, after the primary and secondary ING IDs have been switched at an FPN 1220, the FPN 1220 sends a flow query 1355 to an FSTN at the migration destination ING 1262. Because the state of the migration is still passive, the FSTNs at the ING 1262 may send a forwarded flow query 1356 to ING 1261. At ING 1261, the rewriting rule for the new flow may be obtained (e.g., with the help of an RDN), a response message containing the rewriting rule may be prepared and replicated at a chain of FSTNs. The flow query response 1357 may then be forwarded to ING 1262 from ING 1261. At ING 1262, the response may be replicated at a chain of FSTNs, and the forwarded flow query response 1358 may be sent to the FPN 1220. Thus, in phase 2, the FPNs may start directing their flow queries to the destination ING, but the rewriting rules may still be generated and replicated first at the source ING in the depicted embodiment.

For an existing flow, the FPN 1220 may send a flow query 1375 to the migration destination ING 1262, and receive a learn response 1377 from the ING 1262. The migration destination ING FSTNs may transmit live sync messages among themselves, and also send live sync messages 1376 to corresponding FSTNs in the migration source ING. FIN syncs may be sent from the migration destination ING to the migration source ING in some embodiments. Periodic sync messages 1367 may also be transmitted among the FSTNs assigned for the forward and reverse directions of various flows in the two INGs 1261 and 1262, as discussed earlier in the context of FIG. 10.

FIG. 14 illustrates operations performed for new and existing flows during phase 3 of a migration workflow of a client-side virtual network interface, according to at least some embodiments. The left part of FIG. 14 illustrates how new flows are handled during phase 3 of a workflow similar to that shown in FIG. 11 when workload associated with a VNI xyz is being migrated, and the right part of FIG. 14 indicates how existing flows are handled. In phase 3, the migration state configuration files 1441A and 1441B at the FSTNs of both INGs may be updated to indicate that the migration state is now active for VNI xyz, and as a result, both new flows and existing flows may be handled primarily by the destination ING, with flow state information being replicated at the source ING (in case some MSC artifacts have not yet been updated to reflect the active status). The VNI-to-ING mapping 1421 stored at the FPNs continues to indicate that VNI xyz is mapped to ING 1262 (i.e., that the ING 1262 is the primary ING, and that flow queries should therefore be sent to ING 1262). At least some existing and new connections may be processed initially at the destination ING, and flow state information may be forwarded from the destination ING to the source ING in phase 2 in the depicted embodiment.

For a new flow, the FPN 1220 sends a flow query 1455 to an FSTN at the migration destination ING 1262. Because the state of the migration is now active, the FSTNs at the ING 1262 obtain the rewriting rule for the new flow (e.g., with the help of an RDN) without forwarding the request to the ING 1261. A response message containing the rewriting rule may be prepared and replicated at a chain of FSTNs at ING 1262. The flow query response may then be replicated at ING 1261 from ING 1262, as indicated by response replication message 1456. At ING 1261, the response may be replicated at a chain of FSTNs, and the forwarded flow query response 1457 may be sent to the FPN 1220. Thus, in phase 3, the FPNs may continue to direct their flow queries to the destination ING, and the rewriting rules may now also be generated and replicated first at the destination ING in the depicted embodiment.

For an existing flow, the FPN 1220 may send a flow query 1475 to the migration destination ING 1262, and receive a learn response 1477 from the ING 1262. The migration destination ING FSTNs may transmit live sync messages among themselves, and also send live sync messages 1476 to corresponding FSTNs in the migration source ING. FIN syncs may be sent from the migration destination ING to the migration source ING in some embodiments. Periodic sync messages 1467 may also be transmitted among the FSTNs assigned for the forward and reverse directions of various flows in the two INGs 1261 and 1262, as discussed earlier in the context of FIG. 10.

FIG. 15 is a flow diagram illustrating aspects of operations which may be performed to configure isolated node groups for packet processing applications, and to utilize the isolated node groups during default modes of operation with respect to client-side virtual network interfaces, according to at least some embodiments. As shown in element 1501, a pool of FPNs and a pool of exception-path nodes (EPNs) of a PPS of a cloud provider network, similar in features and functionality to PPS 102 of FIG. 1, may be established. For example, the pools, which may be considered data plane resources of the PPS, may be set up by control plane servers of the PPS. The EPNs include FSTNs and RDNs. The FPNs cache packet rewriting rules generated by the RDNs and provided to the FPNs by the FSTNs, apply the rules to received packets, and deliver the rewritten versions of the packets to destinations (e.g., back-end servers implementing applications for which requests generated by application clients are in the received packets, or clients to whom responses to application requests are to be sent) selected according to the rules. The FTSNs may maintain state information of the flows (including for example the rewriting rules themselves, activity timestamps, sequence numbers, window sizes, client identifiers, etc.) and act as intermediaries between the RDNs and the FPNs. At least some of the applications whose packets are processed using the PPS may be implemented using resources (e.g., compute instances or virtual machines of a virtualized computing service (VCS)) of the provider network in some embodiments. Each of the FPNs, FSTNs and/or RDNs may maintain caches of flow state information, so that cached flow state information can be used to quickly respond to requests directed at the nodes from other layers of the PPS, or (in the case of the FPNs) to rewrite packets quickly for transmission to their intended destinations. The rewriting rules generated by the RDNs may be used to implement a variety of packet processing tasks in different embodiments, including for example anycast operations, multicast operations, source address substitution, load balancing, implementing a cross-isolated-virtual-network channel, or providing connectivity via a virtual private network (VPN) connection.

The pool of EPNs may be subdivided or partitioned into a collection of INGs in some embodiments, with each ING comprising some number of FSTNs and some number of RDNs (element 1504). In some embodiments, each ING may comprise the same number of FSTNs as each of the other INGs, and/or the same number of RDNs as each of the other INGs. In other embodiments, some INGs may comprise more FSTNs than other INGs, and/or more RDNs than other INGs, so ING populations may differ. The nodes of different INGs may be logically isolated from each other in the sense that during default or normal modes of operation, messages pertaining to processing of packets associated with a given application to which a client-side virtual network interface (CVNI, also referred to as an application endpoint) has been assigned are processed at a single ING using VNI-to-ING mappings provided to FPNs by the control plane servers, with no cross-ING messages being transmitted. Such isolation may be beneficial, for example, in that a failure/outage at a given ING may impact at most those applications whose CVNIs are mapped to that ING, and may not impact applications whose CVNIs are mapped to other INGs.

A particular CVNI may be assigned to an application implemented at least in part using the provider network resources in the depicted embodiment, e.g., in response to a programmatic response from an application owner to the PPS control plane or the VCS control plane (element 1507), and a particular ING may be assigned to the CVNI. Assignment of an ING to a CVNI may result in the FSTNs of that ING providing packet rewriting rules to FPNs assigned to process packets of that CVI; thus, the control plane's decision to assign a particular ING to a CVNI may in effect cause the nodes of that ING to take up the exception-path workload associated with the CVNI. In some embodiments, a group FPNs may also be assigned to the application. However, in at least one embodiment, while an FSTN or an RDN can only belong to one ING, an FPN may belong to several FPN groups, so FPN groups may not be isolated in the same sense as the INGs in such embodiments. In some embodiments, one or more INGs may be configured in multi-tenant mode, and a given such ING may be assigned to multiple CVNIs. In one embodiment, multiple CVNIs may be assigned to a single application. Respective VNIs may also be assigned to the resources (e.g., back-end servers) at which the application whose packets are being processed is implemented, and/or to individual FPNs, FSTNs and RDNs. In at least some embodiments, FPNs, FSTNs, and/or RDNs may also be implemented using respective compute instances of a VCS. In one implementation, a given FPN, FSTN or RDN may comprise one or more processes or threads running at a virtualized or physical server.

The term "default mode of operation of a CVNI" or "normal mode of operation of a CVNI" may denote a time interval in which a migration workflow of the workload of the CVNI from one ING to another is not underway; the time period during which a migration workflow has been initiated and is underway may be referred to as a "migration-in-progress mode of operation" of the CVNI. During a default or normal mode of operation, state information for various packet flows of the application for which the CVNI has been assigned may be replicated across several FSTNs (e.g., a chain of 4 FSTNs including a forward-path primary (FPP) FSTN, a forward-path secondary (FPS) FSTN, a reverse-path primary (RPP) FSTN and a reverse-path secondary (RPS) FSTN) of the ING assigned to the CVNI (element 1511). The flow state information may be replicated using several types of messages in different embodiments, including for example flow state response replication messages containing newly generated rewriting rules obtained from an RDN, live synchronization (live sync) messages, FIN synchronization (FIN sync) messages, and periodic synchronization (periodic sync) messages of the kind described earlier. Each of the messages that results in the replication or refreshing of flow state information may originate at one of the FSTNs of the chain, e.g., in response to an event such as a cache miss at the FSTN in response to a flow request from an FPN, a cache hit at the FSTN in response to a flow request, or detection that an elapsed time since a previous synchronization has exceeded or reached a threshold. The flow state information may be replicated so that in the event of a failure of an FSTN, the state information for flows handled by that FSTN can be obtained from other FSTNs. State information may not be replicated across ING boundaries during the default mode of operation in various embodiments.

Control plane servers of the PPS may collect and analyze various types of metrics from the PPS nodes during the default mode, and make re-configuration decisions with respect to FPNs and EPNs as needed based on the analysis of the metrics (element 1514). Such re-configuration decisions may for example include adding nodes to an FPN group or an ING, removing nodes from an FPN group or an ING, and/or migrating workloads associated with some CVNIs from one ING to another.

FIG. 16 is a flow diagram illustrating aspects of operations which may be performed to migrate workloads associated with client-side virtual network interfaces from one isolated node group to another, according to at least some embodiments. As shown in element 1601, a control plane server (CPS) of a PPS similar in features and functionality to PPS 102 of FIG. 1, may determine that a workload migration criterion has been met for an ING ING1 of the PPS. Responsibility for exception-path processing of packets associated with a set of CVNIs (also referred to as application endpoints) of one or more applications may have been assigned earlier to ING1 by the PPS control plane. The CPS may for example collect and analyze various types of metrics and use the results of the analysis to reach the migration decision in some embodiments. The migration decision may be reached, for example, because a resource utilization metric of ING1 (such as the average CPU utilization, memory utilization or network utilization) exceeds a threshold over some time interval, because a workload imbalance metric associated with ING1 and one or more other INGs exceeds a threshold (e.g., that the number of packets being processed per second at ING1 over a recent time interval exceeds the average number of packets being processed at other INGs by a substantial margin) and/or determining that a maintenance event (such as a software or hardware upgrade) associated with ING1 is scheduled. Based on the detected criterion, the CPS may determine that at least a portion of the workload of ING1 should be transferred or migrated to a selected destination ING ING2. The migration of the workload may be orchestrated on a per-CVNI basis in some embodiments. For example, out of N CVNIs whose traffic is being processed at ING1, the CPS may decide to migrate the traffic of (N-k) CVNIs in one embodiment; as such, in at least some cases, the CPS may decide to migrate the workload of some CVNIs, and not to migrate the workload of other CVNIs to which ING1 has been assigned. The subset of CVNIs whose workload should be migrated may be decided by the CPS based on factors similar to those used for making the migration decision in some embodiments. In some embodiments, for one or more migration criteria, all the workload of a given ING (including workloads associated with all the CVNIs to which the ING was assigned) may be migrated to one or more other INGs. The particular destination ING to which the workload of a given CVNI should be migrated may be selected based on a variety of factors in different embodiments—for example, ING2 may be selected for migrating workload of a given VCNI based on a recent resource utilization metric of ING2, the number of VCNIs to which ING2 is assigned currently, the number of active connections whose packets are being processed using ING2, a packet processing rate metric ING2 over a recent time interval, and/or a metric of hardware resource overlap between ING1 and ING2. With respect to hardware resource overlap, for example, if some nodes of ING2 share the same server rack as nodes of ING1, this may mean that transferring workload from ING1 to ING2 may not be as beneficial as it would be if the nodes of ING2 were not on the same rack as ING1 nodes.

The CPS may initiate a multi-phase migration workflow for the workload associated with each of one or more CVNIs mapped to ING1 in the depicted embodiment (element 1604). The migration workflows for several CVNIs may be implemented at least partly concurrently or in parallel in some embodiments. In some cases, if the workload of multiple CVNIs such as CVNI1 and CVNI2 is to be migrated away from ING1, different destination INGs may be selected for the respective CVNIs—e.g., CVNI1 may be migrated to ING2, while CVNI2 may be migrated to ING3. A migration workflow may comprise phases similar to the phases introduced in FIG. 11 in various embodiments, with transitions between the phases being gated for example by updates to configuration settings such as VNI-to-ING mappings at FPNs and migration configuration files/artifacts at FSTNs. The overall objectives of the migration workflow may include ensuring that, during the time it takes to transfer flow state information to the migration destination ING ING2, connections being used for the application packet flows that were being processed at ING1 are not reset or terminated, and that existing packet flows as well as any new packet flows initiated during the workflow are processed according to the rewriting rules in use for the applications.

During at least a part of the migration workflow associated with a given CVNI VNI1, state information of a packet flow F1 that was being processed using ING1 may be replicated in both ING1 and ING2 (element 1607)—e.g., in a chain of four FSTNs in ING1 and an extended chain of four FSTNs in ING2 as discussed earlier. During the migration workflow the VNI-to-ING mappings stored at FPNs may be modified in a controlled manner so as to avoid dropping packets of any new or existing flow, and migration state configuration (MSC) artifacts stored at the FSTNs of ING1 and ING2 may also be modified in a controlled manner so as to avoid dropping packets of any new or existing flow. Connections being used for the packets associated with a CVNI being migrated may remain operational and may not be reset in various embodiments. The replication of flow state information at both ING1 and ING2 may enable the nodes of one or both INGs to perform exception-path packet processing for new or existing flows at different phases of the workflow as discussed earlier, e.g., in the context of FIG. 12, FIG. 13 and FIG. 14.

After the migration workflow completes and the default mode of operation is resumed with respect to a given CVNI whose workload was migrated to ING2, ING2 may be used for processing packets of all flows associated with the CVNI, with no messages or state information replication required between ING2 and ING1, and packet rewriting rules being generated at ING2's RDNs for new flows and provided to FPNs being used for the CVNI for caching and implementation (element 1611).

Figure 17:
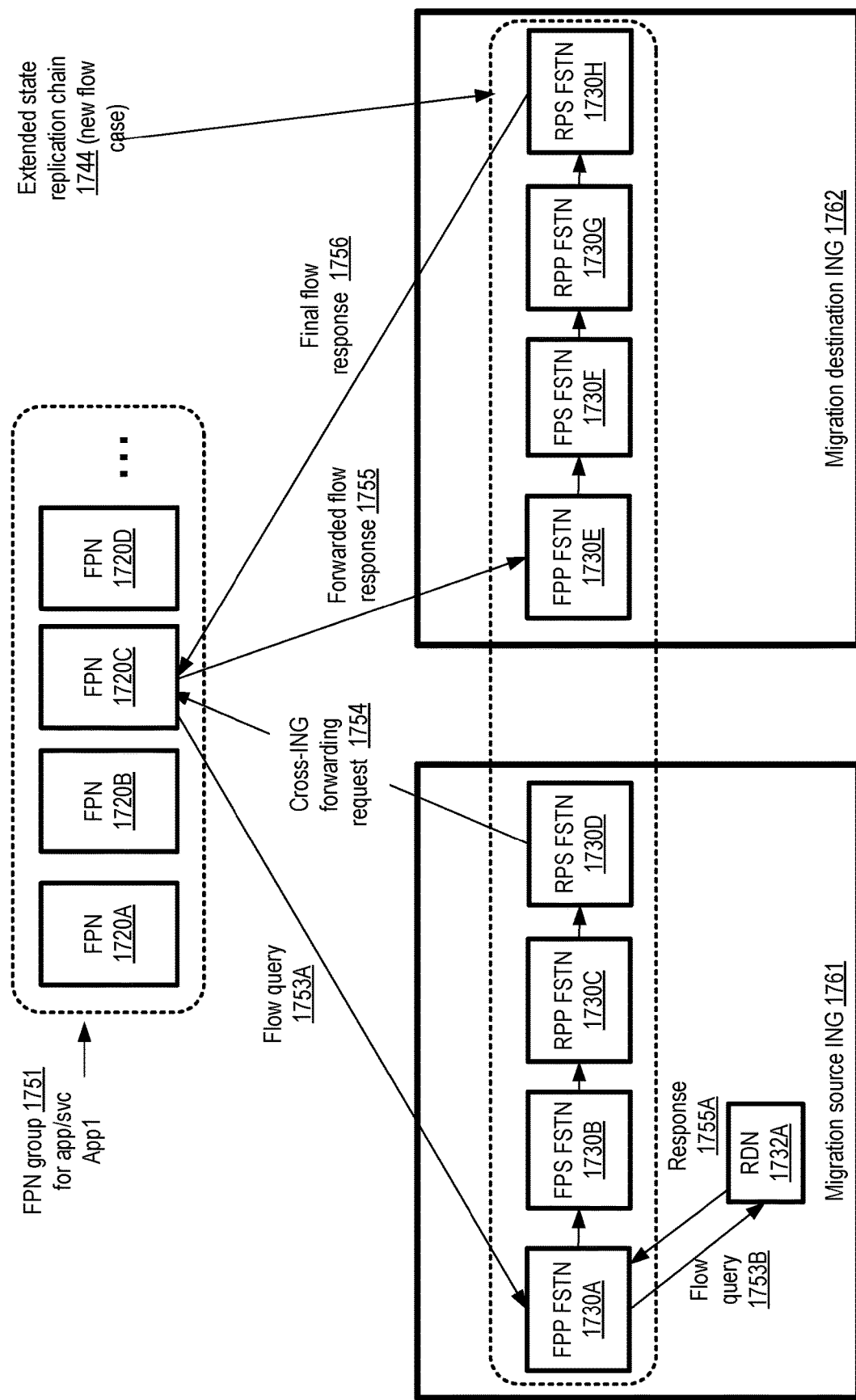
FIG. 17 and FIG. 18 illustrate an example use of fast-path nodes of a packet processing service as intermediaries for forwarding flow state information between isolated node groups during migration workflows of client-side virtual network interfaces, according to at least some embodiments.
Figure 18:
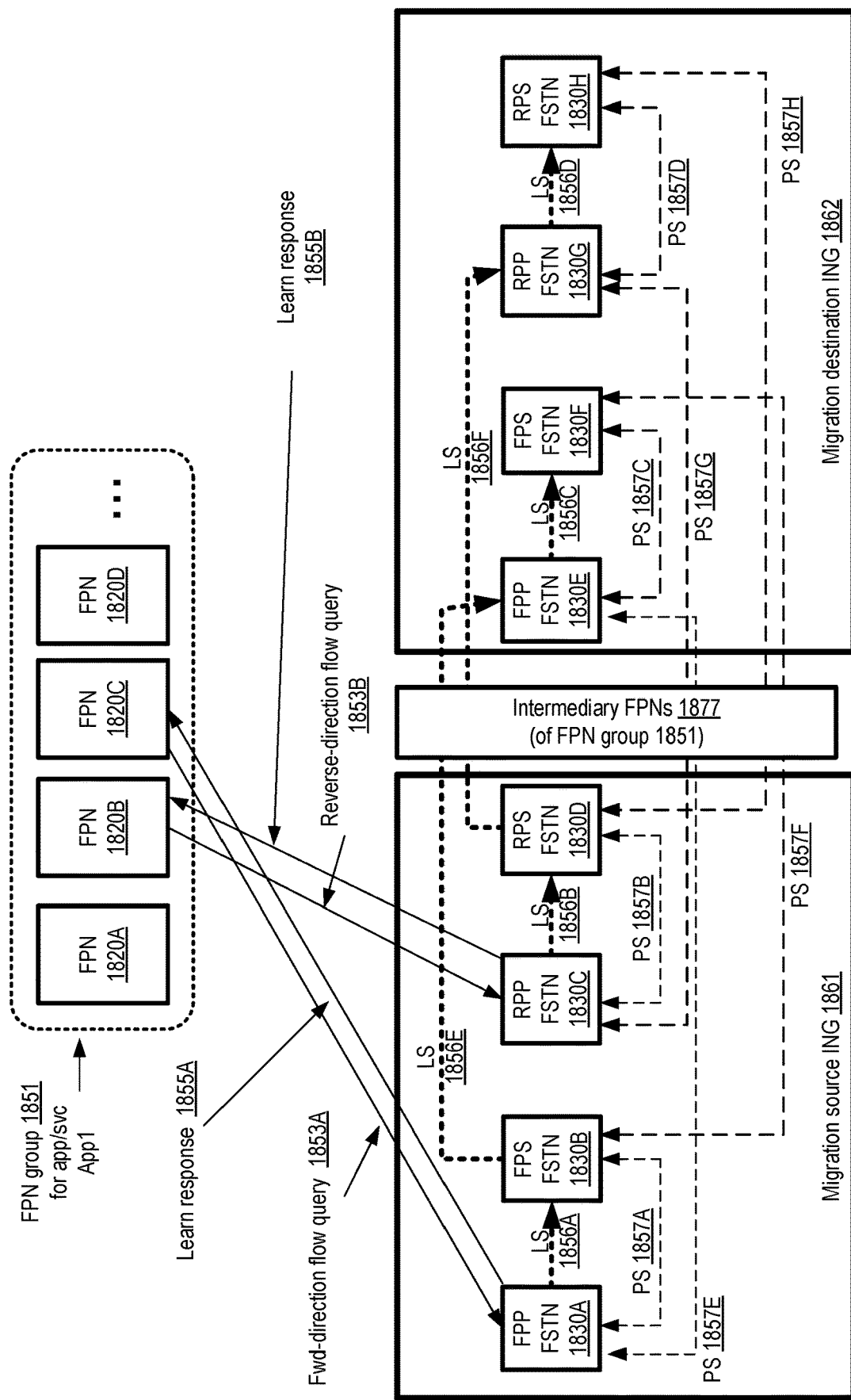

A variety of techniques may be used in different embodiments to transmit flow state information for replication from the source ING of a migration to a destination ING of the migration. FIG. 17 and FIG. 18 illustrate an example use of fast-path nodes of a packet processing service as intermediaries for forwarding flow state information between isolated node groups during migration workflows of client-side virtual network interfaces, according to at least some embodiments. In the embodiment depicted in FIG. 17, an FPN group comprising FPNs 1720A, 1720B, 1720C and 1720D has been assigned to process packets of a CVNI assigned to an application. A migration workflow has been initiated to transfer exception-path workload of the CVNI from a migration source ING 1761 to a migration destination ING 1762. In response to a flow query 1753A from FPN 1720C for a first packet of a new flow during the migration workflow, an FPP FSTN 1730A of ING 1762 for the flow experiences a miss in its cache, and sends flow query 1753B to an RDN 1732A of ING 1761. The RDN 1732A sends a response 1755A to FPP FSTN 1730A comprising a packet rewriting rule identified or generated for the flow.

The FPP FSTN initiates replication of the flow response at a subset of nodes of ING 1761 and a subset of nodes of migration destination ING 1762 in the depicted embodiment. Within ING 1761, flow state information comprising the response is replicated at FPP FSTN 1730A, FPS FSTN 1730B, RPP FSTN 1730C and RPS FSTN 1730D. RPS FSTN 1730D selects, e.g., based on a communication policy transmitted to at least some of the FSTNs of ING 1761 by a PPS control plane server, FPN 1720C as a forwarding intermediary for the flow state information. RPS FSTN 1730D sends a flow response cross-ING forwarding request, for example including an identifier of the migration destination ING 1762, to FPN 1720C. In some embodiments, a header of the packet containing the flow response cross-ING forwarding request may include a particular value set by the RPS FSTN to indicate that the receiving FPN (1720C) is to simply forward the packet to the destination ING, instead of trying to find a rewriting rule for the packet.

The FPN 1720C may use information provided by the PPS control plane to determine how to dispose of the forwarding request 1754, which contains flow state information to be forwarded to the destination ING in the depicted embodiment. For example, in various embodiments a control plane server may have provided membership information of various INGs including ING 1762 to the FPNs of FPN group 1751, and such membership information may be utilized by the FPN 1720C to identify the member FSTNs of the ING 1762. In at least some embodiments, the control plane may have provided an indication of a flow state information replication algorithm or methodology which is used at one or more INGs including ING 1762; such an algorithm may for example indicate how many FSTNs should be included in a chain of replication within a given ING, how a first FSTN of a replication chain should be selected as the target FSTN to which the FPN should forward state information of a particular flow, and so on. Using the replication algorithm, FPN 1720C may select FPP FSTN 1730E for the particular flow for which the forwarding request 1754 was received, and send the flow state information including the forwarded flow response 1755 to the FPP FSTN 1730E. From the FPP FSTN, the flow state information may be replicated at the remaining nodes of extended state replication chain 1744 in the depicted embodiment for the new flow case, including FPS FSTN 1730F, RPP FSTN 1730G and RPS FSTN 1730H. The RPS FSTN 1730H may send the final flow response 1756 (e.g., after removing or clearing a header value which indicates a request for cross-ING forwarding from the packet) to the FPN 1720C in the depicted embodiment. The FPN 1720C may then use the packet rewriting rule indicated in the final flow response to modify and direct packets of the flow to their intended destinations (e.g., back-end servers of the application to whose CVNI ING 1761 was initially assigned) in the depicted embodiment.

Note that at least in some embodiments, the FPN 1720C which sent the initial flow query 1753A may receive responses to the query twice: once in the cross-ING forwarding request 1754, and then again in the final flow response 1756 after the flow state information has been replicated at all the nodes of the extended chain used during migration workflows. The FPN 1720C may simply forward the response the first time it obtains the response, and only use the response to rewrite the packet which triggered the flow query the second time in such embodiments. This is because, according to the flow state replication policies enforced by the PPS during migration workflows in such embodiments, the completion of the flow state replication at both the source and destination INGs is a prerequisite for rewriting the packet. In other embodiments, the RPS FSTN may indicate, in the cross-ING forwarding request, that the FPN 1720C can apply the packet rewriting rule as soon as the cross-ING forwarding request containing the rule is received. In such an embodiment, the completion replication of the flow state information at the migration destination ING's chain of FSTNs may not be required before the FPN 1720C applies the rewriting rule. In one embodiment in which replication of state information at the destination ING is not required before the packet rewriting rule is applied, the RPS FSTN 1730H may not send the final flow response 1756.

FIG. 17 illustrated the use of FPNs as forwarding intermediaries during migration workflows in the scenario where a new flow results in a cache miss at an FPP FSTN of the migration source ING. In the scenario depicted in FIG. 18, FPNs may also be used, in accordance with communication policies provided by control plane components of the PPS, for live sync (LS) and periodic sync (PS) messages similar to the LS and PS messages discussed earlier in the context of FIG. 10. In the embodiment depicted in FIG. 18, FPN group 1851 comprising FPNs 1820A, 1820B, 1820C and 1820D has been assigned for processing packets of a CVNI of an application App1. A migration of the workload associated with a CVNI of App1 has been initiated from migration source ING 1861 to migration destination ING 1862.

In response to a cache miss at FPN 1820C, a forward-direction flow query 1853A is sent to FPP FSTN 1830A of the migration source ING in the depicted embodiment. The FPP FSTN 1830A finds the requested flow state information in its cache, and sends a learn response 1855A to FPN 1820C. In addition, FPP FSTN 1830A sends an LS message 1856A to FPS FSTN 1830B to refresh the state information (of the flow for which the cache hit occurred at the FPP FSTN 1830A) at FPS FSTN 1830B. Because the migration is underway, the FPS FSTN 1030B identifies a forwarding intermediary FPN 1877 (e.g., an FPN of FPN group 1851) for LS messages, and sends LS message 1856E to the FPP FSTN 1830E of the migration destination ING 1862 via the intermediary FPN. The FPP FSTN 1830E then sends a corresponding LS message 1856C to the FPS FSTN 1830F of the migration destination ING. Thus, LS messages are sent during migration workflows in the event of a cache hit at the FPP FSTN, using FPNs as forwarding intermediaries, so as to synchronize flow state information not only at the FPP and FPS of the migration source ING, but also at the FPP and FPS of the migration destination ING.

Similarly, in the event of cache hits at the RPP FSTN of the migration source ING (in response to a reverse-direction flow query 1853B from FPN 1820B), the RPP FSTN may send a learn response 1855B to the requesting FPN. LS messages 1856B, 1856F, and 1856D and may be sent, respectively, from RPP FSTN 1830C to RPS FSTN 1830D, from RPS FSTN 1830D to RPP FSTN 1830G via a selected intermediary FPN 1877, and from RPP FSTN 1830G to RPS FSTN 1830H during the migration workflow in the depicted embodiment. FIN syn messages may also be sent along similar paths in various embodiments, also using FPNs as forwarding intermediaries.

PS messages may be sent via forwarding intermediary FPNs to refresh/update flow state information across ING boundaries during the migration workflow as well in the depicted embodiment. For example, in response to similar events (such as expirations of timers indicating that the time elapsed since a previous exchange of flow state information between the FSTNs has reached or exceeded a threshold) as those discussed with respect to PS messages in the context of FIG. 9, PS messages 1857A, 1857E, 1857C and 1857F may be transmitted, respectively, between FPP FSTN 1830A and FPS FSTN 1830B, FPP FSTN 1830A of the migration source ING 1861 and FPP FSTN 1830E of the migration destination ING 1862 (via an intermediary FPN 1877), FPP FSTN 1830E and FPS FSTN 1830F, and FPS FSTN 1830B and FPS FSTN 1830F (via an intermediary FPN 1877). Similarly, PS messages 1857B, 1857G, 1857D and 1857H may be transmitted, respectively, between RPP FSTN 1830C and RPS FSTN 1830D, RPP FSTN 1830C of the migration source ING 1061 and RPP FSTN 1830G of the migration destination ING 1062 via an intermediary FPN 1877, RPP FSTN 1830G and RPS FSTN 1830H, and RPS FSTN 1830D and RPS FSTN 1830H. In general, PS messages may be sent in the depicted embodiment between all possible pairs of forward-direction FSTNs in both the migration source and migration destination INGs, and between all possible pairs of reverse-direction FSTNs in both the migration source and migration destination INGs. In those cases in which the PS message has to cross ING boundaries, an intermediary FPN 1877 (selected for example by the sender of the PS message in accordance with the communication policy provided by the PPS control plane) may be used to forward the PS message. The replication of flow state information at both the source and destination INGs may allow flow queries for the flows to be processed at either ING during different phases of the migration workflow in at least some embodiments, ensuring that regardless of which of the two INGs an FPN happens to choose for sending a flow query during the migration workflow, a valid and rapid response can be provided, and that existing connections and flows are not disrupted during the migration workflow. In addition, new flows may also be handled according to the application's requirements throughout the migration workflow, without for example requiring the processing of new flows to be deferred until the migration completes.

Note that in some embodiments in which FPNs are used as forwarding intermediaries for flow state information between a given pair of INGs during migration workflows, the particular FPN that is selected as a forwarding intermediary may differ for respective types of flow state replication triggering events. For example, for a flow response replication of the kind shown in FIG. 17, an FPN FPN1 may be selected, a different FPN FPN2 may be selected for a live sync message, a different FPN FPN3 may be chosen for a periodic sync message, and yet another FPN FPN4 may be chosen for a FIN sync message in one embodiment.

While FPNs may be used as the intermediaries for the transfer of flow state information across ING boundaries during migration workflows in some embodiments, other techniques may be used in other embodiments. FIG. 19*a* illustrates example communication policies used for forwarding flow state information between isolated node groups during migration workflows of client-side virtual network interfaces, according to at least some embodiments. Communication policies 1905 for cross-IGN flow state replication/synchronization may include, among others, a forward-via-query-source-FPN policy 1910, a forward-via-random-FPN policy 1915, forward-via-hashing-based-FPN policy 1920, a use-direct-connections policy 1925, and/or a forward-via-dedicated-nodes policy 1930 in different embodiments. The communication policy (or combination of policies) to be used during a given migration workflow (or during all migration workflows in which a source ING is involved) may be transmitted by a control plane server of the PPS to the FSTNs within one or more INGs in the depicted embodiment.

According to the forward-via-query-source-FPN policy, in those cases in which flow state replication is triggered by the arrival of a flow query from an FPN, that same FPN may be utilized as the intermediary in various embodiments. For example, in the case of a flow query for a new flow, which results in a cache miss at an FSTN (as in the scenario depicted in FIG. 17), the FPN whose flow query resulted in the cache miss may be selected as the intermediary. As mentioned earlier, this approach may be beneficial because information about the FPN that sent the flow query may be included in the flow query (because the response to the flow query has to be sent to that FPN), so no new information may be needed to identify an FPN that can be used as the forwarding intermediary. The source FPN for a flow query which results in a cache hit, and triggers a live sync message, may also be selected as the forwarding intermediary FPN for live sync messages in some embodiments in accordance with the forward-via-query-source-FPN in some embodiments, with similar benefits. Similarly for FIN sync messages, the FPN which sent an indication of a closing of a connection may be used as the forwarding intermediary in at least one embodiment.

In some scenarios, flow state may be synchronized or replicated by a triggering event (such as the expiration of a timer, in the case of periodic sync (PS) messages) which does not include the receipt of a message from an FPS. In at least some embodiments, an FPS may be chosen at random (e.g., from among the FPN group assigned to the CVNI for whose flow a period sync message is to be sent) in accordance with the forward-via-random-FPN policy 1915.

In one embodiment, in accordance with a forward-via-hashing-based-FPN policy 1920, a hashing-based algorithm (whose input may include a specified subset of fields of the state information which is to be replicated/synchronized) may be used to select an FPN as the forwarding intermediary for one or more types of flow state replication triggering events. In at least some embodiments, a combination of policies 1910, 1915 and/or 1920 may be used—e.g., a control plane component may command the FSTNs of a source ING (and a destination ING) to use policy 1910 for those triggering events in which a message from an FPN is received, and to use policy 1915 or 1920 for other triggering events.

According to some embodiments, FPNs may not be used as forwarding intermediaries. Instead, direct connections may be established between FSTNs of a source ING of a migration and the FSTNs of the destination ING of the migration, e.g., as part of an initial phase of the migration workflow. In such an embodiment, a use-direct-connections policy 1925 may be used for forwarding the flow state information during the migration workflow. A mesh interconnect, which enables any FSTN in the source ING to communicate with any FSTN in the destination ING, may be set up for the migration workflow in one implementation, and the mesh network may be taken down or unconfigured after the migration workflow ends.

In one embodiment, the PPS control plane may establish a fleet of dedicated nodes as forwarding intermediaries for inter-ING communication during migration workflows, e.g., to avoid overloading FPNs by adding flow state information forwarding to the workload of FPNs. A forward-via-dedicated-nodes policy 1930 may be implemented in such an embodiment, informing the FSTNs of the source and destination INGs regarding the network addresses of the dedicated nodes to be used for various categories of flow state replication triggering events during migration workflows. Other policies than those shown in FIG. 19*a* may be employed for inter-IGN communications in some embodiments. In some embodiments, a different set of one or more communication policies may be employed for migrating workload of one CVNI than the set of communication policies employed for migrating workload of another CVNI. Migrations of multiple CVNIs may be conducted at least partly in parallel using one or more communication policies in different embodiments.

Figure 19B:
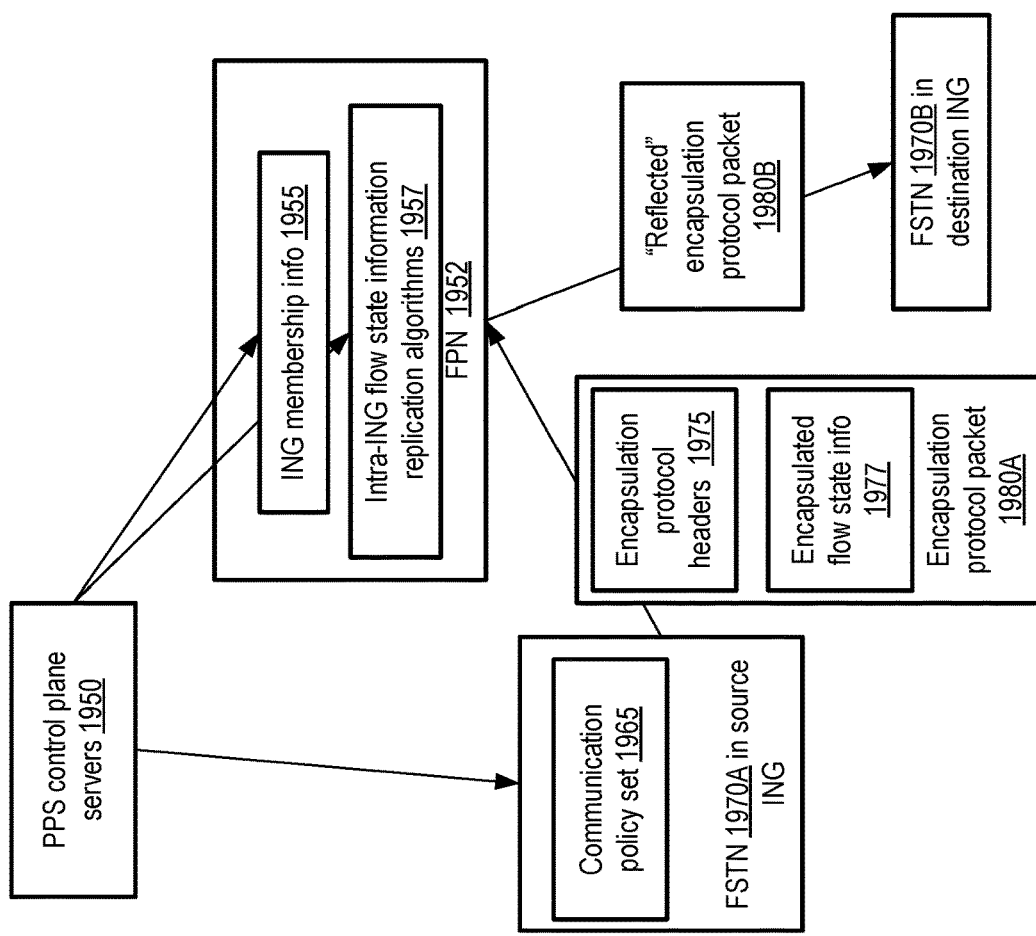
FIG. 19b illustrates examples of metadata that may be utilized for orchestrating replication of flow state information between isolated node groups, according to at least some embodiments.
Figure 19A:
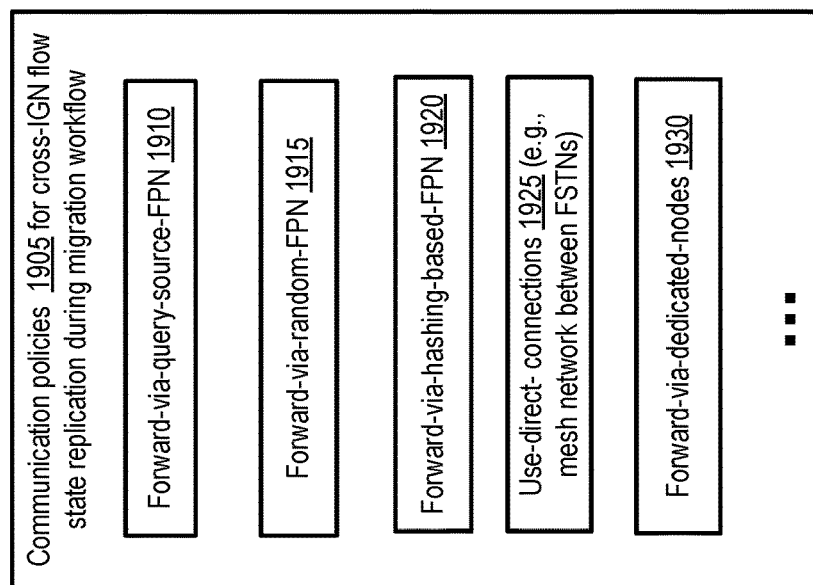
FIG. 19a illustrates example communication policies used for forwarding flow state information between isolated node groups during migration workflows of client-side virtual network interfaces, according to at least some embodiments.

FIG. 19*b* illustrates examples of metadata that may be utilized for orchestrating replication of flow state information between isolated node groups, according to at least some embodiments. PPS control plane servers 1950 may send a communication policy set 1965, comprising for example one or more of the kinds of policies shown in FIG. 19*a*, to an FSTN 1970A in a source ING in the depicted embodiment. In addition, a PPS control plane server may send ING membership information 1955 (indicating which FSTNs are members of various INGs) and intra-ING flow state information replication algorithms 1957 to FPNs such as FPN 1952 in some embodiments.

FSTN 1970A may select FPN 1952A as the forwarding intermediary for a flow state information entry or message in the depicted embodiment. An encapsulation protocol (such as a version of the Generic Network Virtualization Encapsulation or Geneve protocol or other protocols) may be employed to transfer the flow state information to the destination ING in some embodiments. An encapsulation protocol packet 1980A, comprising an encapsulated version of the flow state information and a set of encapsulation protocol headers 1975 whose values may be used as signals to indicate that the flow state information is to be forwarded, may be sent from FSTN 1970A to FPN 1952 in the depicted embodiment. In some implementations the FSTN 1970A may include, e.g., using one or more TLV (type-length-value) fields, information indicating an identifier of the destination ING (which may have been provided to the FSTN 1970A by the PPS control plane as part of the migration workflow) in the encapsulation protocol packet. A value indicating that the FPN is to simply forward the encapsulation protocol packet instead of attempting to find a packet rewriting rule may be included in an encapsulation protocol header 1975 in some embodiments.

Upon receiving the encapsulation protocol packet 1980A and examining contents of the encapsulation protocol headers 1975, the FPN may determine that the encapsulation protocol packet is to be forwarded to the specified destination ING in the depicted embodiment. Using the ING membership information for the destination ING and the intra-ING flow state information replication algorithm that is to be used in the destination ING, the FPN 1952 may select a particular FSTN 1970B of the destination ING as the recipient of the forwarded or "reflected" encapsulation protocol packet 1980B. The packet may be said to be "reflected" because the FPN 1952 acts analogously to a mirror which reflects received light. The contents of the reflected encapsulation protocol packet 1980B may be identical to the contents of the received encapsulation protocol packet 1980A in at least some implementations. The FSTN 1970B in the destination ING may then initiate further replication of the encapsulated flow state information 1977, e.g., among additional FSTNs in the destination ING as discussed above in the context of FIG. 17 and FIG. 18.

In at least one embodiment, an encapsulation protocol header 1975 may be used to specify the identifier of the FSTN 1970B to which the reflected packet should be sent, so the FPN 1952 may not need to use the ING membership information or the intra-ING flow state information replication algorithms to select the FSTN 1970B as the destination. In some embodiments, FPNs such as FPN 1952 of an FPN group being used for a given CVNI may be provided health state information about the FSTNs in one or more INGs (including for example the source and/or destination INGs of a migration workflow), and FPN 1952 may use the health state information to help select the destination FSTN for a reflected encapsulation protocol packet. For example, consider the scenario in which FPN 1952 would normally select an FPP (forward-path primary) FSTN for the flow in the destination ING as the destination FSTN. If health status information about the FSTNs of the destination ING is available to the FPN, and the health status it receives indicates that the FPP FSTN is not responsive or appears to be overloaded, while the forward-path secondary (FPS) FSTN for the flow appears to be healthy and responsive, the FPN may instead choose to send the reflected encapsulation packet to the FPS FSTN. In some embodiments, health status information regarding FSTNs may be collected directly from the FSTNs by the FPNs; in other embodiments, the health status information regarding the FSTNs may be collected by control plane servers of the PPS and propagated to the FPNs.

FIG. 20 is a flow diagram illustrating aspects of operations which may be performed using fast-path nodes of a packet processing service as intermediaries for transmitting flow state information from one isolated node group to another during migration workflows of client-side virtual network interfaces, according to at least some embodiments. Pools of FPNs and exception-path nodes (FSTNs and RDNs) may be set up at a PPS similar in features and functionality to PPS 102 of FIG. 1 in the depicted embodiment, e.g., by control plane servers (CPSs) of the PPS, and the exception path nodes may be subdivided into respective isolated node groups (INGs). CVNIs may be assigned as client-side endpoints for applications whose packets are to be processed at the PPS, and respective INGs may be assigned to individual ones of the CVNIs. As shown in element 2001, during a default or normal mode of operation at a packet processing service (PPS) with respect to a particular CVNI CVNI1 (i.e., during time periods in which workload of CVNI1 is not being migrated), packet rewriting rules for packet flows directed to CVNI1 may be generated at RDN(s) of an ING ING1 assigned to CVNI1 and transmitted by an FSTN of ING1 to FPNs assigned to CVNI1 in some embodiments.

During the default mode, state information for various packet flows associated with CVNI1 may be replicated/synchronized across several FSTNs of ING1 (element 2004); the state information may not be replicated across ING boundaries. The state information for a given packet flow may include various types of fields similar to those shown in FIG. 4, including the packet rewriting rule(s) for the flow.

A CPS of the PPS may determine, e.g., based on analysis of various performance and workload imbalance-related metrics of the kind mentioned earlier or based on a determination that a maintenance event is to be scheduled, that the packet processing workload associated with CVNI1 is to be migrated to a different ING, ING2 (element 2007). A variety of factors may be used to select the particular destination ING for the CVNI, such as measurements of the utilization levels at the nodes of the destination INGs, as well as other factors of the kind described as contributing to migration decisions above in the context of FIG. 16.

In some embodiments, the CPS may indicate a set of communication mechanisms (e.g., a direct network connection, or using selected FPNs as an intermediary) to one or more FSTNs within ING1, to be used for replication of state information from ING1 to ING2 during the migration workflow (element 2010). In some embodiments, the CPS may indicate the communication mechanism after the decision is made to migrate the workload of CVNI1; in other embodiments, the communication mechanism may be communicated in advance, e.g., as part of the initialization procedures of the FSTNs. In one embodiment, respective communication mechanisms may be specified for different kinds of messages that are used for replicating/synchronizing flow state (query response replications, live syncs, periodic syncs etc.).

The CPS may initiate a multi-stage migration workflow for workload associated with CVNI1 (element 2014), e.g., comprising phases similar to those shown in FIG. 11. Note that in various embodiments, different phases of the workflow may proceed as soon as the previous phase completes, with no gaps or pauses between the phases.

During the migration workflow, state information for various packet flows associated with CVNI1 may be replicated/synchronized across several FSTNs of ING1 and several FSTNs of ING2 using the specified communication mechanism(s) (element 2017). If a selected FPN is used as a forwarding intermediary, an FSTN of ING1 may inform the selected FPN that the state information is to be forwarded to ING2 (or VNI-to-ING mapping metadata at the FPN may be used to detect that the state information is to be forwarded to ING2) in some embodiments. An FSTN of ING2 which receives the forwarded state information may initiate a chain of replication of the state information at ING2 in various embodiments. Existing flows and/or connections associated with CVNI1 may not be disrupted or reset during the migration workflow, and new flows may be processed based on the application's requirements, just as in the default mode of operation in various embodiments. The owners and users of the applications whose packets are being processed using the PPS may not even be made aware, and may not notice any impacts from, the migration workflow in various embodiments.

After the migration workflow completes and the default mode is resumed, state information for various packet flows associated with CVNI1 may be replicated/synchronized across several FSTNs of ING2, with no communication required between ING2 and ING1 (element 2020). For new flows, packet rewriting rules may be generated at ING2 and transmitted to FPNs for caching and implementation in various embodiments. It is noted that in various embodiments, some of the operations shown in the flow diagrams of FIG. 15, FIG. 16 and/or FIG. 20 may be implemented in a different order than that shown in the figure, or may be performed in parallel rather than sequentially. Additionally, some of the operations shown in FIG. 15, FIG. 16 and/or FIG. 20 may not be required in one or more implementations.

Figure 21:
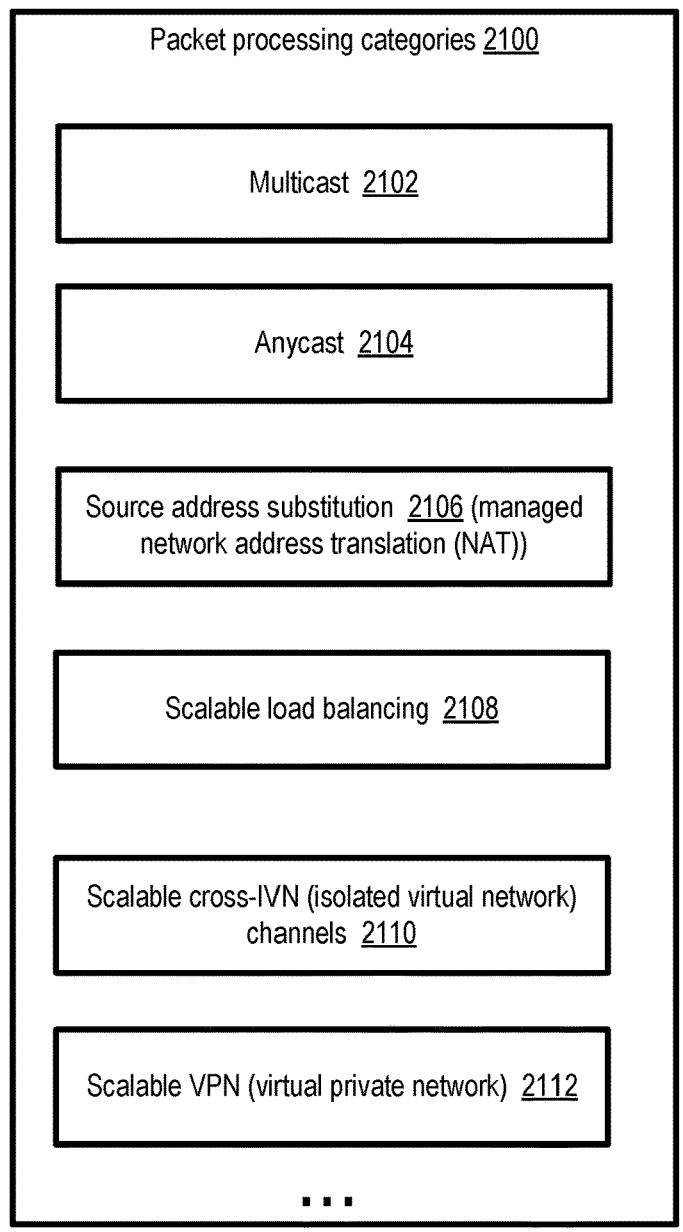
FIG. 21 illustrates example categories of packet processing that may be supported at a packet processing service of a cloud provider network, according to at least some embodiments.

FIG. 21 illustrates example categories of packet processing that may be supported at a packet processing service of a cloud provider network, according to at least some embodiments. As shown, the supported packet processing categories 2100 of in the depicted embodiment may include, for example, multicast 2102, anycast 2104, source address substitution 2106 (which may also be referred to as managed network address translation (managed NAT)), scalable load balancing 2108, scalable cross-IVN (isolated virtual network) channels 2110, scalable VPN (virtual private network) 2112 and the like. Other types of packet processing applications may be supported in various embodiments. In general, a PPS similar in features and functionality to PPS 102 of FIG. 1 may be configurable to implement any desired type of packet transformations, with nodes being assignable dynamically at each layer to support a large range of traffic rates in a transparent and scalable manner.

Generally speaking, multicast is a networking technique in which contents (e.g., the body) of a single packet sent from a source are replicated to multiple destinations of a specified multicast group. In contrast, stateful anycast may involve selecting, for all the packets of a given flow that are received at the PPS, a particular destination from among a specified set of destinations (e.g., regardless of workload level changes). Source address substitution, as the name suggests, involves replacing, for the packets of a particular flow, the source address and port in a consistent manner. Fixed-IP-address load balancing operations supported at a PPS may allow a particular IP address (e.g., an address assigned to a CVNI as in the example shown in FIG. 6) to continue to be used as a load balancer address for an application, despite replacements of the virtual and/or physical machines being used for the load balancer.

In some embodiments, the PPS may be implemented at a provider network in which isolated virtual networks (IVNs) can be established. At least in some embodiments, by default the set of private network addresses set up within one IVN may not be accessible from another IVN. In various embodiments, the PPS may act as intermediary or channel between the private address spaces of two or more different IVNs, in effect setting up scalable and secure cross-IVN channels 2110. In at least some embodiments, the PPS may also or instead be used to support scalable VPN connectivity between some set of resources within a provider network and one or more client networks or client premises outside the provider network.

Figure 22:
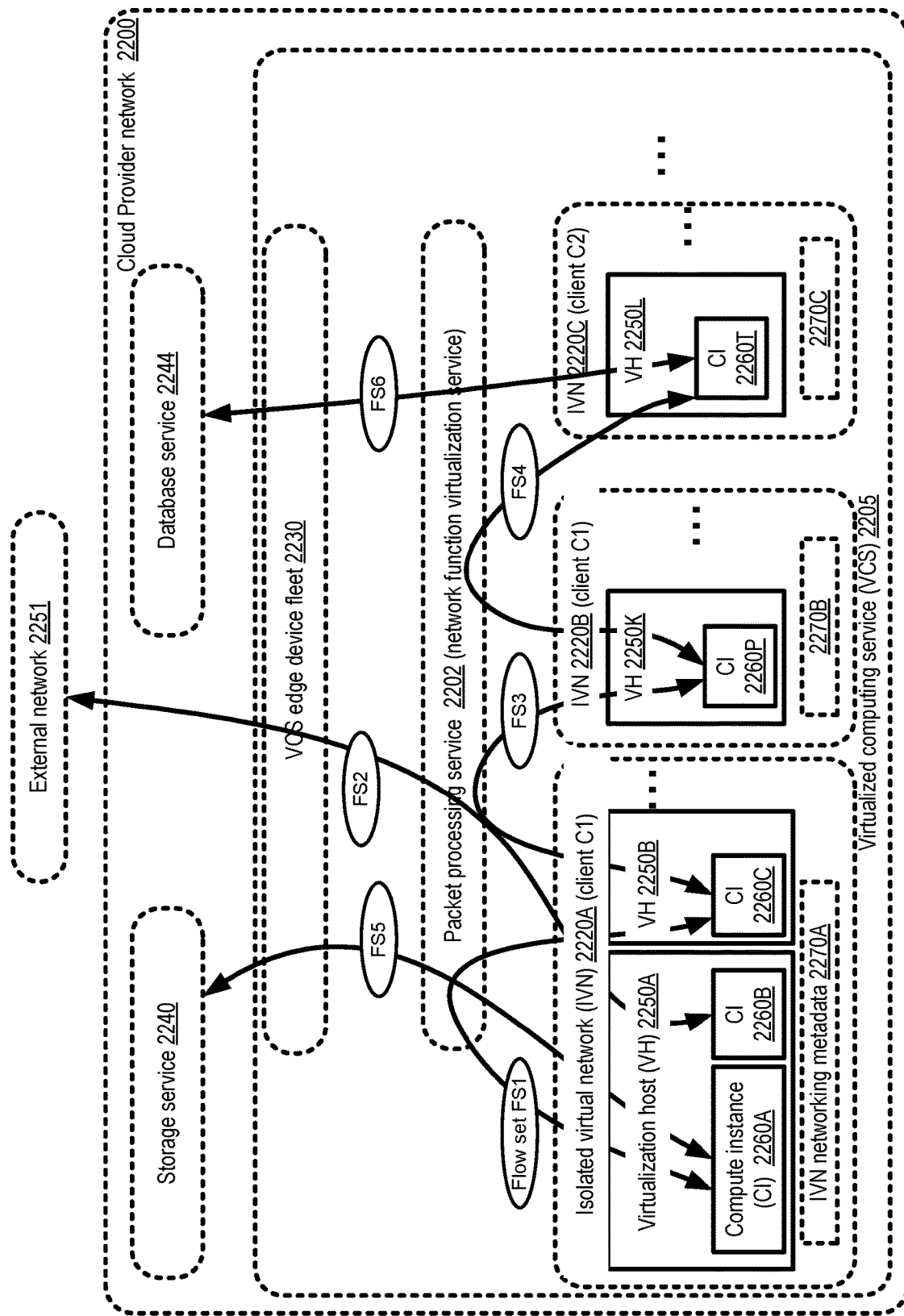
FIG. 22 illustrates examples of network flows which may originate or terminate at compute instances within isolated virtual networks of a provider network, according to at least some embodiments.

FIG. 22 illustrates examples of network flows which may originate or terminate at compute instances within isolated virtual networks of a provider network, according to at least some embodiments. Several different network-accessible services may be implemented at cloud provider network 2200 of FIG. 22, including, for example, a virtualized computing service (VCS) 2205, a storage service 2240 and a database service 2244. The VCS may comprise a plurality of virtualization hosts (VHs) 2250, such as 2250A, 2250B, 2250K and 2250L in the depicted embodiment, at each of which one or more compute instances (CIs) 2260 such as guest virtual machines (GVMs) may be instantiated on behalf of one or more VCS clients. Each virtualization host may also include other components not shown in FIG. 22, such as a virtualization management stack (VMS) comprising a hypervisor and/or an administrative-domain operating system, with the VMS acting as an intermediary between the CIs of the host and the hardware components of the host.

In the depicted embodiment, the VCS may support the capability of setting up isolated virtual networks (IVNs) on behalf of various clients. As mentioned above, each IVN 2220 may include a respective subset of resources of the VCS, over whose networking configuration the client is granted substantial flexibility. For example, IVN 2220A (established for client C1) includes VHs 2250A and 2250B in the depicted embodiment, IVN 2220B (also set up for client C1) includes VH 2250K, and IVN 2220C (set up for client C2) includes VH 2250L. A given client such as C1 may establish multiple IVNs for various purposes—e.g., IVN 2220A may be set up for hosting a web application for access from external networks such as network 2250 (which may for example include portions of the public Internet and/or a client-owned network), while IVN 2220B may be set up for the development of the web applications. Generally speaking, the VCS may allow the traffic associated with a given IVN to be isolated or separated from the traffic associated with any other IVN, unless of course the clients for whom the IVNs are established indicate otherwise. With respect to a given IVN, the client may make various networking decisions such as IP address assignment, subnet configuration and/or enforcement of security rules regarding incoming and outgoing traffic independently of the corresponding decisions made with respect to other IVNs. For example, a particular private IP address which is assigned to a CI 2260B at VH 2250A of IVN 2220A may also happen be assigned to CI 2260T at VH 2250L of IVN 2220C. Thus, with respect to many aspects of network management, each IVN may effectively be treated by the corresponding client as a standalone network such as one which may be established at the client's private data center. Each IVN may have an associated set of networking metadata 2270 in the depicted embodiment, such as 2270A for IVN 2220A, 2270B for IVN 2220B, and 2270C for IVN 2270C. IVNs may also be referred to as virtual private clouds in some environments.

In the embodiment depicted in FIG. 22, a PPS 2202 similar in features and functionality to PPS 102 of FIG. 1 may be implemented at least in part for traffic originating at or directed to the CIs 2260. PPS 2202 may be referred to as a network function virtualization service, as the packet rewriting rules applied by it may represent virtualized network functions. The networking metadata 2270 of an IVN may include addresses for the FPNs of PPS 2202 for various packet processing requirements associated with the IVN in the depicted embodiment. For example, if source address substitution is to be implemented for packets originating at CIs of IVN 2220A, in some embodiments a gateway for outbound traffic may be configured at IVN 2220 specifically for those packets. The metadata 2270A may include an indication of one or more IP addresses assigned to the gateway, which may be mapped to one or more FPNs of PPS 2202, e.g., using virtual network interfaces. Similarly, the IVN networking metadata may include indications of the interfaces and/or addresses of the PPS which are to be used for other types of packet processing applications, including multicast, anycast and the like.

Some types of packet transformations may be required for traffic originating and terminating within a given IVN, such as flow set FS1 which comprises packets flowing between different CIs of IVN 2220A (e.g., 2260A and 2260C). Other types of transformations may be implemented with respect to flows (such as FS2) originating at external networks such as 2250 and destined for CIs such as 2260B within one or more IVNs as indicated by the arrow labeled FS2. For example, an application may be implemented at CI 2260B, and client requests directed to that application may originate at various devices on the public Internet. Response to such requests may travel in the opposite direction—e.g., from CI 2260B to the public Internet. Request packets as well as response packets may pass through the PPS 2202 in the depicted embodiment. In at least some embodiments, a fleet of VCS edge devices 2230 may be used as intermediaries between the VCS and other services or external networks 2251. The VCS edge devices may be responsible for implementing an encapsulation protocol used at the VCS in some embodiments, e.g., for directing packets addressed to a particular CI 2260 to a NIC (network interface card) associated with a virtualization management stack at the CI's virtualization host. The VCS edge devices and the virtualization management stacks at various virtualization hosts may both be considered examples of PPS client-side components in the depicted embodiment.

As mentioned earlier, in some embodiments the PPS 2202 may be used as a scalable and secure channel for traffic between IVNs. For example, flow set FS3 comprises packets transmitted between IVNs 2220A and 2220B of the same client C1 via PPS 2202, while flow set FS3 comprises packets transmitted between the IVNs of two different clients (IVN 2220B of client C1 and IVN 2220C of client C2). The PPS may also be used for packet flows between different services of the provider network in some embodiments. For example, flow sets FS5 and FS6 between IVNs of the VCS and other services such as database service 2244 or storage service 2240 may be processed at PPS 2202 in the depicted embodiment. It is noted that not all the CIs of the VCS may be assigned to clients of the VCS; some CIs may be used for internal purposes in various embodiments. In at least one embodiment, as mentioned earlier, some CIs may be used for the nodes at one or more layers of the PPS itself.

Figure 23:
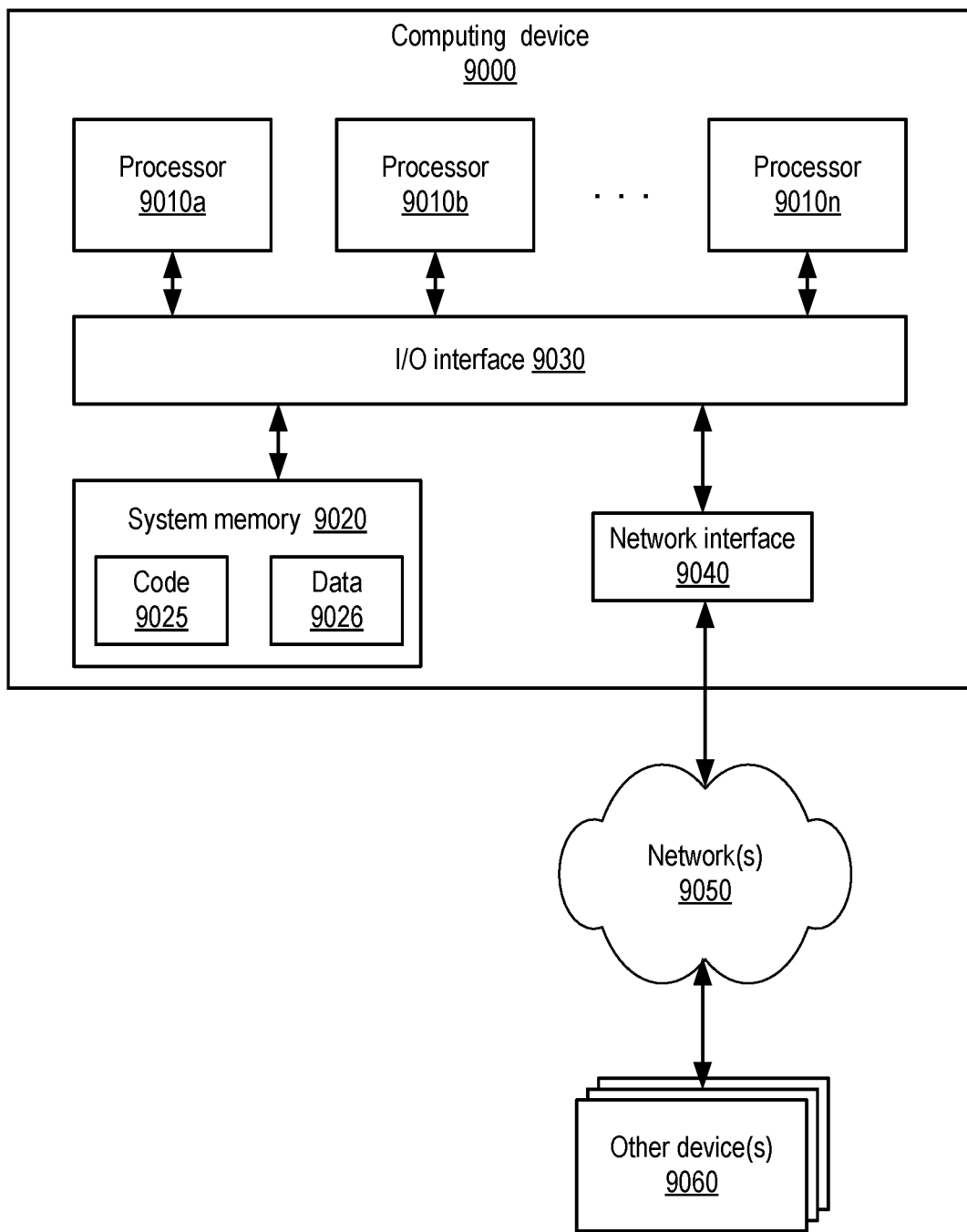
FIG. 23 is a block diagram illustrating an example computing device that may be used in at least some embodiments.

In at least some embodiments, a server that implements the types of techniques described herein (e.g., including functionality of PPS control plane servers, FPNs, FSTNs, RDNs and/or components of other provider network services), may include a general-purpose computer system that includes or is configured to access one or more computer-accessible media. FIG. 23 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 22, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 22. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 23 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more processors and memory configured to implement:
  a control plane server of a packet processing service of a provider network;
  a pool of exception-path nodes of the packet processing service; and
  a pool of fast-path nodes of the packet processing service, wherein fast-path nodes of the pool of fast-path nodes cache and execute packet rewriting rules generated for respective packet flows at exception-path nodes of the pool of exception-path nodes;
  wherein the control plane server is configured to assign, to a first virtual network interface, a first isolated node group of a plurality of isolated node groups into which the pool of exception-path nodes has been partitioned, wherein the first virtual network interface is configured to receive packets comprising application requests of a first application implemented using one or more resources of the provider network, and wherein, during a default mode of operation of the first virtual network interface, nodes of the first isolated node group generate packet rewriting rules for packets directed to the first virtual network interface without communicating with nodes of other isolated node groups;
  wherein, during the default mode of operation of the first virtual network interface, a particular exception-path node of the first isolated node group causes flow state information of a particular packet flow of the first application to be replicated at a first subset of nodes of the first isolated node group, such that in the event of a failure of the particular exception-path node, a packet rewriting rule indicated in the flow state information can be obtained from another node of the first subset, wherein the packet rewriting rule is used by a fast-path node to direct rewritten versions of packet containing application requests of the first application to a resource implementing the first application;
  wherein, in response to detecting that a workload migration criterion has been met with respect to the first isolated node group, the control plane server is further configured to:
    select a second isolated node group as a workload migration destination for workload associated with the first virtual network interface; and
    initiate a migration workflow of the first virtual network interface, wherein during at least a portion of the migration workflow, flow state information of the particular packet flow is replicated at (a) the first subset of nodes of the first isolated node group and (b) a second subset of nodes of the second isolated node group, wherein during the migration workflow, network connections used for transmitting packets of the first application remain operational and are not reset, flow state information of the particular packet flow is used at the first isolated node group to respond to requests from one or more fast-path nodes, and flow state information of the particular packet flow is used at the second node group to respond to other requests from one or more fast-path nodes; and
  wherein, after the migration workflow has completed and the default mode of operation is resumed, a particular exception-path node of the second isolated node group is configured to cause flow state information of the particular packet flow to be replicated at the second subset of exception-path nodes of the second isolated node group, without replicating the flow state information at the first subset of exception-path nodes of the first isolated node group.

2. The system as recited in claim 1, wherein the control plane server is further configured to:
assign, prior to detecting that the workload migration criterion has been met, the first isolated node group to a second virtual network interface which receives application requests of a second application; and
wherein, during a default mode of operation of the second virtual network interface, another exception-path node of the first isolated node group is configured to transmit a packet rewriting rule for packets of the second application to a fast-path node of the pool of fast-path nodes.

3. The system as recited in claim 1, wherein the control plane server is further configured to:
assign, prior to detecting that the workload migration criterion has been met, the first isolated node group to a second virtual network interface which receives application requests of another application; and
in response to detecting that the workload migration criterion has been met for the first isolated node group, initiate a migration workflow of the second virtual network interface, wherein the migration workflow of the second virtual network interface overlaps in time with at least a portion of migration workflow of the first virtual network interface.

4. The system as recited in claim 1, wherein the control plane server is further configured to:
assign, prior to detecting that the workload migration criterion has been met, the first isolated node group to a second virtual network interface which receives application requests of another application; and
in response to detecting that the workload migration criterion has been met for the first isolated node group,
select a third isolated node group of the plurality of isolated node groups as a destination for migrating workload of the second virtual network interface; and
initiate a migration workflow of the second virtual network interface during which workload of the second virtual network interface is migrated to the third isolated node group.

5. The system as recited in claim 1, wherein individual ones of the exception-path nodes of the first isolated node group are implemented at respective compute instances of a virtualized computing service of the provider network.

6. A computer-implemented method, comprising:
assigning, to a first endpoint of a first application, a first node group selected from a plurality of node groups of a packet processing service, wherein the packet processing service comprises fast-path nodes and exception-path nodes, and wherein individual ones of the node groups comprise one or more exception-path nodes;
causing to be provided, to a fast-path node of the packet processing service by a particular exception-path node of the first node group during a default mode of operation of the first endpoint, a first packet rewriting rule, wherein the first packet rewriting rule is used by the fast-path node to deliver, to a resource at which the first application is implemented, re-written versions of packets of a particular packet flow received at the first endpoint;
in response to detecting that a workload migration criterion has been met for the first node group, initiating a migration workflow of the first endpoint, wherein during at least a portion of the migration workflow, flow state information of the particular packet flow is replicated at (a) a first subset of nodes of the first node group and (b) a second subset of nodes of a second node group of the plurality of node groups, wherein during the migration workflow network connections used for transmitting application requests of the first application remain operational, wherein during the migration workflow flow state information of the particular packet flow is used at the first node group to response to requests from one or more fast-path nodes, and wherein during the migration workflow flow state information of the particular packet flow is used at the second node group to respond to other requests from one or more fast-path nodes; and
after the migration workflow has completed and the default mode of operation has been resumed,
causing to be provided, by a particular node of the second node group to the fast-path node, a second packet rewriting rule used by the fast-path node to deliver, to the resource at which the first application is implemented, re-written versions of data packets of another packet flow directed to the first endpoint; and
replicating flow state information of the other packet flow at the second subset of nodes, without replicating the flow state information of the other packet flow at the first subset of nodes.

7. The computer-implemented method as recited in claim 6, further comprising:
assigning, to a second endpoint of a second application, the first node group; and
causing to be provided, to another fast-path node of the packet processing service by another exception-path node of the first node group during a default mode of operation of the second endpoint, a third packet rewriting rule, wherein the third packet rewriting rule is used to deliver, to a resource at which the second application is implemented, re-written versions of data packets of an additional packet flow directed to the second endpoint.

8. The computer-implemented method as recited in claim 6, further comprising:
assigning, to a second endpoint of a second application, the first node group; and
in response to detecting that the workload migration criterion has been met for the first node group, initiating a migration workflow of the second endpoint, wherein the migration workflow of the second application is conducted at least partly in parallel with the migration workflow of the first endpoint.

9. The computer-implemented method as recited in claim 6, further comprising:
assigning, to a second endpoint of a second application, the first node group;
in response to detecting that the workload migration criterion has been met for the first node group,
selecting a third node group of the plurality of node groups as a destination node group for migrating workload of the second endpoint; and initiating a migration workflow of the second endpoint to the third node group.

10. The computer-implemented method as recited in claim 6, wherein detecting that the workload migration criterion has been met comprises one or more of: (a) determining that a resource utilization metric of the first node group exceeds a threshold, (b) determining that a workload imbalance metric associated with the first node group and one or more other node groups exceeds a threshold or (c) determining that a maintenance event associated with the first node group is scheduled.

11. The computer-implemented method as recited in claim 6, further comprising:
selecting the second node group as a migration destination for the first endpoint based at least in part on one or more of: (a) a resource utilization metric of the second node group, (b) a number of endpoints to which the second node group has been assigned, (c) a number of active connections whose packets are being processed using the second node group, (d) a packet processing rate metric of the second node group, or (e) a metric of hardware resource overlap between the first node group and the second node group.

12. The computer-implemented method as recited in claim 6, further comprising:
replicating, during the default mode of operation, flow state information of the particular packet flow at the first subset of nodes of the first node group without communicating with the second node group, wherein said replicating comprises:
transmitting, by a first flow state tracker node of the first subset to a second flow state tracker node of the first subset, an indication of a packet-rewriting rule obtained by the first flow state tracker node from a packet rewriting decisions node of the first node group in response to a cache miss at the first flow state tracker node.

13. The computer-implemented method as recited in claim 6, further comprising:
replicating, during the default mode of operation, flow state information of the particular packet flow at the first subset of nodes of the first node group without communicating with the second node group, wherein said replicating comprises:
transmitting, by a first flow state tracker node of the first subset to a second flow state tracker node of the first subset, a request to synchronize the flow state information of the particular packet flow after a cache hit occurs at the first flow state tracker node in response to a query from the fast-path node.

14. The computer-implemented method as recited in claim 6, further comprising:
replicating, during the default mode of operation, flow state information of the particular packet flow at the first subset of nodes of the first node group without communicating with the second node group, wherein said replicating comprises:
transmitting, by a first flow state tracker node of the first subset to a second flow state tracker node of the first subset, a request to synchronize the flow state information in response to detecting that an elapsed time since a previous synchronization exceeds a threshold.

15. The computer-implemented method as recited in claim 6, wherein the first subset of nodes comprises (a) a primary flow state tracker node for a forward direction of packet transmissions of the particular packet flow, (b) a secondary flow state tracker node for the forward direction of packet transmissions of the particular packet flow, (c) a primary flow state tracker node for a reverse direction of packet transmissions of the particular packet flow, and (d) a secondary flow state tracker node for a reverse direction of packet transmissions of the particular packet flow.

16. A non-transitory computer-accessible storage medium storing program instructions that when executed on a processor implement a control plane server of a packet processing service, wherein the control plane server is configured to:
assign, to a first network interface of a first application, a first node group selected from a plurality of node groups of a packet processing service, wherein the packet processing service comprises a plurality of fast-path nodes and a plurality of exception-path nodes, and wherein individual ones of the node groups comprise one or more exception-path nodes, and wherein assignment of the first node group causes nodes of the first node group to provide packet rewriting rules used by fast-path nodes of the packet processing service to direct application requests of the first application to one or more destinations;
detect that a workload migration criterion has been met for the first node group; and
in response to detecting that the workload migration criterion has been met, initiate a migration workflow of the first network interface from the first node group to a second node group of the plurality of node groups, wherein during at least a portion of the migration workflow, flow state information of a particular packet flow is replicated at (a) a first subset of nodes of the first node group and (b) a second subset of nodes of the second node group, wherein during the migration workflow, network connections used for transmitting application requests of the first application remain operational, and wherein after the migration workflow terminates, nodes of the second node group provide packet rewriting rules used by fast-path nodes of the packet processing service to direct application requests of the first application to the one or more destinations.

17. The non-transitory computer-accessible storage medium as recited in claim 16, wherein the control plane server is further configured to:
assign the first node group to a second network interface of a second application, wherein nodes of the first node group provide packet rewriting rules used by fast-path nodes of the packet processing service to direct application requests of the second application to one or more destinations.

18. The non-transitory computer-accessible storage medium as recited in claim 17, wherein the control plane server is further configured to:
in response to detecting that the workload migration criterion has been met, determine that a migration workflow of the second network interface is not to be implemented.

19. The non-transitory computer-accessible storage medium as recited in claim 16, wherein the flow state information which is replicated comprises one or more of: (a) a packet rewriting rule, (b) an activity timestamp, (c) a sequence number, (d) a time-to-live, (e) a window size or (d) an identifier of a client.

20. The non-transitory computer-accessible storage medium as recited in claim 16, wherein a packet rewriting rule provided by a node of the first node group to a fast-path node implements one or more of: an anycast operation, a multicast operation, a source address substitution, a load balancing operation, a cross-isolated-virtual-network channel, or connectivity via a virtual private network (VPN) connection.

\* \* \* \* \*